United States Patent
Yoshida et al.

(10) Patent No.: US 6,600,485 B1
(45) Date of Patent: Jul. 29, 2003

(54) POLYGON DATA GENERATION METHOD AND IMAGE DISPLAY APPARATUS USING SAME

(75) Inventors: Jiro Yoshida, Tokyo (JP); Shinichi Furuhashi, Tokyo (JP); Toshihiro Nakane, Tokyo (JP); Naoki Nakamura, Tokyo (JP)

(73) Assignee: Sega Enterprises, Ltd. (JP)

( * ) Notice: Subject to any disclaimer, the term of this patent is extended or adjusted under 35 U.S.C. 154(b) by 0 days.

(21) Appl. No.: 09/508,048

(22) PCT Filed: May 7, 1999

(86) PCT No.: PCT/JP99/03639

§ 371 (c)(1),
(2), (4) Date: Mar. 3, 2000

(87) PCT Pub. No.: WO00/02165

PCT Pub. Date: Jan. 13, 2000

(30) Foreign Application Priority Data

| Jul. 3, 1998 | (JP) | 10-189093 |
| Oct. 2, 1998 | (JP) | 10-281434 |
| Oct. 13, 1998 | (JP) | 10-290598 |
| Mar. 9, 1999 | (JP) | 11-61834 |

(51) Int. Cl.$^7$ .............................. G06T 15/00

(52) U.S. Cl. ............................................... 345/419

(58) Field of Search .......................... 345/419, 420, 345/426, 428, 619, 620, 440, 441, 442

(56) References Cited

U.S. PATENT DOCUMENTS 6,014,472 A * 1/2000 Minami et al. ............. 382/285

FOREIGN PATENT DOCUMENTS

| JP | 04-172578 | 6/1992 |
| JP | 05-067219 | 3/1993 |
| JP | 06-176165 | 6/1994 |
| JP | 06-223197 | 8/1994 |
| JP | 06-231261 | 8/1994 |
| JP | 06-251161 | 9/1994 |
| JP | 09-198524 | 7/1997 |

OTHER PUBLICATIONS

Hugues Hoppe "Progressive Meshes", SIGGRAPH 96 Conference Proceedings, ACM, Aug. 1996, p. 99–108.

(List continued on next page.)

*Primary Examiner*—Phu K. Nguyen
(74) *Attorney, Agent, or Firm*—Dickstein Shapiro Morin & Oshinsky LLP

(57) ABSTRACT

A method for generating polygon data from NURBS (non-uniform rational B-spline) data representing a parametric surface and an image display apparatus using that method are disclosed. In the method for generating polygon data, NURBS object data are coordinate-converted to coordinates having the viewing point as the origin, in correspondence with the advance of a program. Furthermore, the level of detail wherewith the object is drawn on the display is determined, the number of divisions into polygons when converting NURBS object data to objects configured by polygons is found, according to the determined level of detail wherewith objects are drawn, and vertices of polygons converted to according to that number of divisions are computed. Furthermore, polygons for which all vertices among the computed vertices are off the display screen displayed on the display, and all polygons which are front/back-determined to be backward and which do not have a front-and-back display attribute are deleted, and the vertex attributes are computed for the vertices of the remaining polygons. Rendering processing is also performed on the remaining polygons.

94 Claims, 61 Drawing Sheets

OTHER PUBLICATIONS

Bernd Hamann, et al., "A tessellation algorithm for the representation of trimmed NURBS surface with arbitrary trimming curves", computer–aided Designs, Butterworth–Heinemann, 1996, Jun., vol. 28, No. 6/7, p. 461–472.

Subodh Kumar, et al, "Efficient rendering of trimmed NURBS Surfaces", Computer Aided Design, butterworth–Heinemann, 1995, Jul., vol. 27, No. 7, p. 509–521.

Lesie A. Pieg, et al., "Tessellating trimmed NURBS surfaces", Computer–Aided Design, Butterworth–Heineman, 1995, Jan., vol. 27, No. 1, p. 16–26.

Ji Minwen et al., "A First Algorithm for Triangulating the Parametric Space of Trimmed NURBS Surfaces", Chinese Journal of Computers, Chuugoku Keisan Kigakukai, 1996, Jun., vol. 19, No. 6, p. 450–456.

* cited by examiner

| S c | More than $4^3N$ | $4^2N$ ~ $4^3N$ | $4N$ ~ $4^2N$ | Less than $4N$ |
|---|---|---|---|---|
| L O D | 1 | 2 | 3 | 4 |

| S c | More than $4^3N/1.625$ | $4^2N/1.625$ ~ $4^3N/1.625$ | $4N/1.625$ ~ $4^2N/1.625$ | Less than $4N/1.625$ |
|---|---|---|---|---|
| L O D | 1 | 2 | 3 | 4 |

| L O D | Number of u direction | Number of v direction |
|---|---|---|
| 1 | 8 | 6 |
| 2 | 4 | 3 |
| 3 | 2 | 2 |
| 4 | 1 | 1 |

|  | Number of u direction | Number of v direction |
|---|---|---|
| LOD 1 | 100 | 80 |
| LOD 2 | 50 | 40 |
|  |  |  |
| LOD n-1 | 10 | 10 |
| LOD n | 10 | 10 |

FIG. 14
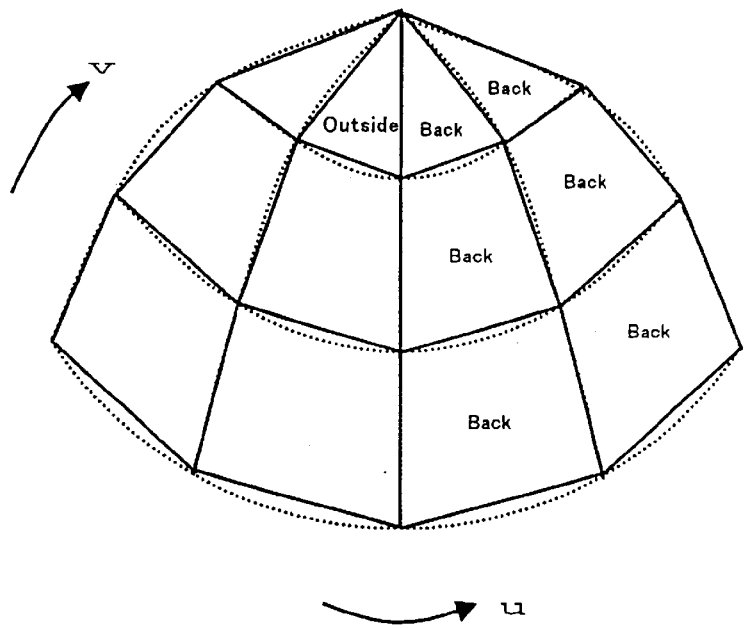
FIG. 15A
4 degree:
3rd-order curve L1
FIG. 15B
3 degree:
2nd-order curves L2 and L
FIG. 15C
2 degree:
1st-order curves L4, L5 and L6
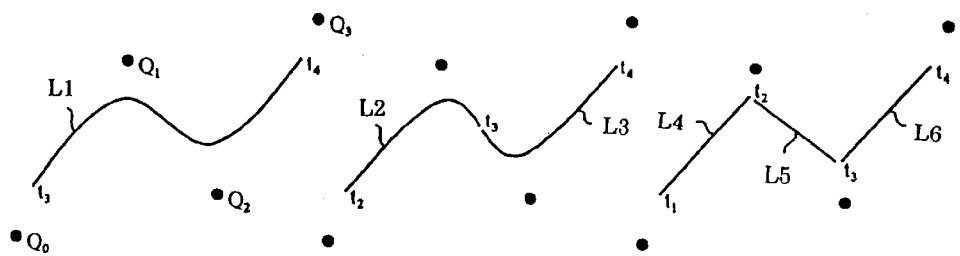
A curve segment affected
by $Q_0$, $Q_1$, $Q_2$ and $Q_3$
$t_3-t_4$ element interval is
the valid range
1. $Q_0-Q_1-Q_2$ ($t_2-t_3$)
2. $Q_1-Q_2-Q_3$ ($t_3-t_4$)
1. $Q_0-Q_1$ ($t_1-t_2$)
2. $Q_1-Q_2$ ($t_2-t_3$)
3. $Q_2-Q_3$ ($t_3-t_4$)

FIG. 16A

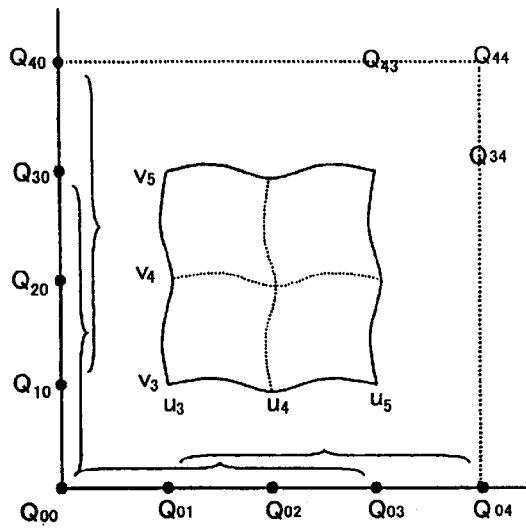

4 × 4 degree NURBS surface
4 patches
In the u knot $[u_0, \cdots, u_8]$,
$u_3$-$u_4$-$u_5$ are the valid range In the v knot $[v_0, \cdots, v_8]$,
$v_3$-$v_4$-$v_5$ are the valid range

FIG. 16B

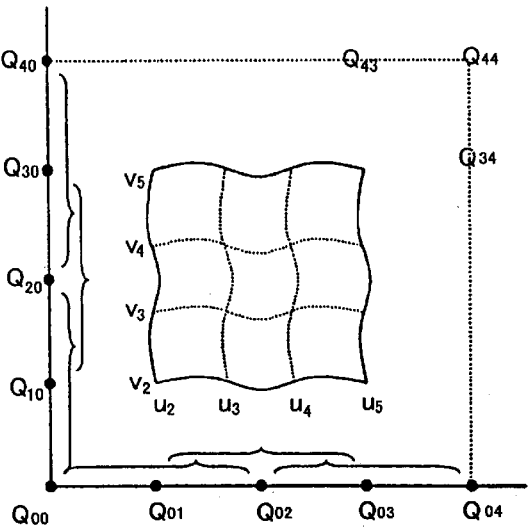

3 × 3 degree NURBS surface
9 patches
In the u knot $[u_0, \cdots, u_7]$,
$u_2$-$u_3$-$u_4$-$u_5$ are the valid range In the v knot $[v_0, \cdots, v_7]$,
$v_2$-$v_3$-$v_4$-$v_5$ are the valid range

FIG. 16C

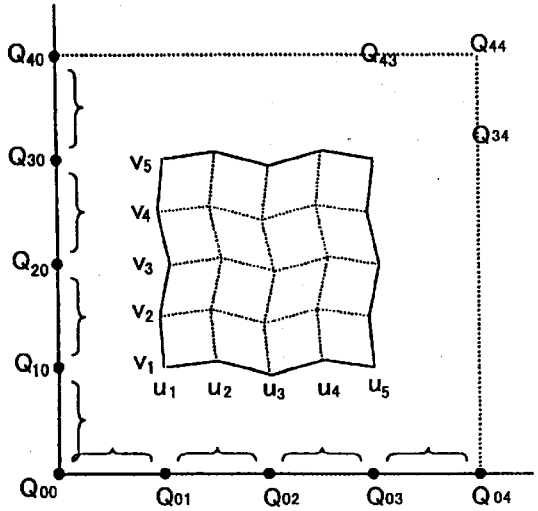

2 × 2 degree NURBS surface
16 patches
In the u knot $[u_0, \cdots, u_6]$,
$u_1$-$u_2$-$u_3$-$u_4$-$u_5$ are the valid range In the v knot $[v_0, \cdots, v_6]$,
$v_1$-$v_2$-$v_3$-$v_4$-$v_5$ are the valid range

FIG. 17A 4 degree: $u_3 \leqq u < u_4$ $M_{0,1} = 0 \quad M_{1,1} = 0 \quad M_{2,1} = 0 \quad M_{3,1} = 1 \quad M_{4,1} = 0$ $M_{0,2} = 0 \quad M_{1,2} = 0 \quad M_{2,2} = 0 + \dfrac{u_4 - u}{u_4 - u_3} M_{3,1} \quad M_{3,2} = \dfrac{u - u_3}{u_4 - u_3} M_{3,1} + 0 \quad M_{4,2} = 0$ $M_{0,3} = 0 \quad M_{1,2} = 0 + \dfrac{u_4 - u}{u_4 - u_2} M_{2,2} \quad M_{2,3} = \dfrac{u - u_2}{u_4 - u_2} M_{2,2} + \dfrac{u_5 - u}{u_5 - u_3} M_{3,2} \quad M_{3,3} = \dfrac{u - u_3}{u_5 - u_3} M_{3,2} + 0 \quad M_{4,3} = 0$ $M_{0,4} = 0 + \dfrac{u_4 - u}{u_4 - u_1} M_{1,3} \quad M_{1,4} = \dfrac{u - u_1}{u_4 - u_1} M_{1,3} + \dfrac{u_5 - u}{u_5 - u_2} M_{2,3} \quad M_{2,4} = \dfrac{u - u_2}{u_5 - u_2} M_{2,3} + \dfrac{u_6 - u}{u_6 - u_3} M_{3,3} \quad M_{3,4} = \dfrac{u - u_3}{u_6 - u_3} M_{3,3} + 0$

FIG. 17B 3 degree: $u_2 \leqq u < u_3$ $M_{0,1} = 0 \quad M_{1,1} = 0 \quad M_{2,1} = 1 \quad M_{3,1} = 0$ $M_{0,2} = 0 \quad M_{1,2} = 0 + \dfrac{u_3 - u}{u_3 - u_2} M_{2,1} \quad M_{2,2} = \dfrac{u - u_2}{u_3 - u_2} M_{2,1} + 0 \quad M_{3,2} = 0$ $M_{0,3} = 0 + \dfrac{u_3 - u}{u_3 - u_1} M_{1,2} \quad M_{1,3} = \dfrac{u - u_1}{u_3 - u_1} M_{1,2} + \dfrac{u_4 - u}{u_4 - u_2} M_{2,2} \quad M_{2,3} = \dfrac{u - u_2}{u_4 - u_2} M_{2,2} + 0$

FIG. 17C 2 degree: $u_1 \leqq u < u_2$ $M_{0,1} = 0 \quad M_{1,1} = 1 \quad M_{2,1} = 0$ $M_{0,2} = 0 + \dfrac{u_2 - u}{u_2 - u_1} M_{1,1} \quad M_{1,2} = \dfrac{u - u_1}{u_2 - u_1} M_{1,1} + 0$

FIG. 18

| LOD | Number of patches | Number of control point | Number of degree(u, v) | Number of knot(u, v) |
|---|---|---|---|---|
| 1 | 16 | 7 × 7 | 4, 4 | 11, 11 |
| 2 | 16 | 7 × 7 | 4, 4 | 11, 11 |
| 3 | 25 | 7 × 7 | 3, 3 | 10, 10 |
| 4 | 36 | 7 × 7 | 2, 2 | 9, 9 |

FIG. 19A 4 degree:
a 3rd-order curve

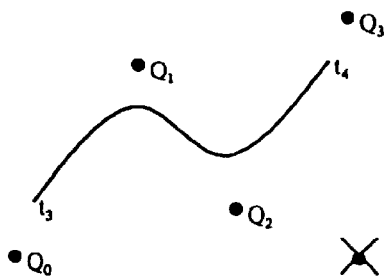

A curve segment affected by $Q_0$, $Q_1$, $Q_2$ and $Q_3$ $t_3$-$t_4$ element interval is the valid rang

FIG. 19B 3 degree:
a 2nd-order curve

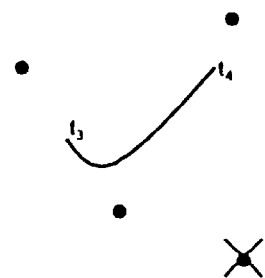

$Q_1$-$Q_2$-$Q_3$($t_3$-$t_4$)
$Q_0$ is made invalid
$t_0$ is also invalid

FIG. 19C 2 degree:
a 1st-order curve

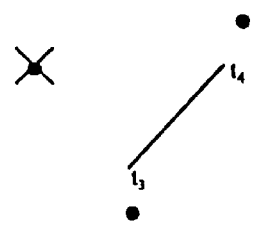

$Q_2$-$Q_3$ ($t_3$-$t_4$)
$Q_0$, $Q_1$ is made invalid
$t_0$, $t_1$ is also invalid

FIG. 20

| LOD | Number of patches | Number of control point | Number of degree(u, v) | Number of knot(u, v) |
|---|---|---|---|---|
| 1 | 16 | 7 × 7 | 4, 4 | 11, 11 |
| 2 | 16 | 7 × 7 | 4, 4 | 11, 11 |
| 3 | 16 | 6 × 6 | 3, 3 | 9, 9 |
| 4 | 16 | 5 × 5 | 2, 2 | 7, 7 |

FIG. 21A

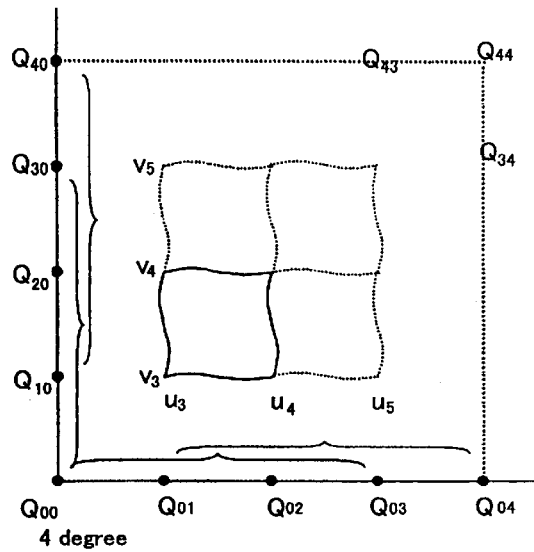

4 degree

• 4 surface patches configured from control points 4 × 4 matrix $[u_0, u_1, u_2, \cdots, u_8]$
$[v_0, v_1, v_2, \cdots, v_8]$

• Each number of elements in the u, v knot string is 9

FIG. 21B

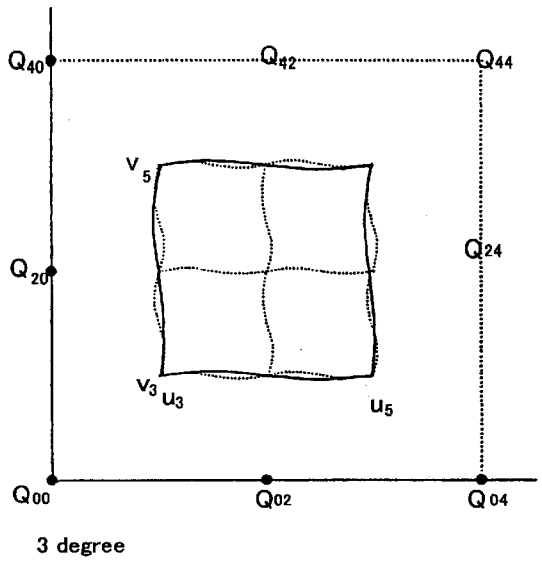

3 degree $\begin{bmatrix} \cdots & \cdots & Q^1_{22} \\ & & \vdots \\ Q^1_{00} & \cdots & \cdots \end{bmatrix} = \begin{bmatrix} Q_{40} & Q_{42} & Q_{44} \\ Q_{20} & Q_{22} & Q_{24} \\ Q_{00} & Q_{02} & Q_{04} \end{bmatrix}$

• 1 surface patche configured from control points 3 × 3 matrix $[u'_0, u'_1, u'_2, \cdots, u'_5] = [u_0, u_2, u_3, u_5, u_6, u_8]$
$[v'_0, v'_1, v'_2, \cdots, v'_5] = [v_0, v_2, v_3, v_5, v_6, v_8]$

• Each number of elements in the u, v knot string is 6

FIG. 23A

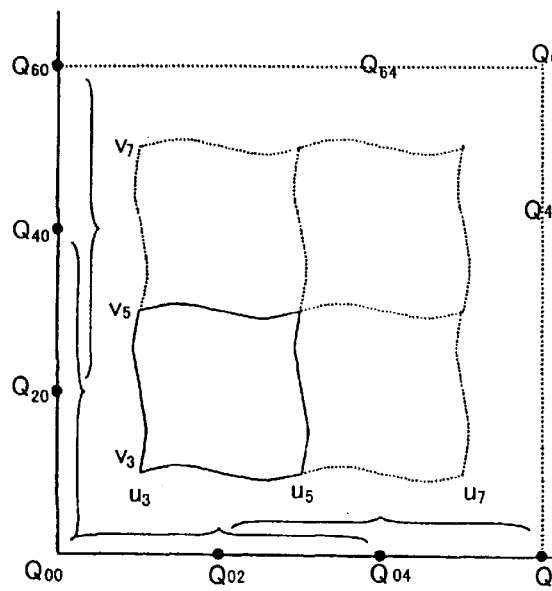

3 degree:

$$\begin{bmatrix} \cdots & \cdots & Q^1_{32} \\ \cdots & \cdots & \cdots \\ Q^1_{10} & \cdots & \cdots \\ \cdots & \cdots & Q^1_{22} \\ \cdots & \cdots & \cdots \\ Q^1_{00} & \cdots & \cdots \end{bmatrix} \begin{bmatrix} \cdots & \cdots & Q^1_{33} \\ \cdots & \cdots & \cdots \\ Q^1_{11} & \cdots & \cdots \\ \cdots & \cdots & Q^1_{23} \\ \cdots & \cdots & \cdots \\ Q^1_{01} & \cdots & \cdots \end{bmatrix} = \begin{bmatrix} Q_{60} & Q_{62} & Q_{64} \\ Q_{40} & Q_{42} & Q_{44} \\ Q_{20} & Q_{22} & Q_{24} \\ Q_{40} & Q_{42} & Q_{44} \\ Q_{20} & Q_{22} & Q_{24} \\ Q_{00} & Q_{02} & Q_{04} \end{bmatrix} \begin{bmatrix} Q_{62} & Q_{64} & Q_{66} \\ Q_{42} & Q_{44} & Q_{46} \\ Q_{22} & Q_{24} & Q_{26} \\ Q_{42} & Q_{44} & Q_{46} \\ Q_{22} & Q_{24} & Q_{26} \\ Q_{02} & Q_{04} & Q_{06} \end{bmatrix}$$

· 4 surface patches configured from control points 3 × 3 matrix $[u'_0, u'_1, u'_2, \cdots, u'_6] = [u_0, u_2, u_3, u_5, u_7, u_8, u_{10}]$
$[v'_0, v'_1, v'_2, \cdots, v'_6] = [v_0, v_2, v_3, v_5, v_7, v_8, v_{10}]$
· Each number of elements in the u, v knot string is 7

FIG. 23B

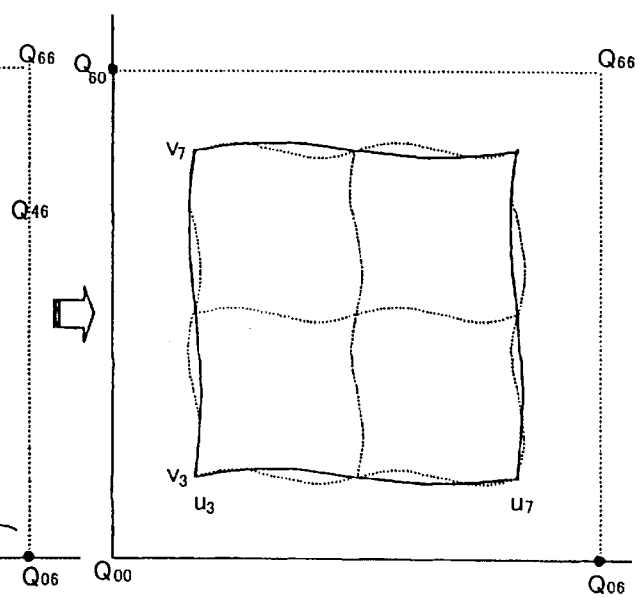

2 degree:

$$\begin{bmatrix} Q''^1_{10} & Q''^1_{11} \\ Q''^1_{00} & Q''^1_{01} \end{bmatrix} = \begin{bmatrix} Q_{60} & Q_{66} \\ Q_{00} & Q_{06} \end{bmatrix}$$

· 1 surface patch configured from control points 2 × 2 matrix $[u''_0, u''_1, u''_2, u''_3] = [u_0, u_3, u_7, u_{10}]$
$[v''_0, v''_1, v''_2, v''_3] = [v_0, v_3, v_7, v_{10}]$
· Each number of elements in the u, v knot string is 4

FIG. 24

| LOD | Number of patches | Number of control point | Number of degree(u, v) | Number of knot(u, v) |
|---|---|---|---|---|
| 1 | 16 | 7 × 7 | 4, 4 | 11, 11 |
| 2 | 16 | 7 × 7 | 4, 4 | 11, 11 |
| 3 | 4 | 4 × 4 | 3, 3 | 7, 7 |
| 4 | 1 | 2 × 2 | 2, 2 | 4, 4 |

FIG. 25A
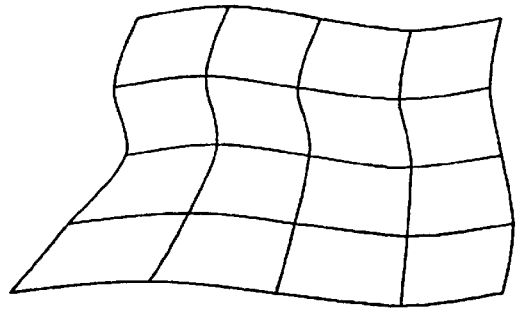
4 degree NURBS suface, 16 patches
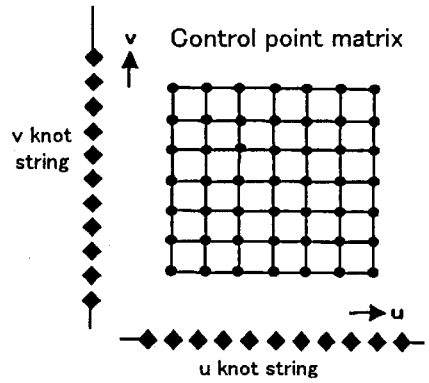
FIG. 25B
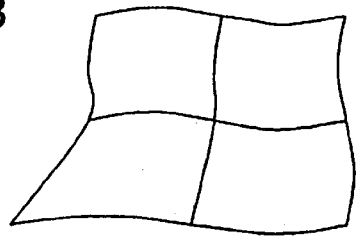
3 degree NURBS suface, 4 patches
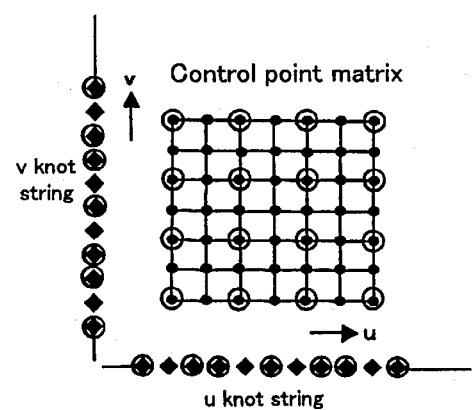
FIG. 25C
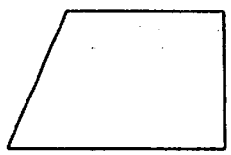
2 degree NURBS suface, 1 patch
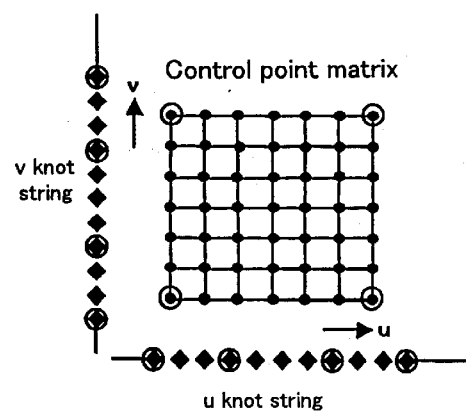

FIG. 31A
FIG. 31B
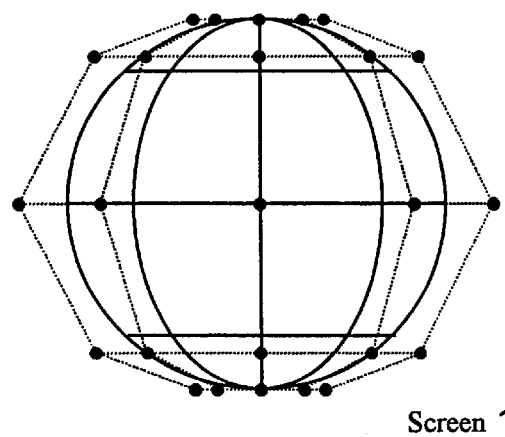
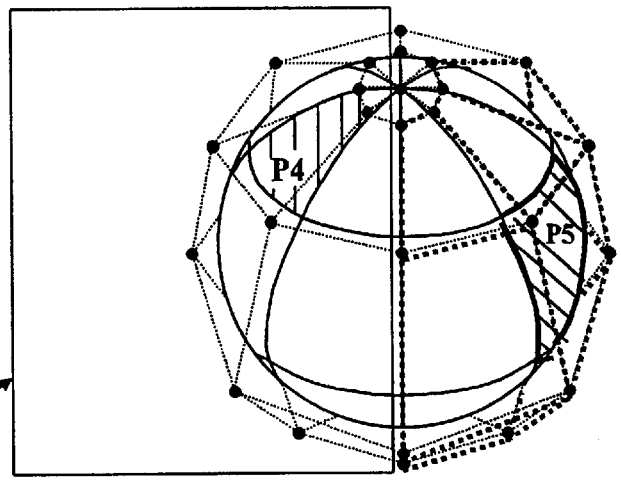
FIG. 32
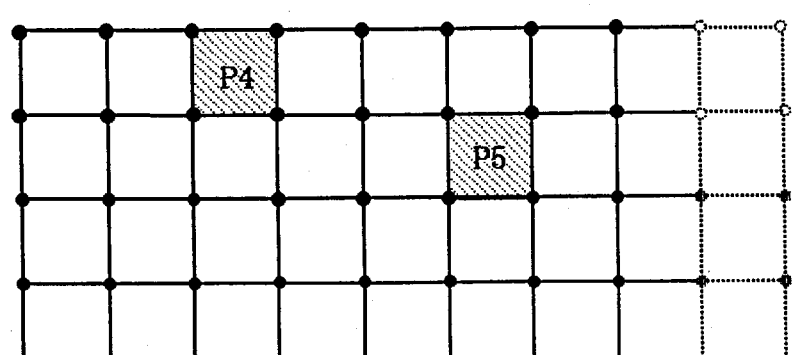

$$\begin{bmatrix} Q_{30} & .. & Q_{32} & Q_{33} \\ .. & .. & .. & .. \\ .. & .. & .. & .. \\ Q_{00} & .. & Q_{02} & Q_{03} \end{bmatrix}$$

$$\begin{bmatrix} Q_{30} & .. & .. & Q_{33} \\ Q_{20} & .. & .. & Q_{23} \\ .. & .. & .. & .. \\ Q_{00} & .. & .. & Q_{03} \end{bmatrix}$$

LOD = 1

LOD = 2

LOD = 3

Original NURBS object

Dividing into 3 surface regions

When the number of polygon divisions is determined directly

When the number of polygon divisions is determined after first making the surface regions When the number of polygon divisions is determined directly When the number of polygon division is determined after first making the surface regions Because not divided into four Divided into two
Divided into three
Divided into four When vertex coordinates are computed every time a triangle strip is generated Total number of vertices 31

(Connection information)
5: Vertices 13=16-17-12
4: Vertices 15-16-14-13
3: Vertices 11-14-10-13-9-12-8
2: Vertices 7-11-6-10-5-9-4-8
1: Vertices 3-7-2-6-1-5-0-4

When vertex coordinates are computed by using a table

Total number of Vertices 18

| | 3D vertex coordinates x, y, z are calculated from the vertex number (u, v) | | |
|---|---|---|---|
| | Vertex 17 (0.5, 1.0) | Vertex 16 (0.75, 1.0) | Vertex 15 (1.0, 1.0) |
| | Vertex 12 (0.25, 1.0) | Vertex 13 (0.63, 0.88) | Vertex 14 (1.0, 0.75) |
| Vertex 8 (0.0, 1.0) | Vertex 9 (0.33, 0.83) | Vertex 10 (0.67, 0.67) | Vertex 11 (1.0, 0.5) |
| Vertex 4 (0.0, 0.5) | Vertex 5 (0.33, 0.42) | Vertex 6 (0.67, 0.33) | Vertex 7 (1.0, 0.25) |
| Vertex 0 (0.0, 0.0) | Vertex 1 (0.33, 0.0) | Vertex 2 (0.67, 0.0) | Vertex 3 (1.0, 0.0) |

Screen SC

FIG. 57

4 degree : $u_3 \leq u < u_4$ $M_{0,3}=0 \quad M_{1,3}=0+\dfrac{u_4-u}{u_4-u_2}M_{2,2} \quad M_{2,3}=\dfrac{u-u_2}{u_4-u_2}M_{2,2}+\dfrac{u_5-u}{u_5-u_3}M_{3,2} \quad M_{3,3}=\dfrac{u-u_3}{u_5-u_3}M_{3,2}+0 \quad M_{4,3}=0$ $M_{0,4}=0+\dfrac{u_4-u}{u_4-u_1}M_{1,3} \quad M_{1,4}=\dfrac{u-u_1}{u_4-u_1}M_{1,3}+\dfrac{u_5-u}{u_5-u_2}M_{2,3} \quad M_{2,4}=\dfrac{u-u_2}{u_5-u_2}M_{2,3}+\dfrac{u_6-u}{u_6-u_3}M_{3,3} \quad M_{3,4}=\dfrac{u-u_3}{u_6-u_3}M_{3,3}+0$

FIG. 58

$M_{0,1}=0 \quad M_{1,1}=0 \quad M_{2,1}=0 \quad M_{3,1}=0 \quad M_{4,1}=1 \quad M_{5,1}=0$ $M_{0,2}=0 \quad M_{1,2}=0 \quad M_{2,2}=0 \quad M_{3,2}=0+\dfrac{u_5-u}{u_5-u_4}M_{4,1} \quad M_{4,2}=\dfrac{u-u_4}{u_5-u_4}M_{4,1}+0 \quad M_{5,2}=0$ $M_{0,3}=0 \quad M_{1,3}=0 \quad M_{2,3}=0+\dfrac{u_5-u}{u_5-u_3}M_{3,2} \quad M_{3,3}=0+\dfrac{u-u_3}{u_5-u_3}M_{3,2}+\dfrac{u_6-u}{u_6-u_4}M_{4,2} \quad M_{4,3}=\dfrac{u-u_4}{u_6-u_4}M_{4,2}0 \quad M_{5,3}=0$ $M_{0,4}=0 \quad M_{1,4}=0+\dfrac{u_5-u}{u_5-u_2}M_{2,3} \quad M_{2,4}=\dfrac{u-u_2}{u_5-u_2}M_{2,3}+\dfrac{u_6-u}{u_6-u_3}M_{3,3} \quad M_{3,4}=\dfrac{u-u_3}{u_6-u_3}M_{3,3}+\dfrac{u_7-u}{u_7-u_4}M_{4,3} \quad M_{4,4}=\dfrac{u-u_4}{u_7-u_4}M_{4,3}0 \quad M_{5,4}=0$ $M_{0,5}=0+\dfrac{u_5-u}{u_5-u_1}M_{1,4} \quad M_{1,5}=\dfrac{u-u_1}{u_5-u_1}M_{1,4}+\dfrac{u_6-u}{u_6-u_2}M_{2,4} \quad M_{2,5}=\dfrac{u-u_2}{u_6-u_2}M_{2,4}+\dfrac{u_7-u}{u_7-u_3}M_{3,4} \quad M_{3,5}=\dfrac{u-u_3}{u_7-u_3}M_{3,4}+\dfrac{u_8-u}{u_8-u_4}M_{4,4} \quad M_{4,5}=\dfrac{u-u_4}{u_8-u_4}M_{4,4}+0$

FIG. 59

Step 1    $M_{3,2} \quad M_{4,2}$

Step 2    $M_{2,3} \quad M_{4,3}$

Step 3    $M_{3,3} \quad M_{1,4} \quad M_{4,4}$

Step 4    $M_{2,4} \quad M_{3,4} \quad M_{0,5} \quad M_{4,5}$

Step 5    $M_{1,5} \quad M_{2,5} \quad M_{3,5}$

3 degree : $u_2 \leq u < u_3$ $M_{0,1} = 0$      $M_{1,1} = 0$      $M_{2,1} = 1$      $M_{3,1} = 0$ $M_{0,2} = 0$      $M_{1,2} = 0 + \frac{u_3 - u}{u_3 - u_2} M_{2,1}$      $M_{2,2} = \frac{u - u_2}{u_3 - u_2} M_{2,1} + 0$      $M_{3,2} = 0$ $M_{0,3} = 0 + \frac{u_3 - u}{u_3 - u_1} M_{1,2}$    $M_{1,3} = \frac{u - u_1}{u_3 - u_1} M_{1,2} + \frac{u_4 - u}{u_4 - u_2} M_{2,2}$    $M_{2,3} = \frac{u - u_2}{u_4 - u_2} M_{2,2} + 0$ 3 degree : $u_3 \leq u < u_4$ $M_{1,1} = 0$      $M_{2,1} = 1$      $M_{3,1} = 0$      $M_{4,1} = 0$ $M_{1,2} = 0$      $M_{2,2} = 0 + \frac{u_4 - u}{u_4 - u_3} M_{3,1}$      $M_{3,2} = \frac{u - u_3}{u_4 - u_3} M_{3,1} + 0$      $M_{4,2} = 0$ $M_{1,3} = 0 + \frac{u_4 - u}{u_4 - u_2} M_{2,2}$    $M_{2,3} = \frac{u - u_2}{u_4 - u_2} M_{2,2} + \frac{u_5 - u}{u_5 - u_3} M_{3,2}$    $M_{3,3} = \frac{u - u_3}{u_5 - u_3} M_{3,2} + 0$

FIG. 65

4 degree : $u_3 \leq u < u_4$

⋮      ⋮      ⋮      ⋮      ⋮

$M_{0,3} = 0$    $M_{1,3} = 0 + \frac{u_4 - u}{u_4 - u_2} M_{2,2}$    $M_{2,3} = \frac{u - u_2}{u_4 - u_2} M_{2,2} + \frac{u_5 - u}{u_5 - u_3} M_{3,2}$    $M_{3,3} = \frac{u - u_3}{u_5 - u_3} M_{3,2} + 0$    $M_{4,3} = 0$ $M_{0,4} = \frac{u_4 - u}{u_4 - u_1} M_{1,3}$    $M_{1,4} = \frac{u - u_1}{u_4 - u_1} M_{1,3} + \frac{u_5 - u}{u_5 - u_2} M_{2,3}$    $M_{2,4} = \frac{u - u_2}{u_5 - u_2} M_{2,3} + \frac{u_6 - u}{u_6 - u_3} M_{3,3}$    $M_{3,4} = \frac{u - u_3}{u_6 - u_3} M_{3,3} + 0$ Trimming flag is "1"  Trimming flag is "0"

20
Trimming curve converted to a polygon
(Trimming polygon)

type = 0 type = 1

4 vertices are valid 3 vertices are valid 2 vertices are valid

Only one vertex is valid

FIG. 80A
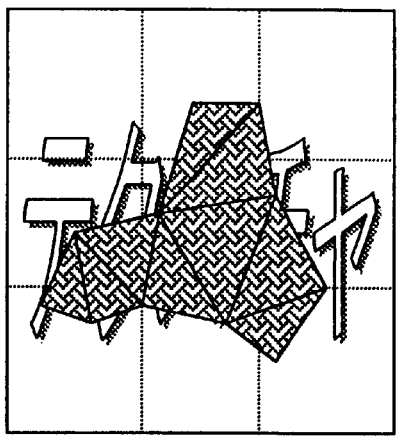
FIG. 80B
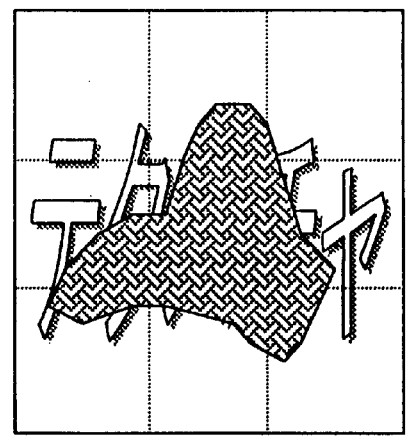
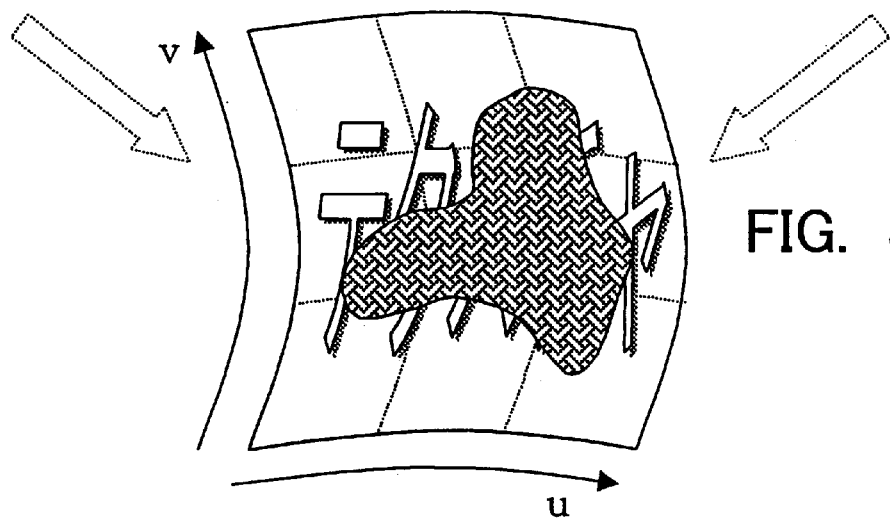
FIG. 80C

FIG. 81A
FIG. 81B
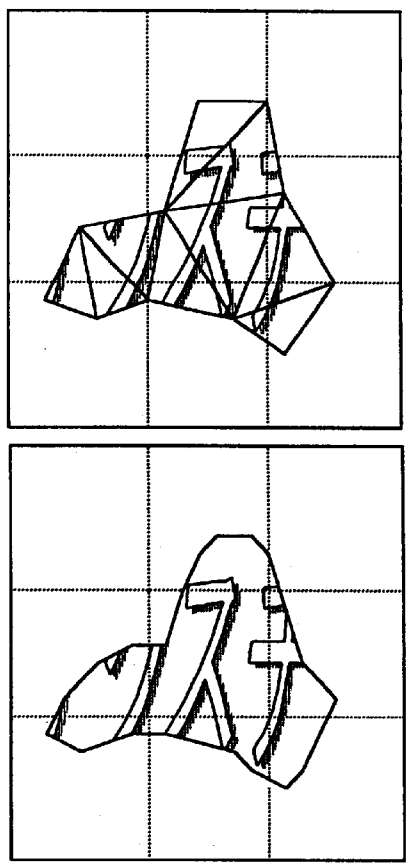
FIG. 81C
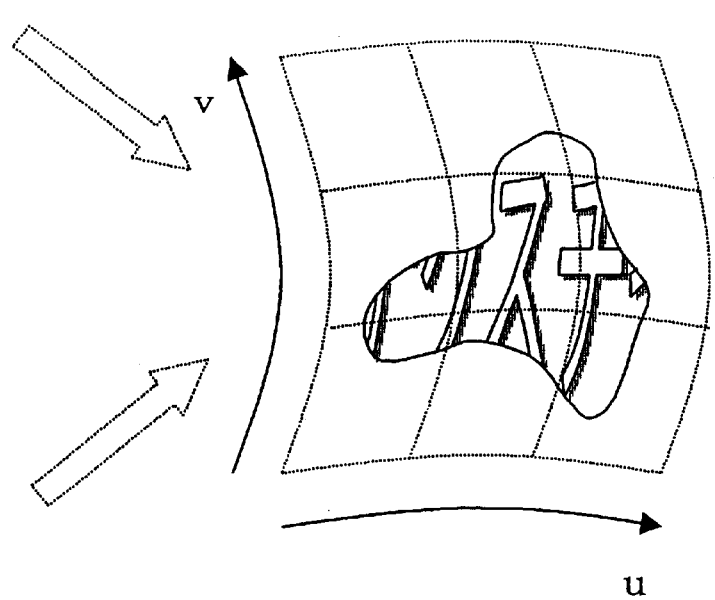

Volume mask

Polygon divided from
NURBS object

<Seen from the front>

Viewpoint  Z

<Seen from the side of viewpoint>

< Seen from the side of viewpoint >

< Seen from the side of viewpoint >

< Seen from the side of viewpoint >

< Seen from the side of viewpoint >

< Seen from the side of viewpoint >

< Seen from the side of viewpoint >

FIG. 85
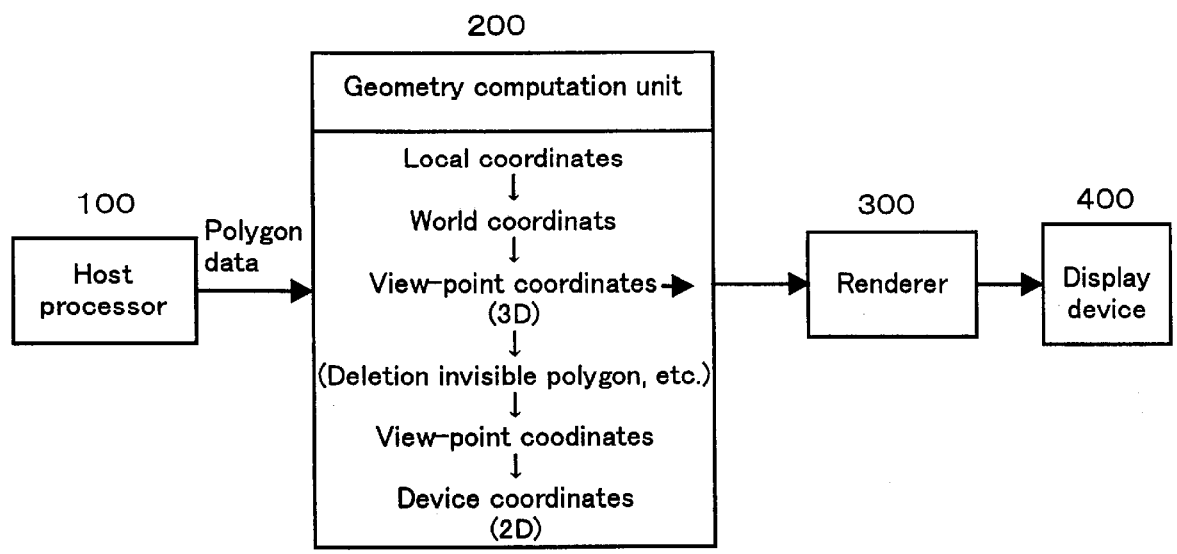
FIG. 86A
FIG. 86C
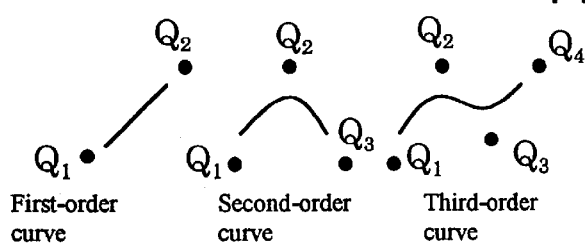
FIG. 86B 4 degree NURBS

POLYGON DATA GENERATION METHOD AND IMAGE DISPLAY APPARATUS USING SAME

BACKGROUND OF THE INVENTION

1. Field of the Invention

The present invention relates to a method for generating polygons, based on a NURBS (non-uniform rational B-spline) model that is modeled on NURBS surfaces that represent parametric surfaces, and to an image display apparatus wherein that method is employed.

2. Description of the Related Art

FIG. 85 is a diagram that describes a general configuration example of a game apparatus that is a conventional image display apparatus wherein polygons are used. Under the control of a host processor 100, multiple polygons that configure an object displayed on a display device 400 are input to a geometry computation unit 200 in correspondence with the advance of a game program.

Polygon data input to the geometry computation unit 200 define polygons in three-dimensional local coordinates each having origin coordinates. The geometry computation unit 200 converts the polygon data defined on the local coordinates to a common world coordinate system for all objects.

Also, the polygon data is converted to three-dimensional viewing-point coordinates, which have the view point placed in this world coordinate system as the origin. The viewing point changes as the game program advances, wherefore the polygon viewing-point coordinates are updated in correspondence with these viewing-point changes.

Next, with the viewing point coordinates as the origin, the object is projected onto a screen corresponding to the screen of the display device 400 on which it is displayed, that is, the polygon data are converted to two-dimensional plane coordinates.

The polygon data converted to two-dimensional plane coordinates are next input to a renderer 300. The renderer 300, based on the polygon data, performs rendering processes such as adding texturing, lighting effects, and RGB color data.

Then the renderer 300 writes the output of its rendering processing to a video RAM, this is repeatedly read out and sent to the display device 400, whereby the object can be displayed.

In recent years, however, technology is being adopted that defines humans and other objects displayed in game apparatuses and the like by NURBS models modeled on NURBS (non-uniform rational B-spline) surfaces representing parametric surfaces generated by three-dimensional computer graphics (CG) modeling tools. These NURBS models constitute a technology well suited to defining objects having curved surfaces.

In other words, when an object is shaped with curved surfaces, the object data volume can be made less by defining the object with a NURBS model than by defining it by a set of polygons.

When technology that defines an object with a NURBS model, such as that described in the foregoing, is assumed, the NURBS model cannot be directly handled by a conventional game apparatus. Firstly, therefore, in the game development apparatus, NURBS models are converted to polygons by CG modeling tools, and these polygon data are stored in the memory of the game device.

At this time, the NURBS surface object will be converted into numerous polygons, so the data volume after conversion to polygons becomes very large. For this reason, a large-capacity memory is required to store those data.

It is possible here to reduce the number of polygons configuring one object, depending on the size of the object that is displayed on the screen. For example, the greater the distance becomes from the coordinate position of the viewing point, the smaller becomes the size of the object displayed on the screen, and the fewer may be the polygons that configure the object.

However, with technology which uses objects wherein NURBS surfaces have been divided into polygons beforehand in a game device such as that supposed above, the number of polygons configuring a displayed object is not changed, irrespective of the size thereof. For that reason, the same number of polygons must be processed for each object, irrespective of the display size thereof, and, even if one polygon is smaller than 1 pixel, polygon processing becomes necessary.

Furthermore, it is possible to subject NURBS surface objects to geometry computation processing, not at the polygon vertex data stage but at the NURBS surface control point stage. However, with game devices wherein NURBS surface objects are used, such as is supposed above, geometry computation processing is performed at the polygon vertex data stage, wherefore the processing load becomes heavy.

Furthermore, when NURBS surface objects are deformed, it is necessary for a large volume of polygon vertices to be controlled by the host processor, and for a large volume of polygon data to be transferred over a bus connecting the host processor and the geometry computation unit, wherefore a very high bus band is required.

Also, the more complex a NURBS model surface shape is, the greater increase there is in the volume of computations necessary to find one point (that is, one [set of] vertex coordinates for a polygon) on the NURBS model.

That being so, the more complex the surface shape of a NURBS model is, the more voluminous becomes the processing for converting from NURBS models to polygons, whereupon there arises a danger that the real-time processing ability required by the game apparatus may be impaired.

Now, even in cases where the NURBS model has a complex surface shape, as was mentioned earlier, if that model is positioned a far distance from the viewing point, and the size of the object displayed on the screen is small, that complex surface shape cannot be visually discerned by the player.

Accordingly, when the size of an object on the screen is small, there is no need to faithfully reproduce the shape thereof using a large quantity of polygons, and there will be no problem in simplifying to some degree the surface shape of the NURBS model. If the surface shape of a NURBS model is simplified, the number of polygons converted can be reduced, making it possible also to reduce the polygon data volume. The volume of computations for finding points on the NURBS model will also be diminished, wherefore the conversion process can be speeded up. Alternatively, instead of simplifying the curved surface shape of the NURBS model, it is possible merely to reduce the number of surface sampling points.

However, with a method for converting NURBS models to polygons (i.e. dividing a model into a plurality of polygons) and generating polygons in the game development apparatus supposed in the foregoing, the NURBS models are not simplified, no matter the size of the objects displayed, and, even when the size of a NURBS model of complex shape is small, the points on the NURBS model are computed, and division is made into polygons, for that surface shape as is.

For that reason, conventional game devices (image display devices) require high-capacity memories for storing very large volumes of polygon data, and the polygon data computation means (CPU, etc.) are subjected to heavy loads.

SUMMARY OF THE INVENTION

An object of the present invention, accordingly, is to provide an efficient polygon generation method in technology for converting NURBS surface objects to polygons, and an image display apparatus that uses that method.

Another object of the present invention is to provide a polygon generation method, in technology for converting NURBS surface objects to polygons, wherewith it is possible to reduce the memory capacity for storing post-conversion polygons, together with an image display apparatus that uses that method.

Yet another object of the present invention is to provide a polygon generation method, in technology for converting NURBS surface objects to polygons, wherewith it is possible to reduce the volume of polygon data and other data transferred between a polygon drawing processor (rendering processor) and a host processor, together with an image display apparatus that uses that method.

Still another object of the present invention is to provide a polygon generation method, in technology for converting NURBS surface objects to polygons, wherewith, by directly processing NURBS surface object data, both the volume of computations for converting from the NURBS surface objects to polygons and the load imposed on the processor that draws the polygons can be optimized, together with an image display apparatus that uses that method.

Yet another object of the present invention is to provide a polygon generation method, in technology for converting NURBS surface objects to polygons, wherewith, by directly processing NURBS surface object data, it is possible to optimize the degree of detail in the NURBS surface object according to the displayed size, together with an image display apparatus that uses that method.

Yet another object of the present invention is to provide a polygon generation method and an image display apparatus that uses that method, in technology for converting NURBS models to polygons and generating polygons, wherewith the polygon data volume can be reduced.

Yet another object of the present invention is to provide a polygon generation method and an image display apparatus that uses that method, in technology for converting NURBS models to polygons and generating polygons, wherewith the conversion processing volume can be reduced.

Still another object of the present invention is to provide a trimming curve processing method that maximally simplifies the computations for trimming when directly handling NURBS surface model data, together with a three-dimensional image processing system that uses that method.

Yet another object of the present invention is to provide a trimming curve processing method that makes it possible to draw trimmed NURBS surface models in real time, together with a three-dimensional image processing system that uses that method.

The polygon generation method and image display apparatus using that method which achieve the objects of the present invention noted in the foregoing, in terms of their basic features, coordinate-convert NURBS object data to coordinates having the viewing point at the origin, in conjunction with the advance of a program, determine the degree of detail wherewith objects are drawn on a display, find the number of polygon divisions when NURBS object data are converted to objects configured by polygons, in accordance with the determined degree of detail wherewith the objects are drawn, and compute vertices of the polygons converted to in accordance with that number of divisions. Rendering processing is also performed on the polygons configured by the vertices computed.

In the basic features noted above, in terms of a specific mode, polygons wherein—of the vertices computed as noted above, all of the vertices are dislocated from the display screen displayed on the display device noted earlier—are removed, and vertex attribute values are computed for the vertices of the remaining polygons.

Furthermore, in one mode, the outer products of two sides of polygons sharing the vertices computed as noted above are found, the fronts and backs of the polygons are determined from the direction of the outer products found and the direction of the viewing point, and the backward polygons are removed, after which vertex attribute values are computed for the vertices of the remaining polygons. (Polygons having front-and-back display attributes, however, are not removed.)

Furthermore, in one mode, a characteristic is that the degree of detail wherewith the objects noted above are drawn is determined according to the display surface area of the display device noted above and to the proportion of that display surface area occupied by the objects displayed.

Furthermore, in a different mode, the degree of detail wherewith the objects noted above are drawn is adjusted by the program, for each execution scene contained in the program, so that the rendering processing for the polygon data generated as noted above is not overloaded.

The trimming curve processing method that achieves the object of the present invention noted earlier, in terms of its basic configuration, generates a two-dimensional array having a size equivalent to the number of vertices in the u and v directions corresponding to a parametric curved surface displayed by a plurality of vertices in the u and v directions in parametric space. Then the trimming curves on the parametric surface noted above are converted to polygons by straight line segments on the two-dimensional array noted above. Then decisions are made as to whether to make vertices inside the polygons so converted to be valid or invalid.

Other objects and features of the present invention will be made clear from embodiment aspects of the invention described with reference to the following drawings.

BRIEF DESCRIPTION OF THE DRAWINGS

FIG. 5 is a diagram giving one example of the correlation between the LOD and the estimated value Sc for the surface area of a screen occupied by an object;

FIG. 14 is a diagram representing the expansion of the NURBS surface diagrammed in FIG. 13;

FIG. 15 is a diagram for describing a first method for simplifying a NURBS model;

FIG. 16 is a diagram of an example wherein the degree of a 4×4 degree NURBS surface is lowered;

FIG. 17 is a diagram representing a blending function M required for computing point P in formula 3;

FIG. 18 is a diagram representing an example of a correspondence table for LODs and degree when the degree in a NURBS model is 4 prior to simplification;

FIG. 19 is a diagram for describing another method for the first method;

FIG. 20 is a diagram representing an example correspondence table for LODs and degree in the other method for the first method;

FIG. 21 is a diagram representing an example of simplifying a 4×4 degree NURBS surface to a 3×3 degree NURBS surface;

FIG. 23 is a diagram for describing an example of simplifying a 3×3 degree NURBS surface to a 2×2 degree NURBS surface;

FIG. 24 is a diagram representing an example of a correspondence table for degree and number of control points corresponding to the LOD when the number of control points defining the NURBS model before simplification is 7×7 and the degree is 4;

FIG. 25 is a diagram that represents in model form the condition of the control point matrixes and shapes of the NURBS models corresponding to the table given in FIG. 24;

FIG. 31 is a diagram for describing a 4×4 degree spherical NURBS model made up of 8×7 control points;

FIG. 32 is a diagram showing how the NURBS model in FIG. 31 is expanded in model form;

FIG. 57 is a diagram for describing an example of a Cox-deBoor recurrence formula;

FIG. 58 is an example of computations for a 5-degree NURBS curve;

FIG. 59 is a diagram for describing the order of steps performed according to the principle described in FIG. 57;

FIG. 63 is a diagram representing processing sequences for the computation device diagrammed in FIG. 62;

FIG. 64 is a diagram for describing the characteristics of B-spline blending functions employed in adjacent patches when there are many patches;

FIG. 65 is a diagram representing a computation sequence for calculating a 4-degree blending function;

FIG. 71 is a diagram wherein FIG. 70 is redrawn in order to describe the determination of validity and invalidity of vertices that are inside a trimming polygon 20;

FIG. 80 depicts another example of applying a different texture to the trimming area, in the method diagrammed in FIG. 79;

FIG. 81 depicts an example wherein, in the method diagrammed in FIG. 79, only the trimming portion defined is displayed, while the other portions are processed as transparent pixels and not displayed;

FIG. 85 is a diagram for describing an example of a general configuration for an image display apparatus wherein conventional polygon data are used;

FIG. 86 is a diagram for describing NURBS curves that are prerequisite to a NURBS surface;

DESCRIPTION OF THE PREFERRED EMBODIMENTS

Figure 1:
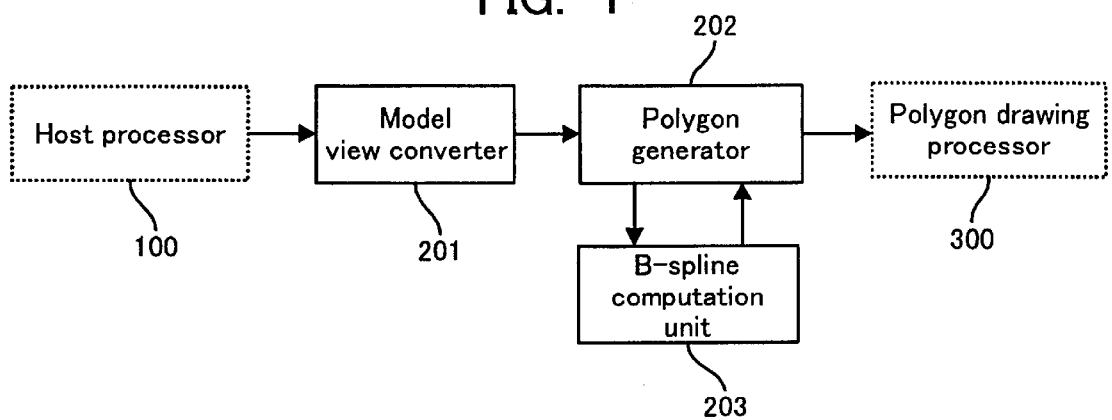
FIG. 1 is a conceptual block diagram of an example configuration of an image display apparatus that uses technology for converting into polygons the NURBS surface objects that are in view in the present invention.

Embodiment aspects of the present invention are now described with reference to the drawings. In the drawings, the same or similar items are indicated by the same reference number or reference symbol.

Before describing embodiments of the present invention, the NURBS models which are in view in the present invention are described in order to facilitate comprehension of the present invention.

A NURBS surface can be defined as a configuring element in a NURBS model that is formed by a number of control matrixes equal to the degree (if 4×4 degrees, for example, then 16 matrixes, for example). FIG. 86 is a diagram for describing the NURBS curves that configure a NURBS surface in a NURBS model.

NURBS curves are formed by "weighted control points," "degrees" that indicate how many control points affect the curve, and "knot strings" (also called "knot vectors") that are parameters used in determining blending functions that mix the control points together.

The fundamental format of a weighted control point Qi has three-dimensional coordinates (x, y, z) and a weight ω. The degree K is expressed by the relationship (degree=order+1).

In FIG. 86A, a first-order curve is formed by two control points $Q_1$ and $Q_2$ when the degree is 2. In FIG. 86B, a second-order curve is formed by three control points $Q_1, Q_2$, and $Q_3$ when the degree is 3. And in FIG. 86C, a third-order curve is formed by four control points $Q_1, Q_2, Q_3$, and $Q_4$ when the degree is 4.

A knot string format is expressed by elements $u_0$, $u_1$, $U_2$, ..., $u_m$, with the number of elements being the number of control points plus the degree. A point P(u) on a NURBS curve is found by formula 1 below.

$$P(u) = \frac{\sum_{i=i\min}^{i\max} M_{i,k}(u)\omega_i Q_i}{\sum_{i=i\min}^{i\max} M_{i,k}(u)\omega_i} \quad (1)$$

where $i_{max}-(i_{min}-1)$=degree K $M_{i,k}(u)$ is a blending function that is found by the Cox-deBoor recurrence formula given in formula 2 below.

$$M_{i,k}(u) = \frac{u - u_i}{u_{i+k-1} - u_i} M_{i,k-1}(u) + \frac{u_{i+k} - u}{u_{i+k} - u_{i+1}} M_{i+1,k-1}(u) \quad (2)$$

(where 0/0=0)
where, when k=1, $M_{i,1}(u)$=1 ($u_i \leq u < u_i+1$)
0 ($u<u_i$, $u_i+1 \leq u$)

Figure 87:
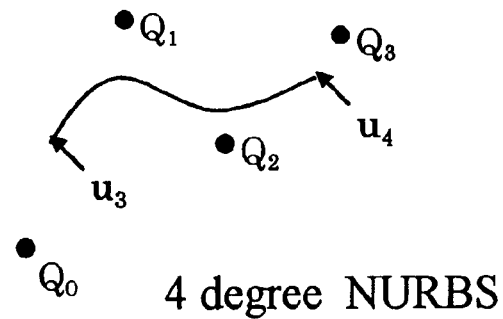
FIG. 87 is a diagram of an example wherein a NURBS curve is formed by four control points ($Q_0$ to $Q_3$) and 4 degrees (hence a third-order curve)

In a case, for example, where a NURBS curve is formed by 4 control points ($Q_0$ to $Q_3$) and 4 degrees (hence a 3rd-order curve), as diagrammed in FIG. 87, the knot string must have 8 [elements], i.e. $u_0$, $u_1$, $u_2$, ..., $u_7$. The blending functions required are 4 in number, as diagrammed in FIG. 88, namely $M_{0,4}(u)$, $M_{1,4}(u)$, $M_{2,4}(u)$, and $M_{3,4}(u)$. The Cox-deBoor recurrence formula is then expanded and it is seen that the curve exists within the range $u_3 \leq u < u_4$.

Figure 89:
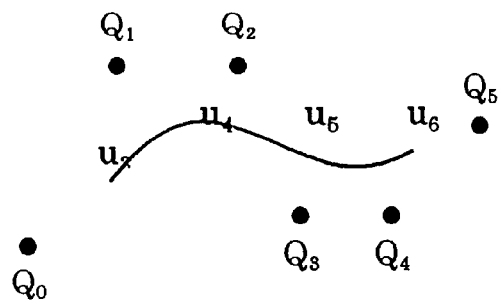
FIG. 89 is a diagram for describing an example wherein a complex NURBS curve is formed by connecting a number of segments.

Furthermore, by increasing the degree, the NURBS curve is formed complexly, but, as diagrammed in FIG. 89, a NURBS curve of degree 4 is usually made one segment, and a complex NURBS curve is formed by connecting a number of segments.

When adjacent segments are formed, however, the parameters are used while being shifted little by little, as in the example described below. In this example, a NURBS curve of degree 4 is assumed.

In FIG. 89, the curve segment 1 has the control points $Q_0$, $Q_1$, $Q_2$, and $Q_3$, the knot string is $u_0$, $u_1$, $u_2$, $u_3$, $u_4$, $u_5$, $u_6$, $u_7$ (with the curve existing in $u_3 \leq u < u_4$), and the blending functions are $M_{0,4}(u)$, $M_{1,4}(u)$, $M_{2,4}(u)$, and $M_{3,4}(u)$.

Similarly, the curve segment 2 has the control points $Q_1$, $Q_2$, $Q_3$, and $Q_4$, the knot string is $u_1$, $u_2$, $u_3$, $u_4$, $u_5$, $u_6$, $u_7$, $u_8$ (with the curve existing in $u_4 \leq u < u_5$), and the blending functions are $M_{1,4}(u)$, $M_{2,4}(u)$, $M_{3,4}(u)$ and $M_{4,4}(u)$.

In like manner, the curve segment 3 has the control points $Q_2$, $Q_3$, $Q_4$, and $Q_5$, the knot string is $u_2$, $u_3$, $u_4$, $u_5$, $u_6$, $u_7$, $u_8$, $u_9$ (with the curve existing in $u_5 \leq u < u_6$), and the blending functions are $M_{2,4}(u)$, $M_{3,4}(u)$, $M_{4,4}(u)$, and $M_{5,4}(u)$.

For the entire curve, the control points are 6 in number, namely $Q_0$ to $Q_5$, there are 10 knot strings, namely $u_0$ to $u_9$, and there are six types of blending function, namely $M_{0,4}(u)$ to $M_{5,4}(u)$ (requiring recomputation every time the value of u is changed).

Further generalizing this, in order to form m segments of a NURBS curve of K degree, (K−1+m) control points and (2K−1+m) knot strings are required, and there will be (K−1+m) types of blending functions.

Figure 90:
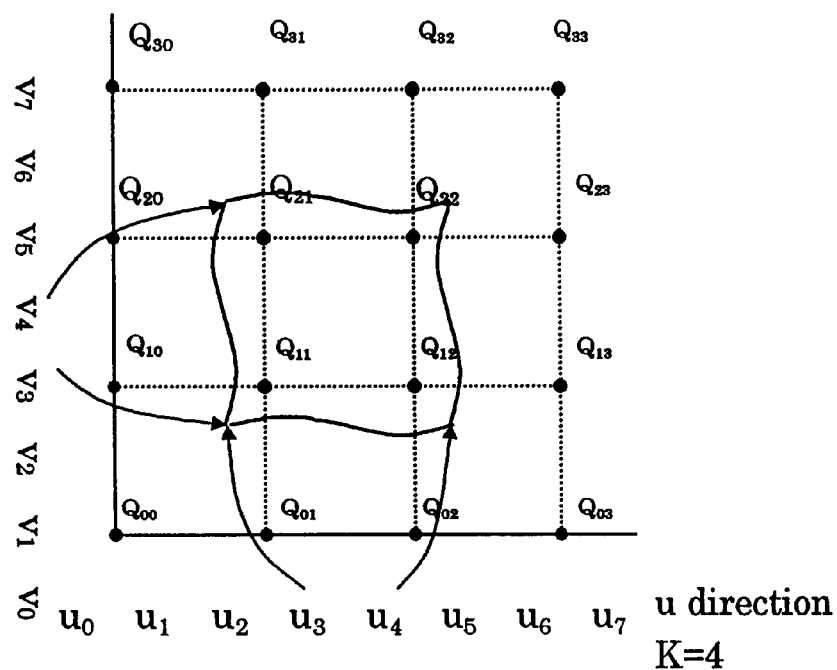
FIG. 90 is a diagram for describing a NURBS surface.

By extending the NURBS curve described in the foregoing, a NURBS surface and then a NURBS model are obtained. Considering the NURBS surface diagrammed in FIG. 90, this NURBS surface is basically an application of NURBS curves.

One more knot string (called the v knot string) is also defined in addition to the knot string (called the u knot string) defined when forming a NURBS curve. Then the control points are defined in a matrix pattern on u and v coordinates.

Weighted control points $Q_{ij}$ (having the weight ω with three-dimensional coordinates: x, y, z) and the degrees K and L for the u direction and v direction are given. This yields the knot strings $u_0$, $u_1$, $u_2$, ..., $u_m$, $v_0$, $v_1$, $v_2$, ..., $v_n$ (with the number of elements for each direction being the number of control points+degree).

Using the parameters described above, points P(u,v) are found on the data that form the NURBS surface by formula 3 given below.

$$P(u,v) = \frac{\sum_{i=i\min}^{i\max} \sum_{j=j\min}^{j\max} M_{i,K}(u)N_{j,L}(v)\omega_{ij}Q_{ij}}{\sum_{i=i\min}^{i\max} \sum_{j=j\min}^{j\max} M_{i,K}(u)N_{j,L}(v)\omega_{ij}} \quad (3)$$

where $i_{max}-(i_{min}-1)$=K and $j_{max}-(j_{min}-1)$=L $M_{i,K}(u)$ and $N_{j,L}(v)$ are blending functions which are found, respectively, by the following Cox-deBoor recurrence formulas.

$$M_{i,k}(u) = \frac{u - u_i}{u_{i+k-1} - u_i} M_{i,k-1}(u) + \frac{u_{i+k} - u}{u_{i+k} - u_{i+1}} M_{i+1,k-1}(u) \quad (4)$$

(where 0/0=0)
where, when k=1, $M_{i,1}(u)$=1 ($u_i \leq u < u_{i+1}$)
0 ($u<u_i$ or $u_{i+1} \leq u$)
Formula 4 above is identical to formula 2 given earlier.

$$N_{j,l}(v) = \frac{v - v_j}{v_{j+l-1} - v_j} N_{j,l-1}(v) + \frac{v_{j+l} - v}{v_{j+l} - v_{j+1}} N_{j+1,l-1}(v) \quad (5)$$

where, when l=1, $N_{j,1}(v)$=1 ($v_j \leq v < v_{j+1}$)
0 ($v<v_j$ or $v_{j+1} \leq v$)

As described in the foregoing, points P(u,v) on the NURBS surface can be found as [sets of] three-dimensional coordinates: x, y, z. However, in an ordinary computer graphics system, there are the three types of attribute data noted in the following example in addition to these three-dimensional coordinate data.

(1) Two-dimensional texture coordinates: s, t (2) Normal vectors: (Nx, Ny, Nz)

(3) Colors: R, G, B, and translucent: α

One example of a method for finding the attribute data for points P(u,v) on a NURBS surface is the method wherewith the attribute data noted below are added to the control points $Q_{ij}$ and the same computation formulas are used as with three-dimensional coordinates.

That is, the format for the weighted control point $Q_{ij}$ comprises three-dimensional coordinates: x, y, z; two-dimensional texture coordinates: s, t; normal vector: (Nx, Ny, Nz); color or semitransparent: R, G, B, α; and weight: ω. Other than the weight: ω, these parameters are applied in the computation formulas for P(u,v), $M_{i,K}$, and $N_{j,l}$ described earlier.

Furthermore, when forming a complex NURBS model, complex NURBS surfaces are formed by making a NURBS surface of degree 4 or so into a single patch, and connecting a number of patches. In the case of surfaces also, the parameters are used while being shifted little by little when forming adjacent patches. The control points are defined in a matrix pattern, furthermore, and knot strings and blending functions (found from knot string values) are defined for the u and v directions.

Accordingly, generalizing this, in order to form m×n patches of NURBS surfaces of K degree×L degree, the number of control points required is (K−1+m)×(L−1+n) and the number of knot strings required is (2K−1+m) in the u direction and (2L−1+n) in the v direction. Also required are (K−1+m) blending functions in the u direction and (L−1+n) blending functions in the v direction.

FIG. 1 is a conceptual block diagram of an example configuration of a game apparatus that constitutes an image display apparatus which uses technology for converting into polygons the NURBS surface objects described in the foregoing, such as is in view as an image display apparatus which employs a polygon generation method according to the present invention.

Comparing this with a conventional system comprising a geometry computation unit 200 as diagrammed in FIG. 85, with the image display apparatus which employs technology for converting the NURBS surface objects in view in the present invention to polygons, the configuration corresponding to the geometry computation unit 200 is configured by a model view converter 201, a polygon generator 202, and a B-spline computation unit 203.

In FIG. 1, moreover, the data output under the control of a host processor 100 are not polygon data, but rather object data configured on the NURBS surfaces described in the foregoing.

Figure 2:
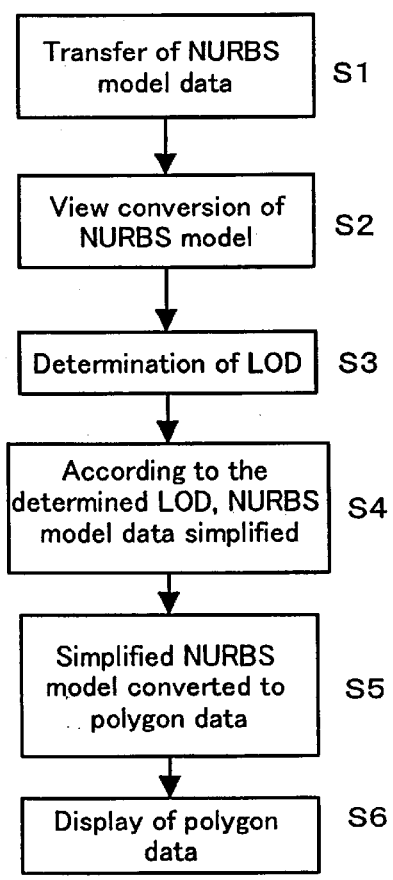
FIG. 2 is a simplified operation flow diagram for describing the operation of the configuration diagrammed in FIG. 1, wherein a polygon data generation method is adopted which follows the present invention.

FIG. 2 is a simplified operation flowchart for a polygon generation method according to the present invention for describing the operation of the configuration diagrammed in FIG. 1.

In implementing the present invention, described below in detail, in addition to implementing by incorporating hardware in the image display apparatus, it is also possible to implement by executing and controlling a program stored on a recording medium (not shown) in the image display apparatus or, alternatively, by means of firmware.

Further describing the operation of the configuration diagrammed in FIG. 1, referring to FIG. 2, NURBS surface object data are transferred to the model view converter 201 in conjunction with the advance of the program by the control of the host processor 100 (step s1).

In the model view converter 201, model view conversion (step S2) and the level of detail (LOD) wherewith objects are drawn, which is a feature of the present invention, are determined (step S3) for the NURBS surface object data.

Here the model view conversion converts the coordinates of the NURBS surface object data obtained with local coordinates to world coordinates, and further converts those to viewing point coordinates (in a coordinate system having the viewing point as the origin and depth as the Z axis).

These conversion processes are performed by multiplying the control point coordinates contained in the NURBS surface object data with the object conversion matrixes sent from the host processor 100.

Although the determination of the LOD is described by specific example subsequently, after the model view conversion, the determination thereof is made based on the size of the object projected on the screen. Values are prepared beforehand for expressing the size of the object in the object data. By means of these values, the size of an object when projected on the screen can be known by projection onto the screen.

Next, as another feature of the present invention, the number of polygon divisions is found according to the determined LOD, and the vertices of the polygon to be divided are computed (step S4).

Further description is now given concerning the LOD determination noted above and the number of polygon divisions.

Figure 3:
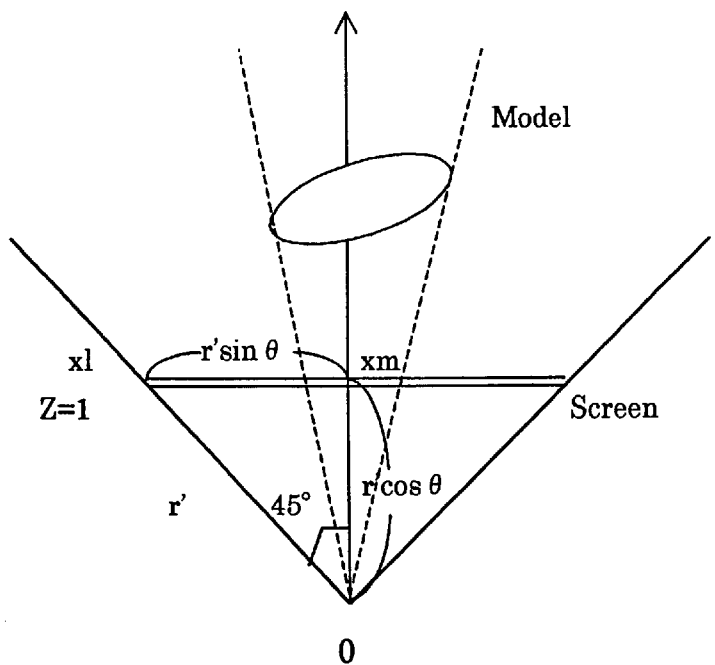
FIG. 3 is an explanatory diagram for finding, as an estimated value Sc, the proportion of the surface area occupied on a screen when an object is projected on the display screen.

FIG. 3 is an explanatory diagram for finding, as an estimated value Sc, the proportion of the surface area occupied on a screen when an object is projected on the display screen.

The LOD is determined by a method described below using this estimated value Sc and the screen resolution R. A z coordinate is given from the viewing point in the center forward direction, and viewing angles which are deployed above and below and to the left and right of the center line, subtending angles of 45° each, are made references.

In FIG. 3, assuming a viewing angle of 45° so that there is 90° when both sides are combined, if So is the size of the object (model), Z the depth in the viewing point coordinate system with the object as the reference point, Aud the viewing angle coefficient in the up and down dimension, Alr the viewing angle coefficient in the left and right dimension, and C a coefficient for making adjustments given by the user, then Sc=(So/Z)²×Aud×Alr×C.

The viewing point coefficient is determined in inverse proportion to the size of the screen itself. If r' is the distance from the viewing point O to the edge xl of the screen and the distance from the viewing point O to the center xm of the screen is taken as 1, then r' cos θ'=1.

When θ'=45°, the length from the center of the screen to the edge (xl−xm) is (xl−xm)=r' sin θ'=1.

Figure 4:
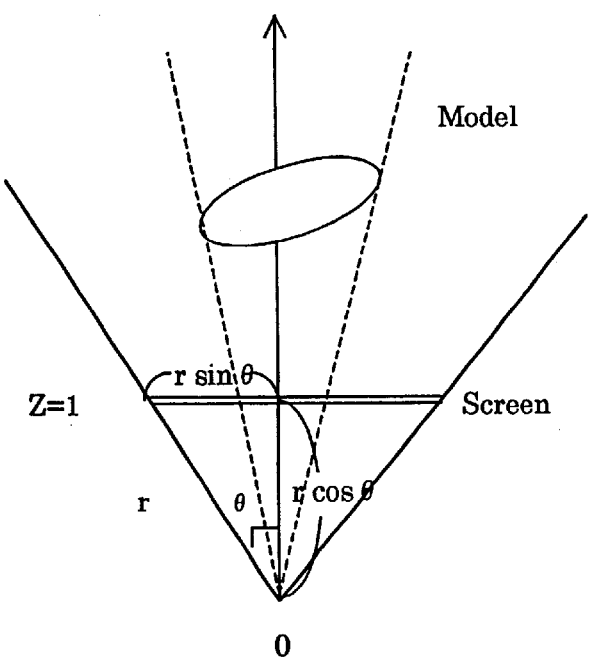
FIG. 4 is a generalized diagram for cases where the explanatory diagram given in FIG. 3 is any angle θ.

Next, when we investigate cases for any angle θ, we get the diagram given in FIG. 4. Also, since we have the following trigonometric relationship $$\tan\theta = \frac{r\sin\theta}{r\cos\theta}$$

the length r sin θ from the center of the screen to the edge with an angle of θ is found.

Here the distance from the viewing point to the screen is 1, irrespective of the viewing angle, wherefore r cos θ=r' cos θ'=1 and, accordingly, r sin θ=tan θ.

The viewing angle coefficients Aud and Alr are determined in inverse proportion to the size of the screen itself. If θ=30°, for example, the value of r sin θ, by substitution in the formula above, is 1/√3, wherefore the viewing angle coefficient is √3.

The LOD is determined by the estimated value Sc of the area of the screen occupied by the object, found as described above, and the screen resolution parameter R. When the depth dimension Z in the viewing point coordinate system for the object reference point changes from some value to twice that value, the value of Sc changes to ¼ its original value, and the LOD value is thereupon incremented (+1).

Figures 5A, 5B, 6, 7:
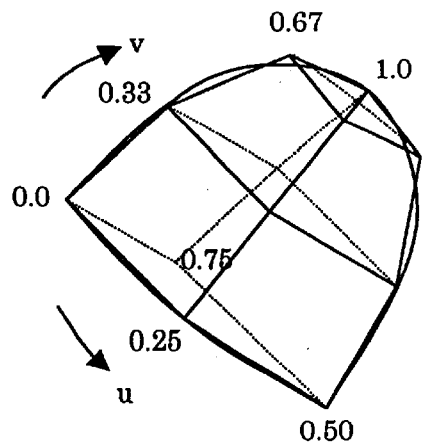
FIG. 6 is a table representing one example of the correlation between the LOD and the number of u and v divisions.
FIG. 7 is a diagram of one example of an object.

If it is assumed that there are 4 types of LOD and N is a constant, for example, the relationship noted in FIG. 5A is realized.

There is also, depending on the type of game in view, etc., the element of wishing to display objects more finely (that is, make the value of LOD as small as possible) the higher the screen resolution is.

If the screen resolution is changed from 800×600 to 1024×768, for example, the number of pixels on the whole screen increases from 480,000 to 780,000. By that proportion (78/48 =1.625), the Sc section wherein the LOD is maintained at a small value is made larger.

Accordingly, when this is applied to the example noted earlier, the relationship diagrammed in FIG. 5B is obtained.

The number of divisions in polygons converted in the u and v directions of a model is determined by the LOD that is determined in this manner.

In a case where, for example, a user has given the relationship between the LOD and the number of u and v divisions as in the table given in FIG. 6, an object such as that diagrammed in FIG. 7 will be converted to a plurality of polygons, as diagrammed, when LOD =2.

In FIG. 7, however, in order to simplify the explanation, square polygons are being converted, but in actuality triangular polygons are formed. This is done in order to avoid the display becoming unnatural when the square polygons are distorted.

Returning the description to FIG. 1, polygon vertex coordinates and vertex attribute data are computed from the NURBS surface object data by the polygon generator 202 and the B-spline computation unit 203, according to the number of polygons to be converted as determined by the model view converter 201, based on the LOD as described in the foregoing.

The polygon generator 202 then generates polygon data from the computed polygon vertex coordinates and vertex attribute data and transfers those to a polygon drawing processor 300. The polygon drawing processor 300 has functions which correspond to those of the renderer 300 described earlier in conjunction with FIG. 85 (step S5).

The B-spline computation unit 203 is initialized with B-spline function knot vectors sent from the polygon generator 202, and returns the B-spline function values to the polygon generator 202 according to the parameter values and degree values on the surface given.

Further, at the stage of generating the polygon data noted above (step S5), in addition to the vertex coordinates, texture coordinates, normal vectors, and such vertex attribute data as vertex colors are computed. These attribute data computations are performed, after the computation of the polygon vertex coordinates, for the polygons that remain after removing invisible polygons.

Then, in the polygon drawing processor 300, rendering processing is performed and the polygon data are sent to a display device (not shown) in FIG. 1 (step S6).

The steps described above, which are features of the present invention, are now described in greater detail as based in embodiments.

Figures 8, 9:
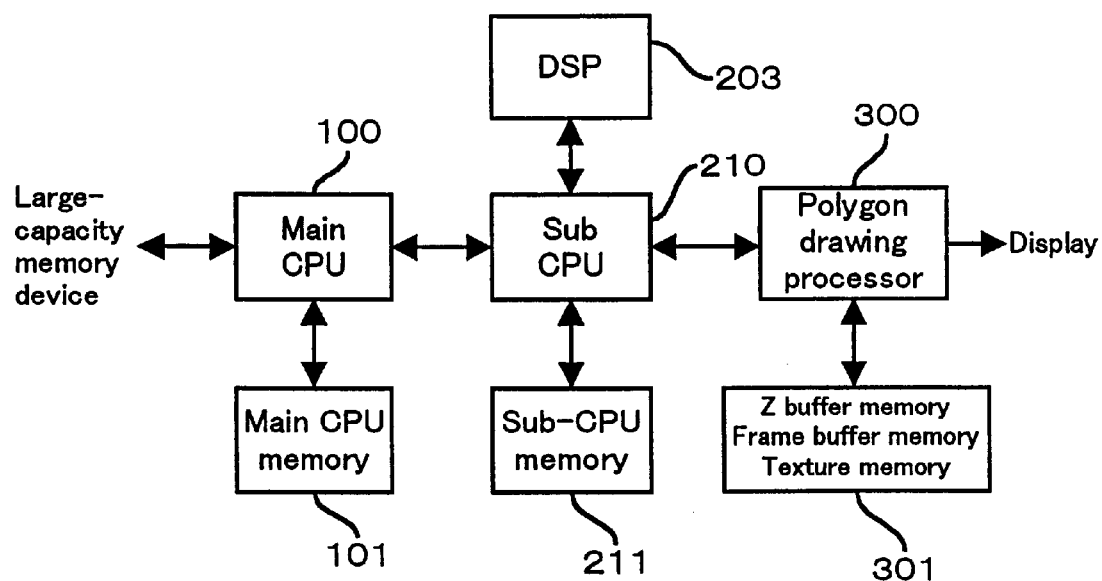
FIG. 8 is a configuration diagram for an embodiment of the image display apparatus of the present invention.
FIG. 9 is a diagram representing a table formed of data for determining the number of divisions into polygons.

FIG. 8 is a configuration diagram for an embodiment of an image display apparatus wherein the present invention is employed. In FIG. 8, the configuration of the host processor 100 of FIG. 1 corresponds to a main CPU 100 and a main CPU memory 101. For the polygon drawing processor 300 is provided a polygon drawing processor memory 301 that incorporates a Z buffer memory for rendering processing, a frame buffer, and a texture memory.

The functions of the model view converter 201 and polygon generator 202 of FIG. 1 are performed by a sub-CPU 210 and a sub-CPU memory 211. The functions of the B-spline computation unit 203 are performed by a DSP (digital signal processor) 203.

The main CPU 100 is connected to a large-capacity memory device (not shown) and the NURBS surface object data stored therein are transferred to the sub-CPU 210. The NURBS surface object data contain the following data.

(1) Data relating to the shape of NURBS surface objects (comprising values of world coordinates or object local coordinates); (2) data relating to texture coordinates when the NURBS surface object has texture; (3) data relating to normal vectors when the NURBS surface object requires normal vectors in the rendering done by the polygon drawing processor 300; (4) data relating to vertex color when the NURBS surface object requires color; and (5) data representing object size.

The data listed in (1) to (5) above also contains the following data. (6) The number of control points Qij in the u and v directions represented in FIG. 85; (7) control point coordinates and weight: in the case of a NURBS surface, this has the structure of a two-dimensional matrix in the u and v directions, and each of the control points Qij in the two-dimensional matrix has three-dimensional space coordinate values (x, y, z). Each of these control points also has a value for the weight $\omega$; (8) degree (order+1) values for B-spline functions (functions independent of weight $\omega$) in the u and v directions, respectively; and (9) knot vectors for defining B-spline functions for the u and v directions, respectively, etc.

Here, in addition to the NURBS surface object data noted above in (1) to (5), model view conversion matrixes for converting object coordinates to viewing point coordinates and data for determining the number of polygon divisions by the LOD are transferred from the main CPU 100 to the sub-CPU 210.

The sub-CPU 210 converts the NURBS surface objects sent from the main CPU 100 to viewing point coordinates. This conversion is performed by the multiplication of the control point coordinates contained in the NURBS data relating to the shape of the NURBS surface objects with the model view conversion matrixes transferred from the main CPU 100 as noted above.

The sub-CPU 210, after converting the objects to viewing point coordinates, determines the LODs of those objects according to the size of the objects when projected on the screen. Values for expressing the sizes of objects are prepared beforehand in the NURBS data for those objects. The sizes of objects when projected on the screen of a display device can be easily discerned from those values.

The number of polygon divisions is determined from the LODs of objects determined as noted above and from data sent from the main CPU 100 for determining the number of divisions in polygons by the LODS.

The data for determining the number of divisions in polygons is formed into a table such as that given in FIG. 9, for example. That is, in FIG. 9, the number of divisions is given in the u direction and in the v direction, in correspondence with the LODs.

In this manner, the number of polygon divisions is determined by data sent from the main CPU 100 for that purpose. Therefore, a user can, in the programming stage, set the number of divisions so that the values contained in the data for determining the number of polygon divisions do not overtax the polygon drawing processor 300.

Next, the sub-CPU 210 generates polygon data from the NURBS surface object data (corresponding to step S5 in FIG. 2). This is performed in the following three stages.

In the first stage, the surface of the NURBS surface object is sampled at suitable intervals and the polygon vertex coordinates are computed.

In the second stage, from the polygons made up by the computed vertex coordinates, those polygons wherein all of the vertex coordinate values are not contained in the two-dimensional screen display area are removed (in a clipping process), and those polygons which are made invisible by the front-back determination are also removed.

In cases where only some of the vertices fall outside the two-dimensional screen display area, new vertices are defined at the edges of the two-dimensional screen display area. And polygons having the attribute of front-and-back display are generated from NURBS surface objects having the front-and-back display attribute.

In the third stage, the vertex attribute values (texture coordinates, normal vectors, vertex color) for the polygons (vertices) not removed by the aforesaid clipping and front-back judgment are sampled from the surface of the NURBS surface object. The vertex data so obtained are transferred as polygon data to the polygon drawing processor 300.

The omission of the attribute data described above is now described with reference to the drawings. As diagrammed in FIG. 13, for example, it is assumed that a portion of a figure resulting from the polygon conversion of a NURBS surface model shaped like a Japanese temple bell is displayed on the screen.

The method of converting NURBS surface models to polygons is that of performing computations to determine sampling points on the NURBS surface, as described in the foregoing, and then connecting those sampling points.

This method is applied not only to vertex coordinates but also to such attribute data as texture coordinates, normal vectors, and vertex color.

That being so, in the polygon conversion stage, the computation of attribute data for polygons positioned completely off the screen, or polygons that, though within the screen, are facing backward, can be omitted. The computation of attribute data for polygons having the front-and-back display attribute, however, cannot be omitted, even if those polygons are facing backward. When the NURBS surface depicted here in FIG. 13 is expanded, the result is as depicted in FIG. 14.

If all of the vertices configuring a polygon are off the screen, that polygon can be said to be positioned completely off the screen. If the outer product of two sides configuring a polygon is computed, it is possible to make a front-back determination therefor by the sign of that product.

Figure 13:
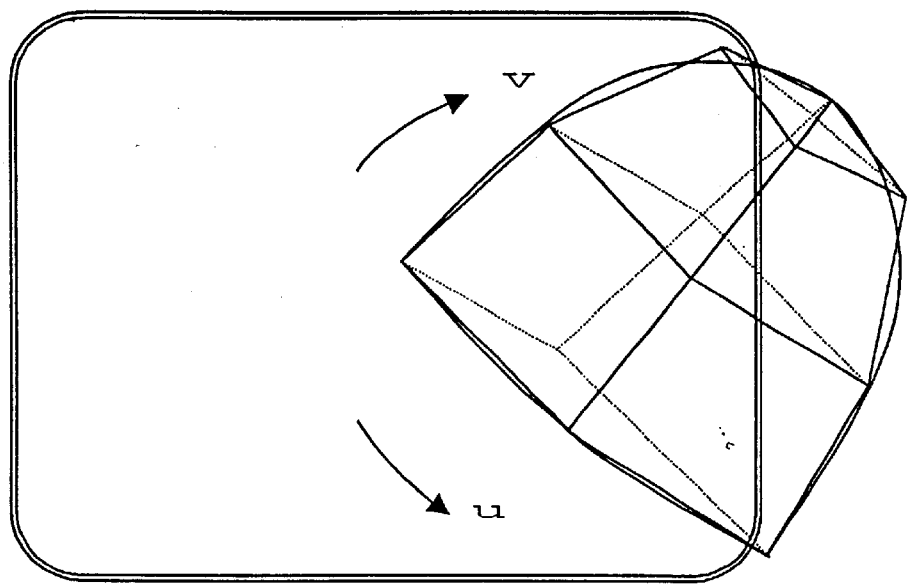
FIG. 13 is a diagram for describing the omission of attribute data.

However, in FIGS. 13 and 14, as in FIG. 7, square polygons are converted in order to simplify the description, whereas in actuality triangular polygons are formed. This is done to avoid the display from becoming unnatural due to the distortion of the square polygons.

Figure 10:
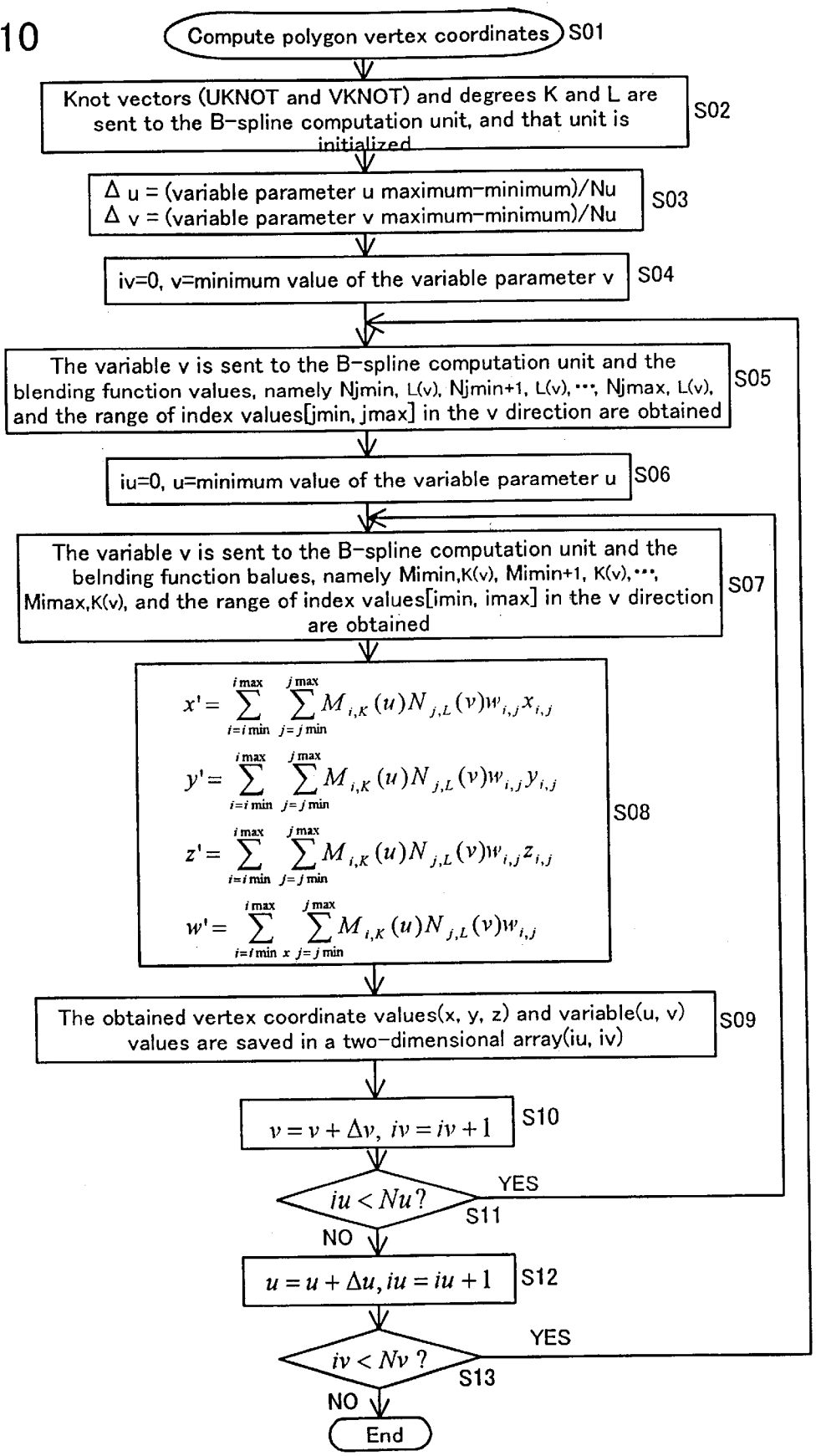
FIG. 10 is a diagram representing the flow of polygon vertex coordinate computation operations.

One method for the procedure of computing the vertex coordinates of a first NURBS surface object that is characteristic of the present invention is now described further with reference to the operation flow diagrammed in FIG. 10 for computing polygon vertex coordinates (step S01).

Knot vectors in the u and v directions (UKNOT and VKNOT) and degrees (K and L) are sent to the B-spline computation unit 203, that is, to the DSP 203, and that unit is thereby initialized (step S02). The B-spline computation unit 203 has a function for computing blending function values for the NURBS surface object data.

From the number of polygon divisions in the u and v directions (Nu and Nv) obtained by the object LODs, the increases $\Delta u$ and $\Delta v$ in the parameter variables u and v are computed (step S03). These increases $\Delta u$ and $\Delta v$ in the parameter variables u and v are expressed by the following formulas.

$\Delta u$=(parameter variable $u$ maximum−minimum)/$Nu$ $\Delta v$=(parameter variable $v$ maximum−minimum)/$Nv$ Then the variable iv (vertex index in v direction) is initialized to 0 and the variable v is initialized with the minimum value of the parameter variable v (step S04).

The variable v is sent to the B-spline computation unit 203 and the blending function values, namely Njmin, L(v), Njmin+1, L(v), ..., Njmax, L(v), and the range of index values [jmin, jmax] in the v direction are obtained (step S05).

In like manner, the variable iu (vertex index in u direction) is initialized to 0 and the variable u is initialized with the minimum value of the parameter variable u (step S06). Then the blending function values in the parameter variable u, namely Mimin, K(u), Mimin+1, K(u), ..., Mimax, K(u), and the range of index values [imin, imax] in the u direction for the corresponding control points are obtained (step S07).

From the blending function values in the v direction and control point index values obtained in step S05, and the blending function values in the u direction and control point index values obtained in step S07, NURBS surface object's coordinates in the same-order spatial coordinates system are computed (step S08).

Then, by dividing the values obtained in step S08 by the same-order coordinate component (w'), the coordinate values in the parameter variables u and v for the NURBS surface object are obtained. The obtained vertex coordinate values (x, y, z) and variable (u, v) values are saved in a two-dimensional array (iu, iv) (step S09).

Next, 1 is added to the variable iu and the increase $\Delta u$ is added to the variable u (step S10). If iu<Nu, the routine in step S06 is returned to (step S11). If that is not the case, the following processing routine is executed.

That is, 1 is added to the variable iv and the increase $\Delta v$ is added to the variable v (step S12).

If iv<Nv, the routine in step S05 is returned to (step S13). If that is not the case, the polygon conversion of the surface is complete. The surface object coordinate data are saved in a two-dimensional array by the above processing.

Here, in the polygon coordinate computation routines noted above, with the configuration diagrammed in FIG. 1, the B-spline computation unit 203 is used for obtaining the values of the blending functions (B-spline functions).

In the embodiment diagrammed in FIG. 8, this B-spline computation unit 203 is implemented in the DSP 203 which can directly access the sub-CPU 210, in view of the fact that comparatively simple high-volume floating point computations are performed.

As noted earlier, this B-spline computation unit 203 is initialized by knot vectors contained in the NURBS surface data transferred from the main CPU 100, and B-spline function computations are performed by the B-spline function degrees and parameter variable values being given.

The maximum and minimum index values for the valid control points and the B-spline function values (blending function values) are then returned to the sub-CPU 210.

The B-spline functions, as explained earlier, are computed by the "Cox-deBoor recurrence formula" given in formula 2.

Figure 11:
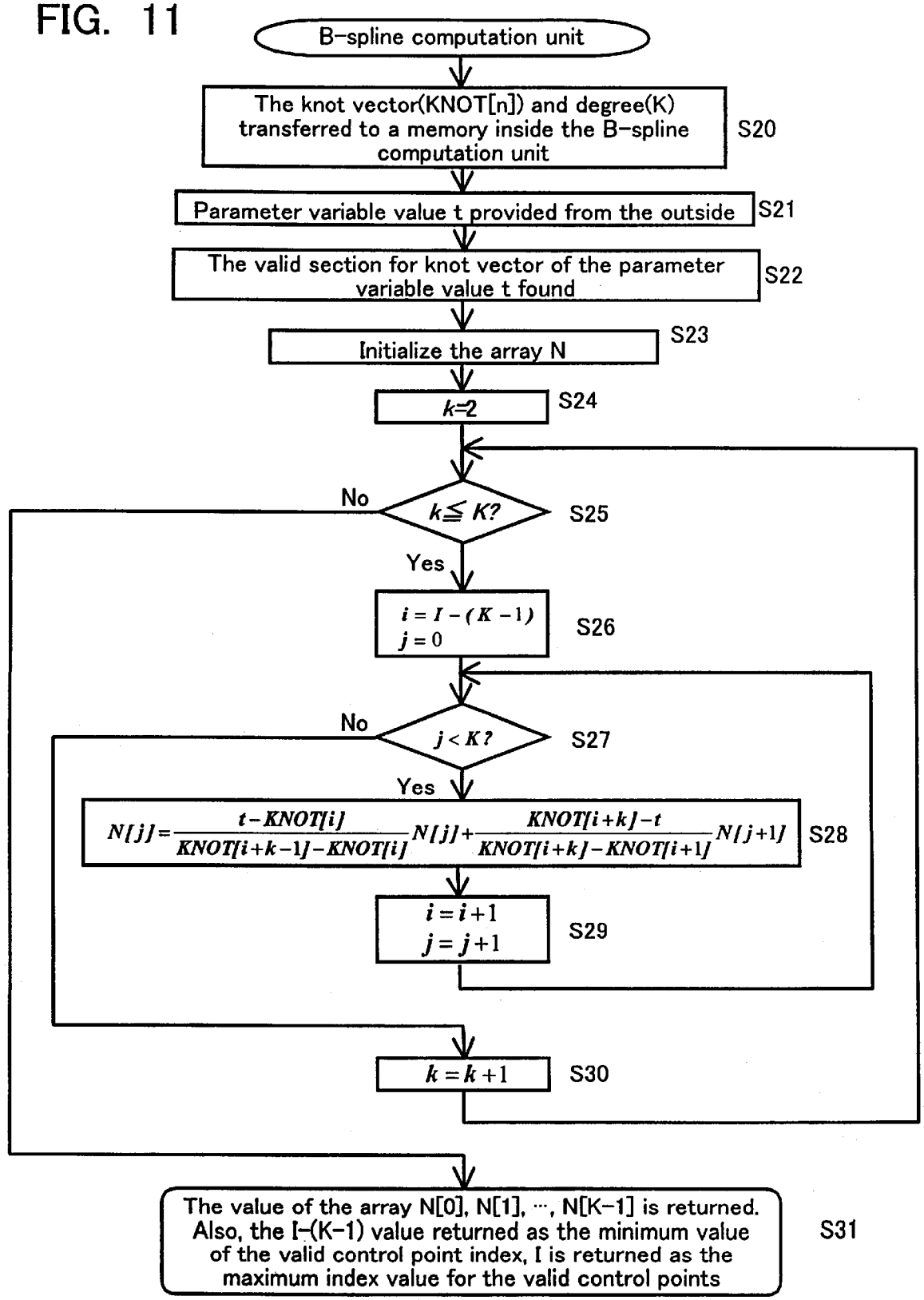
FIG. 11 is a diagram representing the flow of operations in a B-spline computation unit 203.

One method of implementing the processing routines of this B-spline computation unit 203 is now described with reference to the operating flowchart for the B-spline computation unit 203 given in FIG. 11.

It is assumed here that the knot vector (KNOT[n]) and degree (K) for the B-spline function to be found have already been transferred to a memory inside the B-spline computation unit 203 (step 20). The internal memory in the B-spline computation unit 203 is configured so that it can save the knot vectors and degrees for a plurality of B-spline functions.

Next, a parameter variable value t is provided from the outside (step S21). The valid section (KNOT[i]$\leq$t<KNOT[i+1]) for the knot vector of the parameter variable value t so given is found and the value of this index value i is made the valid index value (I) (step S22).

Initialization is then performed with the array N[0]=0, N[1]=0, ..., N[K−2]=0, N[K−1]=1, N[K]=0 (step S23).

Figure 12:
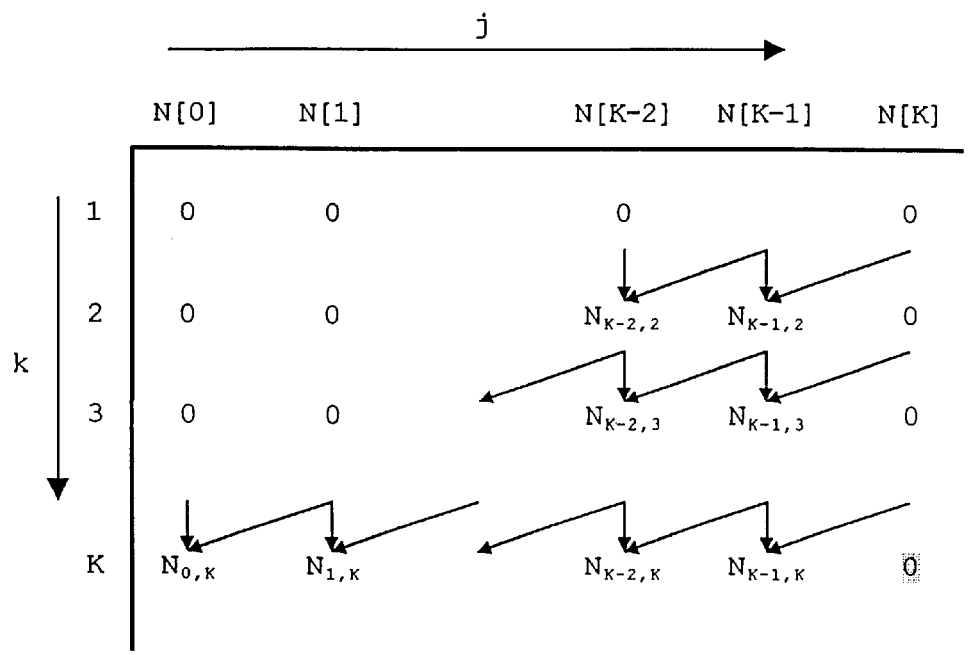
FIG. 12 is a diagram representing parameter variables and a computation method.

The array N is then subjected to computation with the Cox-deBoor recurrence formula noted above (steps S24–S30). The value of the array N[0], N[1], . . . , N[K−1] is returned as the B-spline function value. Also, the I−(K−1) value of the valid index value I is returned as the minimum value of the valid control point index, and I is returned as the maximum index value for the valid control points (step S31). FIG. 12 is a diagram representing the variables and computation method described above.

Following that, triangular polygons are formed from a two-dimensional array of vertex coordinates obtained by computing the vertex coordinates for the NURBS surface object in the polygon conversion process described in the foregoing, and a determination is made as to whether those polygons (vertices) are visible or invisible. The following polygons are eliminated as invisible polygons.

(1) Polygons not contained in the view volume
(2) Polygons facing backward to the line of sight(The direction of a polygon can be found from the vertex coordinates.)

The NURBS surface object data transferred from the main CPU 100 are defined as including, in addition to NURBS data relating to the shape of the model, such NURBS data as texture coordinates, normal vectors, and vertex colors, etc. which are vertex attribute data. These attribute values are computed for the polygons (vertices) remaining after the removal of the invisible polygons noted above. Alternatively, as another method, the normal vectors may be calculated after the object has been divided into polygons using tangent vectors for those polygons. Or the entire object may be defined in one color without defining vertex colors.

The computation of the attribute values is performed in the same way as the computation of the vertex coordinates described earlier, but the parameter variable values u and v at each vertex are saved in the vertex data. In that way, by sending the parameter variable values u and v saved in the vertex data to the B-spline computation unit 203 after transferring the NURBS knot vectors and degrees defined for each attribute to the B-spline computation unit 203, the B-spline function values needed for NURBS computation can be obtained.

The sub-CPU 210 transfers the polygon vertex coordinates, texture coordinates, normal vectors, and color values obtained by the processing described in the foregoing to the polygon drawing processor 300 as polygon data. The polygon data are rearranged prior to transfer as necessary.

Next, NURBS model simplification methods that comprise one feature of the present invention are described. A first method for simplifying the NURBS model is to alter the degree of the NURBS model according to the LOD value.

That is, in view of the fact that it is difficult for a player to visually discern complex curved surface shapes when the projected size of an object is small (i.e. when the LOD is large), the NURBS model is simplified by lowering the degree of the NURBS model, and the NURBS model data volume is diminished.

FIG. 15 is a diagram for describing the first method of simplifying a NURBS model. An example is now described, with reference to FIG. 15, wherein the degree of a NURBS curve configured with the control points $Q_0$, $Q_1$, $Q_2$, and $Q_3$, the weights $\omega_0$, $\omega_1$, $\omega_2$, and $\omega_3$, and the knot string $[t_0, t_1, t_2, t_3, t_4, t_5, t_6, t_7]$ is lowered.

FIG. 15A is a diagram of a 4-degree NURBS curve depicting one 3rd-order curve L1. This 3rd-order curve L1 is a curve segment affected by all four control points $Q_0$, $Q_1$, $Q_2$, and $Q_3$ wherein the $t_3$–$t_4$ element interval in the knot string is the valid range for this curve segment L1.

FIG. 15B is a diagram of a 3-degree NURBS curve, wherein the degree is made lower by 1 than the degree in FIG. 15A, depicting two 2nd-order curves L2 and L3. The 2nd-order curve L2 is a curve segment affected by the control points $Q_0$, $Q_1$, and $Q_2$, and the 2nd-degree curve L3 is a curve segment affected by the control points $Q_1$, $Q_2$, and $Q_3$. The $t_2$–$t_3$ element interval in the knot string is the valid range of the curve segment L2, and the knot $t_3$–$t_4$ interval is the valid range of the curve segment L3.

FIG. 15C is a diagram of a 2-degree NURBS curve, wherein the degree is now made lower by 1 than the degree in FIG. 15B, depicting three 1st-order curves L4, L5, and L6. The 1st-order curve L4 is a curve segment affected by $Q_0$ and $Q_1$, the 1st-order curve L5 is a curve segment affected by the control points $Q_1$ and $Q_2$, and the 1st-order curve L6 is a curve segment affected by the control points $Q_2$ and $Q_3$.

The knot $t_1$–$t_2$ interval is the valid range of the curve segment L4, the knot $t_2$–$t_3$ interval is the valid range of the curve segment L5, and the knot $t_3$–$t_4$ interval is the valid range of the curve segment L6.

Thus, as the curve segment configured with the four control points has its degree lowered, the smoothness thereof diminishes and the shape thereof is increasingly simplified.

FIG. 16 is a diagram representing an example wherein the degrees in a 4×4 degree NURBS surface are lowered. In FIG. 16A, 4-patch of 4×4 degree NURBS surface is depicted. Each surface patch is configured by four curve segments. In FIG. 16A, furthermore, in the u knot string $[u_0, u_1, u_2, u_3, u_4, u_5, u_6, u_7, u_8]$, the $u_3$, $u_4$, $u_5$ element intervals are the valid range for the curve segments, while in the v knot string $[v_0, v_1, v_2, v_3, v_4, v_5, v_6, v_7, v_8]$, the $v_3$, $v_4$, $v_5$ element intervals are the valid range of the curve segments.

Next, in FIG. 16B, 9-patch of 3×3 degree NURBS surface is diagrammed with the degree lowered by 1 as compared to FIG. 16A. In this case also, each surface patch is configured by four curve segments, but each curve segment is a 3-degree curve (2nd-order curve) that is affected by three control points.

The ranges wherein the curve segments are valid in FIG. 16B are the $u_2$, $u_3$, $u_4$, $u_5$ intervals in the u knot string $[u_0, u_1, u_2, u_3, u_4, u_5, u_6, u_7, u_8]$, and the $v_2$, $v_3$, $v_4$, $v_5$ element intervals in the v knot string $[v_0, v_1, v_2, v_3, v_4, v_5, v_6, v_7, v_8]$.

Further, in FIG. 16C, 16 patch of 2×2 degree NURBS surface is diagrammed in with the degree further lowered by 1 as compared to FIG. 16B. In this case also, as in the cases described above, each surface patch is configured by four curve segments, but each curve segment is a 2-degree curve (1st-order curve) that is affected by two control points.

The ranges wherein the curve segments are valid in FIG. 16C are the $u_1$, $u_2$, $u_3$, $u_4$, $u_5$ intervals in the u knot string $[u_0, u_1, u_2, u_3, u_4, u_5, u_6, u_7, u_8]$, and the $v_1$, $v_2$, $v_3$, $v_4$, $v_5$ element intervals in the v knot string $[v_0, v_1, v_2, v_3, v_4, v_5, v_6, v_7, v_8]$.

We now generalize FIG. 16 described in the foregoing and consider the number of parameters for a NURBS model when K×L degree surface patches are transformed to (K−1)× (L−1) degree surface patches. In the first place, the numbers of control points and weights do not change. The numbers of elements in the knot strings are decremented by −1 in the u knot string and v knot string, respectively. As described earlier, the number of knots equals the number of control points plus the degree, wherefore the last element in the u knot string and v knot string, respectively, becomes unnecessary.

The number of patches, on the other hand, is conversely incremented by +1 for the u knot string and the v knot string, respectively, by decrementing the degree by −1. That is, if the number of patches prior to decrementing the degree is m×n, then the number of patches after decrementing the degree becomes (m+1)×(n+1).

Thus, when the degree is lowered, the number of patches increases, but the number of knot string elements decreases, wherefore the computation volume decreases when finding points P(u,v) on the NURBS surface using formula 3 given earlier for finding the points P(u,v) on a NURBS surface and the formulas 4 and 5 for finding the blending function values.

When, for example, both the degrees K and L diminish, respectively, in the manner 4→3→2, the product terms in formula 3 given earlier (i.e. MNωQ and MNω) decrease in the manner $4^2$ (=16)→$3^2$ (=9)→$2^2$ (=4).

The computation volume involved in finding the blending functions M and N also diminishes as the degree is lowered, as diagrammed in FIG. 17. In FIG. 17 is represented the blending function M necessary for computing the point P with formula 3.

More specifically, FIG. 17A represents the blending function M necessary in computing the point P on a 4-degree surface patch, comprising, overall, 12 terms involving two subtractions and one division, 10 terms involving multiplication, and 3 terms involving addition. FIG. 17B represents the blending function M necessary in computing the point P on a 3-degree surface patch, comprising, overall, 6 terms involving two subtractions and one division, 4 terms involving multiplication, and 1 term involving addition. And FIG. 17C represents the blending function M necessary in computing the point P on a 2-degree surface patch, comprising only 2 terms involving two subtractions and one division, zero terms involving multiplication, and zero terms involving addition. The same applies to the blending function N.

Thus the computation volume for finding the blending functions M and N decreases when the degree is lowered. And, as noted above, the computation volume for formula 3 which uses the blending functions M and N also decreases.

The formulas 4 and 5 for finding these blending functions M and N are computed by the B-spline computation unit 203 when converting a NURBS model to polygons. The formula 3 for finding the point P is computed by the polygon generator 202.

Hence it is possible to reduce the computation process volume in both the polygon generator 202 and the B-spline computation unit 203, and speed can be improved when converting from a NURBS model to polygons.

The more complex a NURBS model is (the shape of a NURBS model being more complex the higher the degree and the greater the number of control points), the greater the number of polygons that must be converted to in order to reproduce that shape in polygons. Accordingly, because many points P become necessary on a NURBS model, lowering the degree and reducing the volume for computing the points P, according to the present invention, are effective in reducing the load on both the polygon generator 202 and the B-spline computation unit 203.

Thus, by the method of the present invention, surface patch shapes are simplified according to the LOD. When this is done, if the size of an object on the screen is small, it is difficult to distinguish between the shape of a complex surface when the degree is high and the simplified shape when the degree is lowered.

Accordingly, by lowering the degree of a NURBS model as the size of an object on the screen becomes smaller, that is, as the LOD becomes higher, the computation volume when converting from the NURBS model to polygons can be educed without substantially altering the screen display.

In FIG. 18 is diagrammed an example of a correspondence table between LOD and degree when the degree of a NURBS model prior to simplification is 4. With the settings made according to FIG. 18, when the LOD is 1 or 2, the NURBS model degree does not change, but when the LOD becomes 3, the degree is lowered by 1, and when the LOD goes to 4 the degree is again lowered by 1.

Hence when the size of an object on the screen becomes small, the volume of computations for finding a point P on the NURBS model can be decreased.

FIG. 19 is a diagram for describing a second method for the method described in the foregoing for simplifying the shape of a NURBS model according to the LOD. In the method described in the foregoing, the degree defining the NURBS model is lowered in order to simplify the shape of the NURBS model.

When this is done, the valid range of the knot strings becomes wider (and the numbers of curve segments and of surface patches increase) every time the degree is lowered. For that reason, when sampling points are found on the surface, based on the values of elements in the knot strings, and polygon vertex coordinates are taken, the number of vertex coordinates found increases, and it is possible that, in some cases, the computation volume will increase to the same extent. (On the other hand, however, changes in the control points need not be considered even when the degree is lowered.)

Thereupon, as a second method, when the degree is lowered by 1, the first control point is made invalid, and the first elements are eliminated, so that the effective range of the knot strings will not change even though the degree be lowered. When this is done, the last element will also be deleted.

An example is now described in FIG. 19, wherein, as in FIG. 15, the degree of a NURBS curve configured with the control points $Q_0$, $Q_1$, $Q_2$, and $Q_3$, the weights $\omega_0$, $\omega_1$, $\omega_2$, and $\omega_3$, and the knot string $[t_0, t_1, t_2, t_3, t_4, t_5, t_6, t_7]$ is lowered one degree at a time.

FIG. 19A is the same as FIG. 15A, depicting a 4-degree NURBS curve with one 3rd-order curve. This 3rd-order curve is a curve segment that is affected by all four control points $Q_0$, $Q_1$, $Q_2$, and $Q_3$, with the knot string element interval $t_3$–$t_4$ being the valid range for this curve segment.

In FIG. 19B, as in FIG. 15B, a 3-degree NURBS curve is diagrammed wherein the degree has been lowered by 1, but the first control point $Q_0$ is made invalid, and the first element $t_0$ is also deleted. Accordingly, the curve segment formed in this case will be a single 2nd-degree curve, as indicated in the diagram, and the number of curve segments does not increase. The effective range of the knot strings does not change either.

In FIG. 19C, in comparison with FIG. 15C, a 2-degree NURBS curve is represented wherein the degree has been further reduced by 1, but, here again, the first control point $Q_1$ is made invalid and the first element $t_1$ is also deleted.

Accordingly, the curve segment formed in this case is a single 1st-order curve, as indicated in the diagram, but the number of curve segments is still 1. The effective range of the knot strings does not change either.

Even when the curve segment described above is extended to surface patches, it is the same as described earlier. That is, even when the degree is lowered, one column of control points at the edge are made invalid in each of the u and v directions, respectively, and the first element in the u and v directions, respectively, is deleted, whereby the number of curve patches is unchanged and the knot string valid range is also unchanged.

When this is done, the shape of the surface patches will become shrunk as compared to the original shape. When the size of the object on the screen is small, however, it will be difficult to visually discern that difference. And, since the number of surface patches does not increase even when the degree is lowered, the computation volume involved in finding a point P on the surface patch can be reduced.

To generalize this second method, let us consider the number of parameters involved in a case where K×L degree surface patches are transformed to (K−1)×(L−1) degree surface patches. In this case, the first column of control points in each of the u and v directions, respectively, in the control point matrix is made invalid, and the first and last elements in the knot strings are deleted.

FIG. 20 presents a correspondence table for LODs and degrees in the second method for simplifying the NURBS model described in the foregoing. As is indicated in FIG. 20, as the LOD becomes larger (i.e. as the size of the object on the screen becomes smaller), the degree is lowered 1 degree at a time. When this is done, the number of valid control points also decreases one at a time. The number of elements in the knot strings is reduced in increments of 2 because both the first and last elements therein are deleted.

In the second method also, the point to notice is that, when the object projection size is small (i.e. when the LOD is large), it is difficult for a player to visually distinguish a complex curved surface shape.

With a third method, when the projection size of the object is small, the NURBS model is simplified by decreasing the number of NURBS model control points and lowering the degree.

In FIG. 21 is diagrammed an example wherein a 4×4 degree NURBS surface is simplified to a 3×3 degree NURBS surface. In FIG. 21A, 4-patch of 4×4 NURBS surface configured from 5×5=25 control points $Q_{00}$ to $Q_{44}$ for the u and v directions is represented.

The weights of the control points are assumed to be $\omega_{00}$ to $\omega_{44}$, respectively. The u knot string is $[u_0, u_1, u_2, u_3, u_4, u_5, u_6, u_7, u_8]$, the number of elements therein being 9, that is, the number of control points (5) plus the degree (4). The v knot string is $[v_0, v_1, v_2, v_3, v_4, v_5, v_6, v_7, v_8]$, the number of elements therein being 9 also, the same as in the u knot string.

These four 4×4 degree surface patches are simplified to one 3×3 degree surface patch having, to the extent possible, the same size. For that reason, every other control point is deleted in the u direction and in the v direction, respectively.

Thereby, the four 4×4 degree surface patches are simplified to one 3×3 degree surface patch configured with 3×3=9 control points for the u direction, as diagrammed in FIG. 21B and the v direction.

When this is done, for the weight ω of the remaining control points, either the sum may be taken of the control points existing about the periphery prior to deletion and a value averaged therefrom used, or [that weight ω] may be used as is, without modification. With the method of using an average value, the surface patches will be simplified with the weight of the deleted control points factored in to some extent, even when the weights of the deleted control points was large. That being so, the shapes of the surface patches are prevented from being very different before and after simplification, which is desirable.

This averaging method is now described with reference to FIG. 22.

Figure 22B:
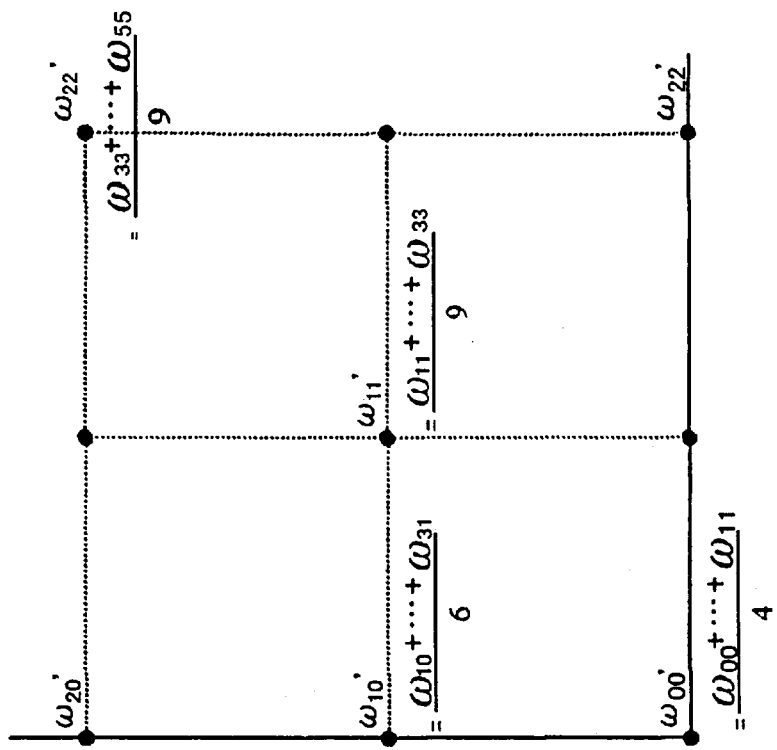
FIG. 22 is a diagram for describing a method for averaging control point weights.
Figure 22A:
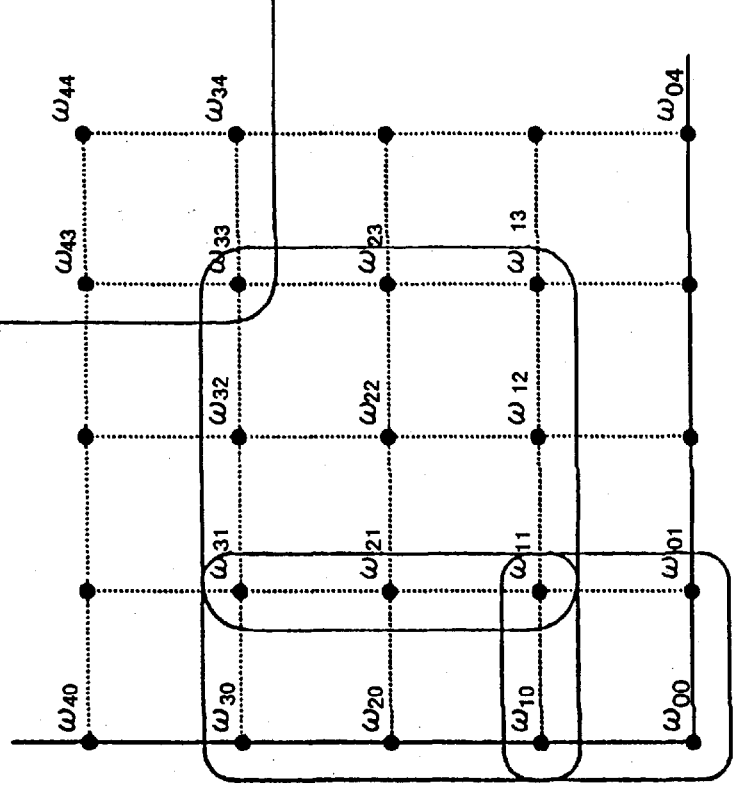

In FIG. 22A is represented a control point matrix prior to simplification, while in FIG. 22B the control point matrix after simplification is depicted. As shown in FIG. 22B, for example, for the weight $\omega_{00}'$ of the control point $Q_{00}$ remaining after simplification, which is an edge point at one of the four corner points in the matrix, a value is used which is the average of the weight $\omega_{00}$ of the control point $Q_{00}$ itself prior to simplification, and the sum of the weights $\omega_{01}$, $\omega_{11}$, and $\omega_{10}$ of the deleted peripheral control points $Q_{01}$, $Q_{11}$, and $Q_{10}$ (i.e. the average of four weights).

Similarly, for the weight $\omega_{10}'$ of the control point $Q_{20}$ remaining after simplification, which is one edge point not at one of the four corners in the matrix, a value is used which is the average of the weight $\omega_{20}$ of the control point $Q_{20}$ itself prior to simplification, and the sum of the weights $\omega_{10}$, $\omega_{11}$, $\omega_{21}$, $\omega_{31}$, and $\omega_{30}$ of the deleted peripheral control points $Q_{10}$, $Q_{11}$, $Q_{21}$, $Q_{31}$, and $Q_{30}$ (i.e. the average of six weights).

Further, for the weight $\omega_{11}'$ of the control point $Q_{22}$ remaining after simplification, which is a point which is not at the edge of the matrix, a value is used which is the average of the weight $\omega_{22}$ of the control point $Q_{22}$ itself prior to simplification, and the sum of the deleted peripheral weights $\omega_{11}$, $\omega_{12}$, $\omega_{13}$, $\omega_{23}$, $\omega_{33}$, $\omega_{32}$, $\omega_{31}$, and $\omega_{21}$ (i.e. the average of nine weights).

Also, when the number of control points and the degree are reduced, the number of elements in the knot strings in the u and v directions, respectively, must also be reduced. More specifically, the number of elements in the u and v knot strings of the surface patches diagrammed in FIG. 21B becomes the number of control points (3)+the degree (3)=6, wherefore it is necessary to remove 3 elements from the 9 elements present prior to simplification.

When that is done, measures must be taken so that the number of knots corresponding to the starting points and end points of the curve segments does not change and so that the number of curve segments is halved. When the number of original curve segments is an odd number, the post-reduction number must be incremented or decremented (±1).

For example, when simplifying four 4-degree surface patches to one 3-degree surface patch, as diagrammed in FIG. 21, the middle element $u_4$ is deleted from the elements $u_3$, $u_4$, $u_5$ in the knot string $[u_0, u_1, u_2, u_3, u_4, u_5, u_6, u_7, u_8]$ for the four 4-degree surface patches constituting the valid range for the curve segment, but the elements $u_3$ and $u_5$ corresponding to the starting point and end point of the curve segment are retained.

Also, of the three elements before and the three elements after the range wherein there is no curve segment, namely the elements $u_0$, $u_1$, $u_2$ and $u_6$, $u_7$, $u_8$, the first and last elements are retained while the central elements $u_1$ and $u_7$ are deleted.

Accordingly, the u knot string $[u_0, u_1, u_2, u_3, u_5, u_6, u_8]$ becomes the u knot string $[u_0', u_1', u_2', u_3', u_4', u_5']$ of the one 3-degree surface patch.

In a case where, for example, with 7 control points and a degree of 4, the u knot string $[u_0, u_1, u_2, u_3, u_4, u_5, u_6, u_7, u_8, u_9, u_{10}]$ having 7+4=11 elements is made the u knot string $[u_0', u_1', u_2', u_3', u_4', u_5', u_6']$ having 4+3=7 elements, after deleting every other control point to make 4 and lowering the degree to 3, first, the elements $u_3$ and $u_7$ at either end of the elements $u_3$, $u_4$, $u_5$, $u_6$, $u_7$ in the range wherein the curve segment is valid are retained, but every other one of the knots is deleted.

In other words, the knots $u_4$ and $u_6$ are deleted. Accordingly, the element $u_5$ remains. Also, of the three elements before and the three elements after the range wherein there is no curve segment, namely the knots $u_0$, $u_1$, $u_2$ and $u_8$, $u_9$, $u_{10}$, the first and last elements are retained while the central knots $u_1$ and $u_9$ are deleted. Accordingly, the u knot string $[u_0, u_2, u_3, u_5, u_7, u_8, u_{10}]$ becomes the u knot string $[u_0', u_1', u_2', u_3', u_4', u_5', u_6']$. Similarly, the v knot string $[v_0, v_2, v_3, v_5, v_7, v_8, v_{10}]$ becomes $[v_0', v_1', v_2', v_3', v_4', v_5', v_6']$.

In FIG. 23 is diagrammed an example of simplifying a 3×3 degree NURBS surface to a 2×2 degree NURBS surface.

In FIG. 23A, a 3×3 degree NURBS surface configured from 4×4=16 control points $Q_{00}'$ to $Q_{33}'$ for the u and the v directions is represented in 4 patches. The weights of these control points are assumed to be $\omega_{00}'$ to $\omega_{33}'$, respectively. The u knot string is the aforementioned $[u_0', u_1', u_2', u_3', u_4', u_5', u_6']=[u_0, u_2, u_3, u_5, u_7, u_8, u_{10}]$, the number of elements therein being 7, that is, the number of control points (4) plus the degree (3).

Similarly, the v knot string is the aforementioned $[v_0', v_1', v_2', v_3', v_4', v_5', v_6']=[v_0, v_2, v_3, v_5, v_7, v_8, v_{10}]$, the number of elements therein being 7, the same as in the u knot string.

These four 3×3 degree surface patches are simplified to one 2×2 degree surface patch having, to the extent possible, the same size. For that reason, two control points are deleted in the u direction and in the v direction, respectively.

At this time, as in the case described above, when every other one of the control points is deleted, an edge control point will be deleted because the number of control points is even, and the size of the surface patches after simplification will be different. That being so, in this case, two control points in the middle are deleted. By so doing, the four 3×3 degree surface patches are simplified to one 2×2 degree surface patch configured from 2×2=4 control points for the u and v directions, as diagrammed in FIG. 23B.

Also, in this case, due to the decrease in the number of control points and in the degree, the number of elements in the knot strings in the u and v directions, respectively, must also be decreased. More specifically, the number of elements in the u and v knot strings of the surface patch diagrammed in FIG. 23B will become the number of control points (2) plus the degree (2)=4, wherefore [the number of elements] must be decreased by 3.

The method of selecting the knots to delete is the same as described in the foregoing. That is, of the elements $u_2', u_3', u_4'$ (=$u_3, u_5, u_7$) in the range wherein the curve segment is valid, the two end elements $u_2'$ and $u_4'$ (=$u_3$ and $u_7$) are retained while the middle element $u_3'$ (=$u_5$) is deleted. Then, of the elements $u_0', u_1'$ (=$u_0, u_2$) and $u_5', u_6'$ (=$u_8, u_{10}$) before and after that, in the range wherein there is no curve segment, the end elements $u_0'$ (=$u_0$) and $u_6'$ (=$u_{10}$) are retained while the other elements $u_1'9=u_2$) and $u_5'$ (=$u_8$) are deleted.

Accordingly, the u knot string $[u_0', u_2', u_4', u_6']=[u_0, u_3, u_7, u_{10}]$ becomes the u knot string $[u_0'', u_1'', u_2'', u_3'']$ of the one 2-degree surface patch.

Similarly, the v knot string $[v_0', v_2', v_4', v_6']=[v_0, v_3, v_7, v_{10}]$ becomes $[v_0'', v_1'', v_2'', v_3'']$.

Thus, when the number of control points is reduced and the degree is lowered, the number of knots decreases, wherefore, the computation volume when finding points P(u,v) on the NURBS surface using formulas 3, 4, and 5 given earlier decreases. The amount of that decrease is the same as the amount of decrease noted in the earlier description given in conjunction with FIG. 17.

In the case of this third method, however, the number of surface patches decreases, and the number of points P(u,v) found also decreases, so it is possible to even more drastically reduce the computation volume.

In FIG. 24 is given an example of a correspondence table between degree and number of control points corresponding to the LOD when the number of control points defining the NURBS model prior to simplification is 7×7 and the degree is 4. According to FIG. 24, when the LOD is 1 or 2, the number of control points and the degree for the NURBS model do not change, but, at an LOD of 3, the number of control points decreases to 4×4 and the degree is lowered by 1 to become a degree of 3.

At an LOD of 4, moreover, the number of control points decreases further to 2×2 and the degree declines by 1 again to become a degree of 2. Accordingly, when the size of an object on the screen becomes small, the number of surface patches decreases, and the computation volume for finding a point P on each surface patch also decreases. That being so, the process volume for converting from a NURBS model to polygons can be drastically reduced. This translates to improved processing speed.

The surface patch shapes also decrease and are simplified, wherefore the number of polygons converted to and the volume of polygon data also decrease.

Generalizing the third simplification method described in the foregoing, let us consider the number of parameters for a NURBS model in the case where four K×L degree surface patches are transformed to one (K−1)×(L−1) degree surface patch.

In this case, the number of valid control points decreases from (K+1)×(L+1) to (K−1)×(L−1). In cases such as this where the number of control points is reduced two at a time in the u direction and v direction, respectively, if either (K+1) or (L+1) is an odd number, of the control points lined up in the u and v directions, the two rows and two columns enclosing the middle control point are made invalid. If (K+1) or (L+1) is an even number, on the other hand, of the control points lined up in the u and v directions, the two rows and 2 columns of control points in the middle are made invalid.

The number of control points will decline by 2 and the degree is lowered by 1, wherefore the number of elements in each of the knot strings, i.e. the u knot string and the v knot string, will be decreased by 3 (i.e. −3). First, in order to halve the number of curve segments in the u and v directions, in the range wherein the curve segments are valid, every other one of the elements is deleted while retaining the end elements. In the ranges wherein the curve segments are not valid, before and after the range wherein the curve segments are valid, the end elements are retained, and one element is deleted in the u direction and in the v direction, respectively.

In FIG. 25 are diagrammed the shapes of a NURBS model corresponding to the table given in FIG. 24, together with the conditions of the control point matrix, shown in model form. FIG. 25A is a diagram representing the shape of the pre-simplification NURBS model for LOD 1 and LOD 2, together with the control point matrix.

At this time, the NURBS model is configured of 16 4-degree NURBS surfaces. In the control point matrix, there are 7 control points (●) in each of the u and v directions, and the number of elements (♦) in the u knot string and in the v knot string, respectively, is 11.

In FIG. 25B are represented the shape of the NURBS model corresponding to LOD 3 and the control point matrix therefor. The NURBS model is configured with four 3-degree NURBS surfaces. In the control point matrix, every other control point is made invalid while retaining the edge control points. As to the elements, as described earlier, in the range(s) wherein the curve segments are valid and in the range(s) where they are invalid, respectively, every other element is made invalid while retaining the edge elements.

More specifically, the control points encircled by the ○ symbol in FIG. 25B (four each in the u and v directions, respectively) and the elements so encircled (seven each in the u and v directions, respectively) become valid.

FIG. 25C is a diagram representing the shape of the NURBS model corresponding to LOD 4 and the control point matrix therefor. The NURBS model here is configured by one 2-degree NURBS surface. In the control point matrix, in contrast with the control point matrix diagrammed in FIG. 25B, the edge control points are retained, but the control points in the middle two rows and two columns are also made invalid.

As to the elements, in both the range(s) where the curve segments are valid and the range(s) where they are invalid, respectively, the edge elements are retained, but every other one of the elements is again made invalid. More specifically, the control points encircled by the ○ symbol (two each in the u and v directions, respectively) and the elements so encircled (four each in the u and v directions, respectively) become valid.

The first, second, and third NURBS surface simplification methods described in the foregoing can be implemented in the image display apparatus diagrammed in FIG. 8.

In FIG. 8, in the execution of the first, second, and third method of simplifying the NURBS surface, the sub-CPU 210 either lowers the degree of the NURBS model or, alternatively, reduces the number of control points and also lowers the degree, based on the LOD of the NURBS model determined as described earlier, and thus simplifies the NURBS model data as based on the tabular data represented in FIG. 18, FIG. 20, or FIG. 24.

When this is done, the tabular data in FIG. 18, 20, or 24 are sent from the main CPU 100.

In this manner, the number of control points and the degree are determined by tabular data sent from the main CPU 100, wherefore, in the programming stage, the user can set the values contained in these data so that the polygon drawing processor 300 is not overloaded.

Next, as an embodiment of the present invention, a method is described for eliminating unnecessary control points from among the control points configuring NURBS models. In specific terms, at the stage where the control point coordinates of a NURBS model are converted to viewing point coordinates, NURBS model front/back determinations and on-screen/off-screen determinations are made, and the unnecessary control points relating only to surface patches not displayed on the screen are removed beforehand. By so doing, the conversion process volume when converting a NURBS model to polygons is reduced.

The control point removal processing in an aspect of this embodiment is performed by the model view converter 201 in FIG. 1.

Figure 26A:
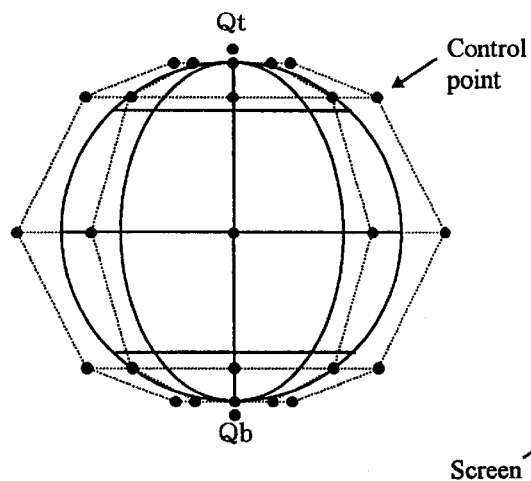
FIG. 26 is a diagram for describing a 4×4 degree spherical NURBS model made up of 8×7 control points.

First, a method is described for removing unnecessary control points based on the NURBS model front/back determination. FIG. 26A is a diagram of a 4×4 degree spherical NURBS model comprising 8×7 control points. The control points Qt and Qb are handled as control points where eight control points are superimposed. It is assumed that this NURBS model is displayed on a screen as diagrammed in FIG. 26B.

Figure 27:
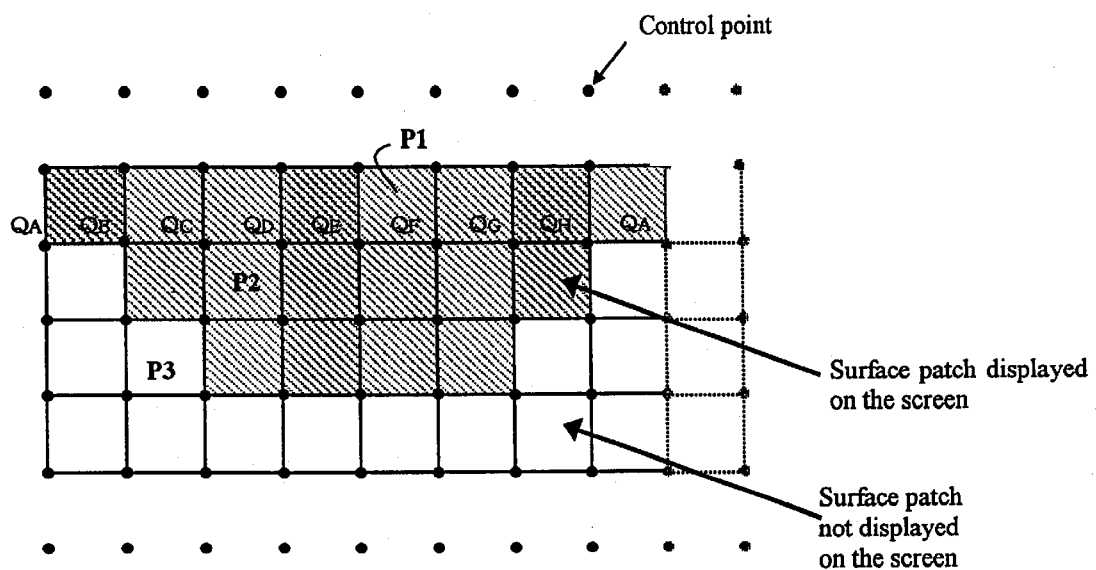
FIG. 27 is a diagram showing how the NURBS model in FIG. 26 is expanded in model form.

FIG. 27 is a diagram wherein this NURBS model is expanded in model form. One area enclosed by four control points is represented as one surface patch. The cross-hatched surface patches face forward relative to the line of sight direction. These are surface patches which have areas displayed on the screen. The surface patches which are not cross-hatched are facing backward relative to the line of sight direction. These are surface patches which are not displayed on the screen.

Figure 26B:
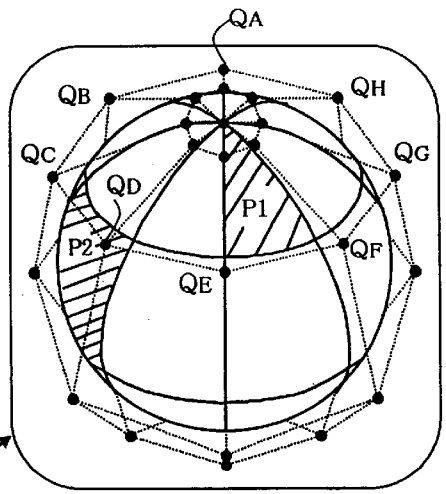

The surface patches P1 and P2 in FIG. 27, for example, are displayed as diagrammed in FIG. 26B. As is evident from FIG. 26B, in surface patch P1, all of the area is on the front side, and surface patch P1 is displayed on the screen in its entirety. In surface patch P2, however, part of the area faces forward, but the remaining area faces backward, and only that area which is facing forward is displayed on the screen.

The surface patch P3 in FIG. 27 has all of its area facing backward, so it is not displayed on the screen.

Such surface patches as these which are not displayed (i.e. surface patches wherein the entire area faces backward) need not be converted to polygons. Accordingly, by eliminating the control points which relate only to these non-displayed surface patches, the number of surface patches converted to polygons decreases, and the process volume for converting from NURBS models to polygons can be reduced.

The determination as to whether or not at least some of the area in a surface patch is facing forward relative to the line of sight direction is performed by the surface patch front/back determination method described below.

FIG. 28 is a diagram for describing the principle of the surface patch front/back determination method mentioned above. In FIG. 28, there is a line of sight vector A extending from a viewing point coordinate 0 in a viewing point coordinate system toward the control points, and a normal vector B for the control points configuring the NURBS model. From the inner products of these, it is determined whether or not a normal vector B of a control point is directed toward the viewing point coordinate 0. Hereinafter, the facing of the normal vector B of any of the control points toward the viewing point coordinate 0 is called facing forward, and the facing thereof toward the opposite side from the viewing point coordinate 0 is called facing backward.

Let us assume that the components of a line of sight vector A are $(x_1, y_1, z_1)$ and that the components of a normal vector B of any one of the control points are $(x_2, y_2, z_2)$. Then we can find the inner product A·B as follows.

$$A \cdot B = x_1 x_2 + y_1 y_2 + z_1 z_2 = |A| \cdot |B| \cos \theta$$

Figure 28A:
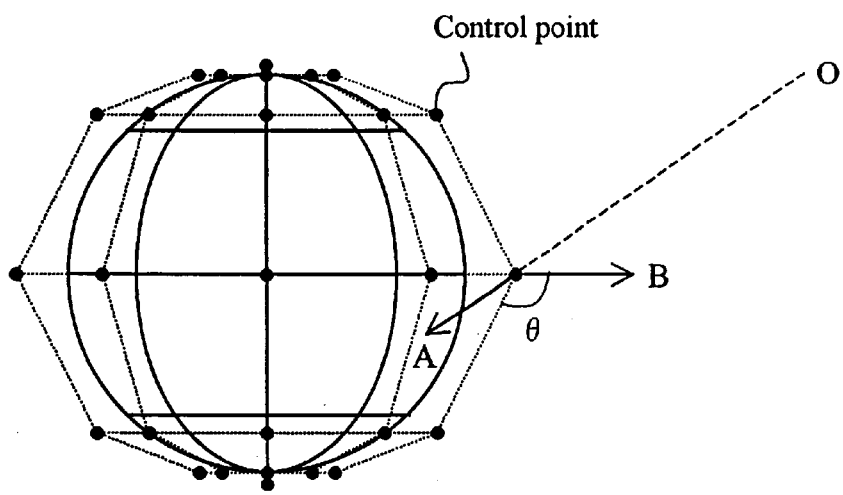
FIG. 28 is a diagram for describing the principle of a surface patch front-back determination method.
Figure 28B:
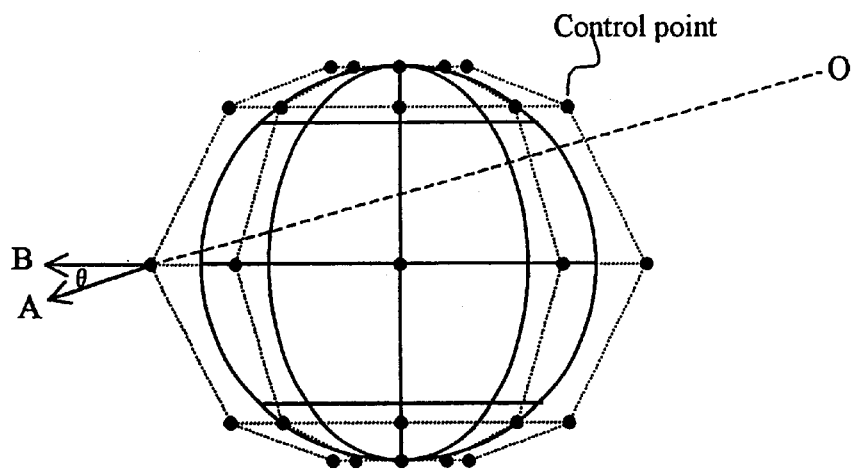

Thus, by finding the inner product A·B, the angle (cos θ) subtended by the line of sight vector A and a normal vector B can be found, wherefore the direction in which the normal vector B is facing can be determined. More specifically, when the angle θ of the normal vector B with the line of sight vector A is within the range of 90° or more to 270° or less (i.e. wherein cos θ is 0 or a minus value), the normal vector B is determined to be facing forward, whereas in ranges wherein that angle θ is either 0° or more but less than 90° or larger than 270° but 360° (0°) or less (i.e. wherein cos θ is a positive value), the normal vector B is determined to be facing backward. Accordingly, the normal vector B represented in FIG. 28A is facing forward, while the normal vector B represented in FIG. 28B is facing backward.

Figure 29:
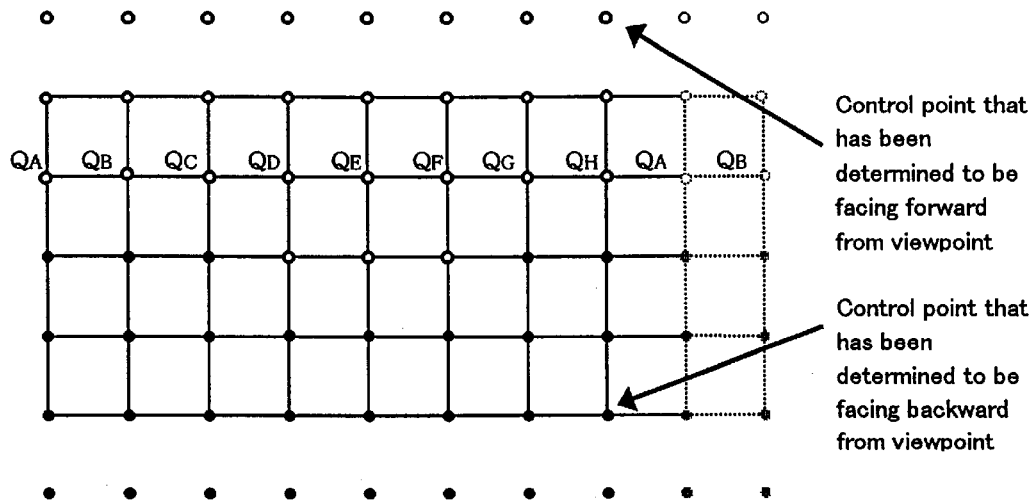
FIG. 29 is a diagram representing the front-back distribution of normal vector directions for control points.

FIG. 29 is a diagram showing the distribution of front/back facing for the normal vectors of the control points. In FIG. 29, the normal vectors of control points noted as white dots are control points that have been determined to be facing forward, while the control points noted as black dots are control points that have been determined to be facing backward. Surface patch front/back determination is made according to the number of forward facing control points among the 16 control points relating to the 4×4 degree surface patches.

Figure 30:
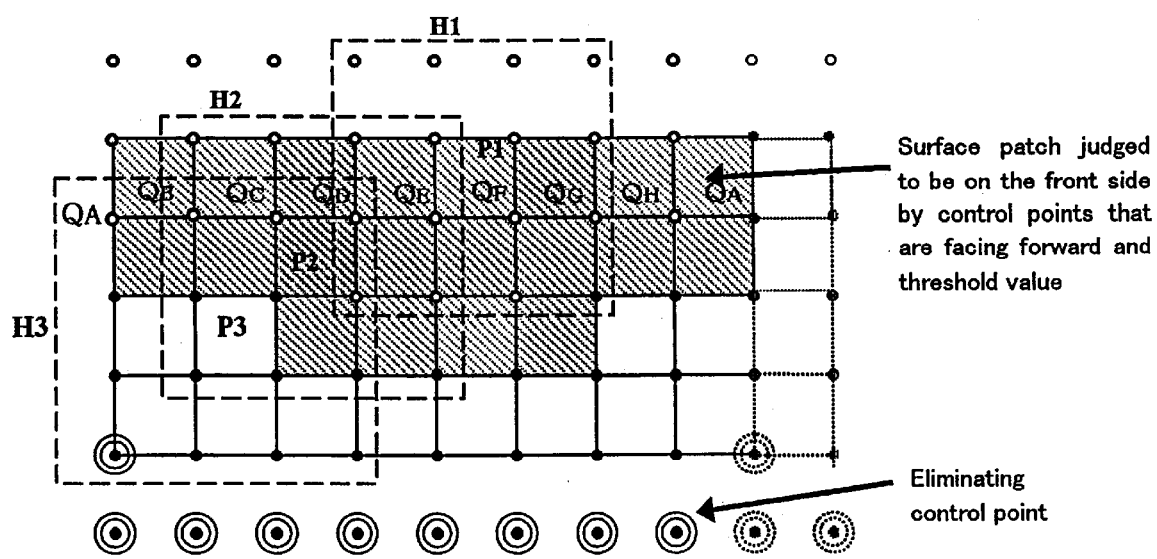
FIG. 30 is a diagram representing a front-back determined surface patch.

In FIG. 30 are diagrammed surface patches that have been front/back-determined. In FIG. 30, surface patches wherein the number of control points that, of the 16 control points relating to the surface patch, are facing forward is or exceeds a prescribed threshold value (6, for example) are determined to be on the front side of the screen, while those surface patches wherein the number of forward facing control points is less than the threshold value are determined to be on the back side of the screen.

For example, of the 4×4=16 control points relating to the surface patch P1 (i.e. control points contained within the broken line H1), 15 are forward facing control points, and the surface patch P1 is determined to be facing forward. Similarly, of the 4×4=16 control points relating to the surface patch P2 (i.e. control points contained within the broken line H2), 10 are forward facing control points, and the surface patch P2 is also determined to be facing forward. Of the 4×4=16 control points relating to the surface patch P3 (i.e. control points contained within the broken line H3), on the other hand, 5 are forward facing control points, wherefore the surface patch P3 is determined to be facing backward.

Thus those control points which relate to none of the surface patches determined to be on the front side (the control points enclosed in double circles in the diagram), as a result of the front/back determinations made for all of the surface patches, are eliminated.

Furthermore, the larger is made the prescribed threshold value noted above, the more will the number of surface patches determined to be on the back side decrease, and the smaller the threshold value is made, the more will the number of surface patches determined to be on the front side increase. The threshold value must be set so that at least all of the surface patches displayed on the screen (cf. FIG. 27) will be judged to be surface patches on the front side.

It should be noted, however, that when there is a possibility that a back-side surface patch will be displayed, due to factors such as NURBS model front-and-back display, trimming, or translucency, the control points relating to that surface patch are not eliminated.

In the description above, moreover, line of sight vectors A are given for each control point, but they may also be given for each surface patch. In that case, the same line of sight vector is given for all 16 control points relating to a surface patch. Alternatively, the line of sight vectors may be given for each NURBS model configured from a plurality of surface patches, or even for each screen whereon at least one NURBS model is displayed.

Needless to say, the inner products found using line of sight vectors A given for each control point will be the most accurate, wherefore the most highly precise surface patch front/back determinations are possible by using line of sight vectors A for each control point.

Next, a method is described for eliminating unnecessary control points based on NURBS model on-screen/off-screen determinations. FIG. 31A, like FIG. 26A, is a diagram of a 4×4 degree spherical NURBS model comprising 8×7 control points. This NURBS model is displayed on the screen as represented in FIG. 31B.

FIG. 32 is a diagram wherein this NURBS model has been expanded in model form. The surface patches P4 and P5 in FIG. 32, for example, are displayed as diagrammed in FIG. 31B. As is evident from FIG. 31B, surface patch P4 is inside the screen while surface patch P5 is off the screen and therefore not displayed on the screen.

Such an off-screen surface patch (all of the area whereof is outside of the screen) P5 need not be converted to polygons. Accordingly, by eliminating the control points relating only to off-screen surface patches, the number of surface patches converted to polygons decreases, and the process volume for converting from a NURBS model to polygons can be reduced.

Whether or not a surface patch is off the screen is determined by the surface patch on-screen/off-screen determination method described below.

Figure 33:
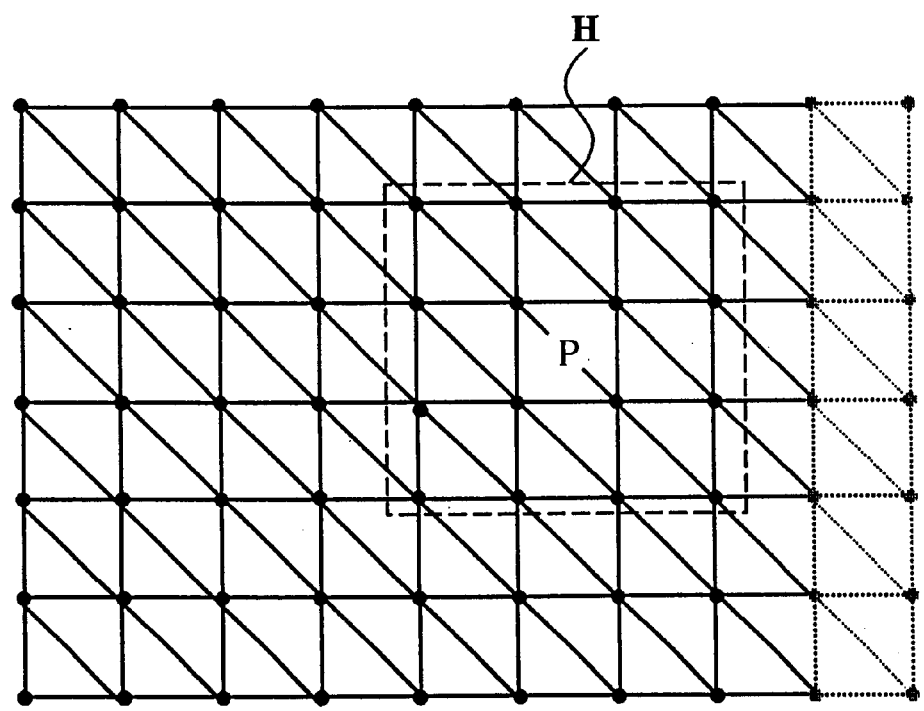
FIG. 33 is a diagram wherein control points are connected by line segments.

First, as diagrammed in FIG. 33, mutually adjacent control points and control points that are diagonally opposed are connected by line segments to form triangles having the control points as vertices. Surface patch on-screen/off-screen determination is then made based on the positional relationship between the line segments and the sides of the screen.

As an embodiment of on/off determination, the following tables are prepared which are necessary for the on-screen/off-screen determination. Specifically, a patch table is established which has flags corresponding, respectively, to the line segments formed by the 16 control points that relate to one surface patch P (that is, the control points contained within the broken line H in FIG. 33).

A control point table is also established which has flags corresponding, respectively, to all of the control points relating to one specific NURBS model.

Figure 34A:
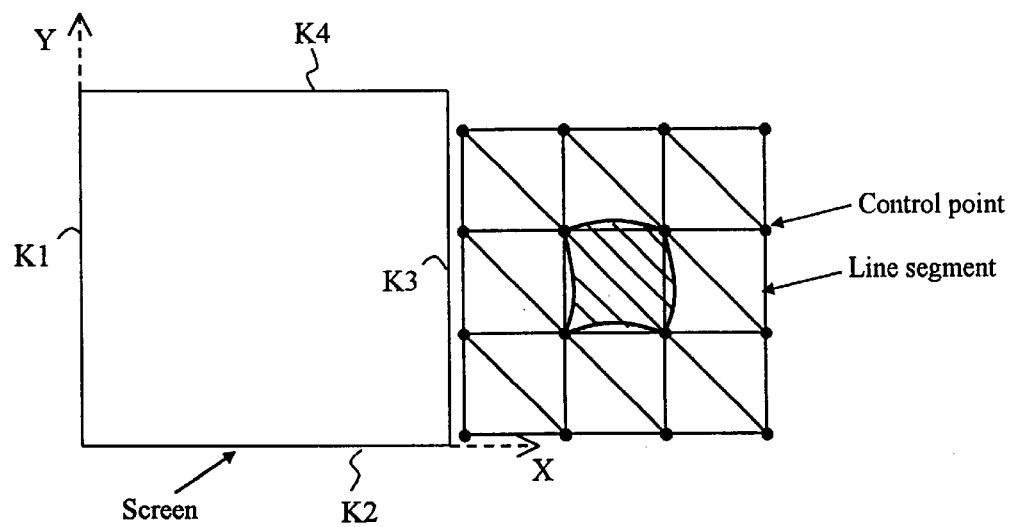
FIG. 34 is a diagram for describing a surface patch on-screen/off-screen determination method.

FIG. 34 is a diagram for describing the surface patch on-screen/off-screen determination method. FIG. 34A is a diagram for describing the case where all of the control points relating to the surface patch P are outside the screen.

First, from among the line segments formed by the control points relating to the surface patch P, one line segment is selected. Then a comparison is made between the coordinates of the control points at both points of that line segment and one of the four sides of the screen. If the coordinates of the control points at both ends of the line segment are outside that one side of the screen, then the flag for that line segment in the patch table for the surface patch P is raised (i.e. the flag value is made "1").

If, on the other hand, one of the control points or both of the control points are inside that one side of the screen, the flag for that line segment is not raised (i.e. the flag value is left at the initialized value "0").

Describing this method further, let it be assumed that of the four sides K1, K2, K3, and K4 of a screen in a viewing point coordinate system, the two sides (vertical sides) K1 and K3 extending in the vertical direction are sides that extend in the Y direction in the plane XY coordinates of the viewing point coordinates, and that the two sides (horizontal sides) K2 and K4 extending in the horizontal direction are sides that extend in the X direction in the plane XY coordinates.

Now, for example, when the vertical side K3 and the line segment are compared, and the X coordinates of the control points at both ends of the line segment are compared against the X coordinates of the vertical side K3, if the X coordinates of the control points are equal to or less than the values of the X coordinates of the vertical side K3, those control points are determined to be inside the screen, whereas, if they are greater than the values of the X coordinates of the vertical side K3, those control points are determined to be outside the screen. Conversely, when the vertical side K1 and the line segment are compared, if the X coordinates of the control points are smaller than the values of the X coordinates of the vertical side K1, those control points are determined to be outside the screen, whereas if they are equal to or exceed the values of the X coordinates of the vertical side K1, those control points are determined to be inside the screen.

On the other hand, when the horizontal side K2 and the line segment are compared, the Y coordinates of the control points at both ends of the line segment are compared against the Y coordinates of the horizontal side K2. If the Y coordinates of the control points are equal to or greater than the values of the Y coordinates of the horizontal side K2, those control points are determined to be inside the screen, whereas, if they are less than the values of the Y coordinates of the horizontal side K2, those control points are determined to be outside the screen. Conversely, when the horizontal side K4 and the line segment are compared, if the Y coordinates of the control points are greater than the values of the Y coordinates of the horizontal side K4, those control points are determined to be outside the screen, whereas if they are equal to or less than the values of the Y coordinates of the horizontal side K4, those control points are determined to be inside the screen.

Thus comparisons are made to determine whether the coordinates at both end points of a line segment, respectively, are on the inside or the outside, relative to one side of the screen. When the coordinates at both ends of the line segment are outside, the flag for that line segment goes up.

For line segments for which flags are not up, the comparison described in the foregoing is made sequentially for the other sides. When the comparisons have been completed for a line segment relating to some surface patch and all of the sides of the screen, if all of the flags in the patch table for that surface patch are up, the flags for all of the control points relating to that surface patch in the control point table are left at the "0" value.

That is a case, in other words, where all of the line segments relating to the surface patch P are determined to be outside the screen in the comparisons made with every one of the four sides of the screen.

Figure 34B:
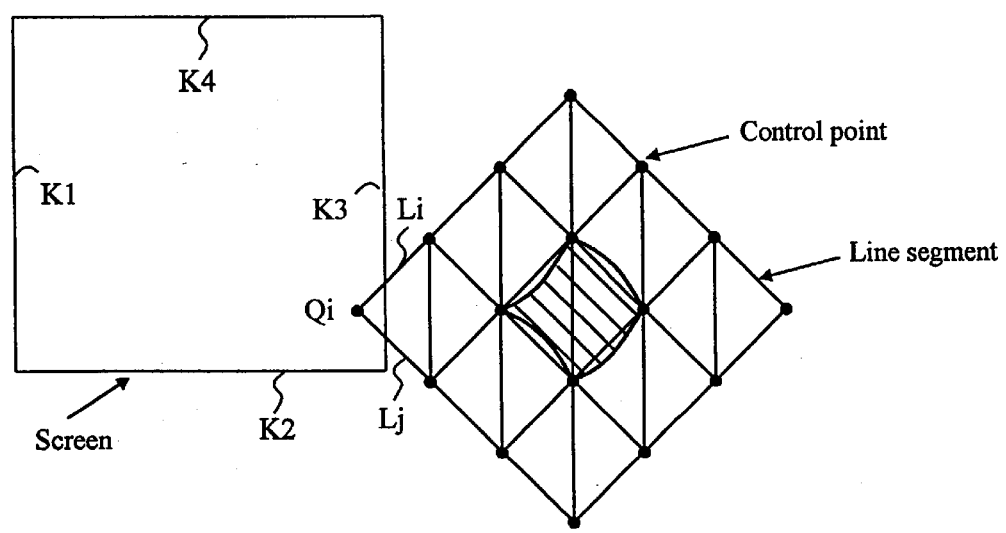

FIG. 34B, on the other hand, is a diagram representing a case where a control point relating to a surface patch are inside the screen. In this case, in the patch table, the flags corresponding to the two line segments Li and Lj having as an end point the control point Qi that is inside the screen do not rise. In a case such as this, the flags for all of the control points relating to this surface patch in the control point table are raised (i.e. the flag values are made "1"). Control points having raised flags are not eliminated.

When the line segment determinations for a plurality of surface patches configuring a NURBS model have been completed in this manner, those control points for which, in the end, flags did not rise in the control point table are removed.

Figure 35:
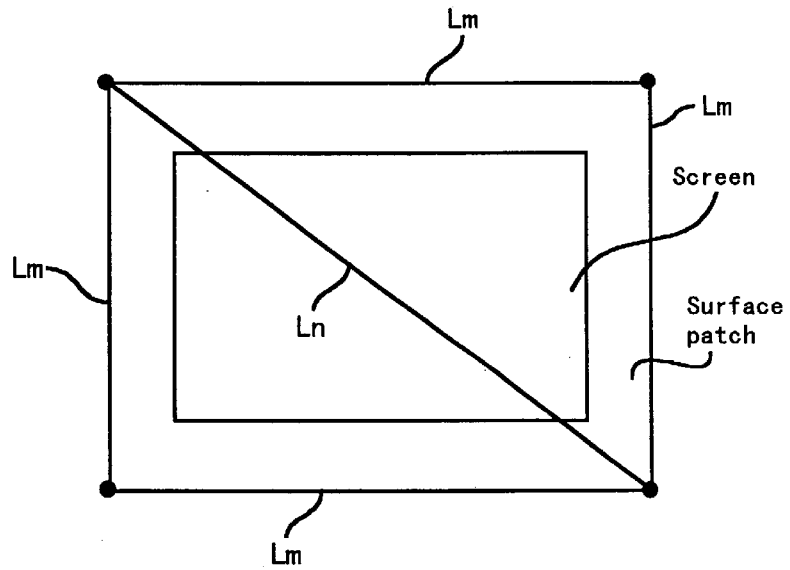
FIG. 35 is a diagram showing one surface patch covering the screen.

The line segments connecting control points in diagonal opposition are provided so that, when one surface patch covers the screen, as diagrammed in FIG. 35, that surface patch will not be determined to be off the screen. That is, in the case diagrammed in FIG. 35, when the on-screen/off-screen determination described in the foregoing is performed only with the line segments Lm connecting the control points in lattice form, there is a danger that, even though that surface patch actually exists inside the screen, it will be determined to be off the screen, and the control points relating to that surface patch will be eliminated.

When the line segment Ln connecting the control points in diagonal opposition is compared against the sides of the screen, one or other of the control points for that line segment will be determined to be inside the screen, wherefore the danger noted above can be avoided.

Thus, by removing beforehand control points relating only to surface patches not displayed on the screen, at the NURBS model stage prior to polygon conversion, the process volume for converting from the NURBS model to polygons can be reduced.

Further, as an embodiment of the present invention, a method is described now for computing normal vectors when manipulating control points to deform surface patches. This normal vector computation method is executed by the model view converter 201 noted in FIG. 1.

Figure 36A:
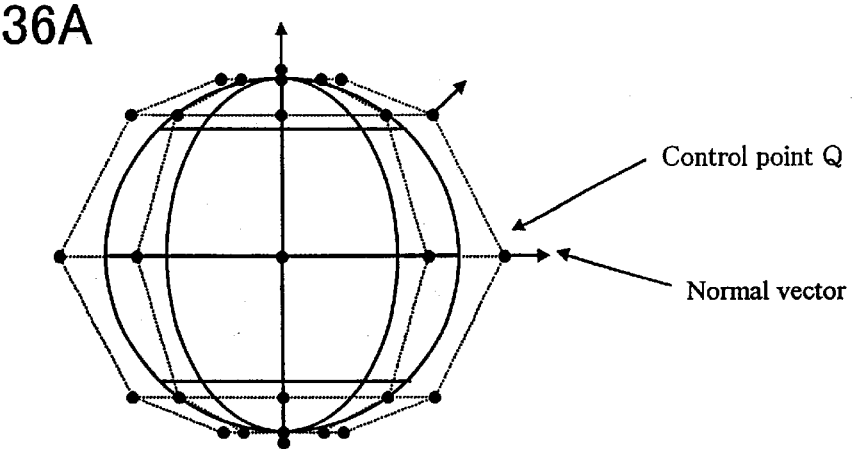
FIG. 36 is a diagram for describing a 4×4 degree spherical NURBS model made up of 8×7 control points.

FIG. 36A, like FIG. 26A and FIG. 31A, is a diagram representing a 4×4 degree spherical NURBS model comprising 8×7 control points.

Figure 36B:
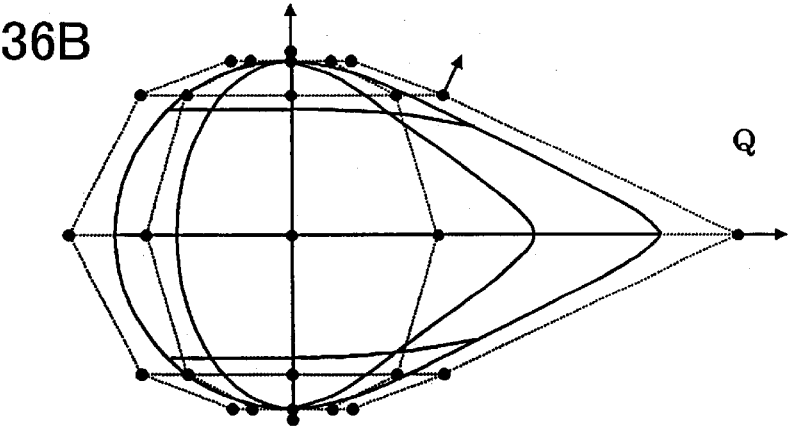
Figure 37:
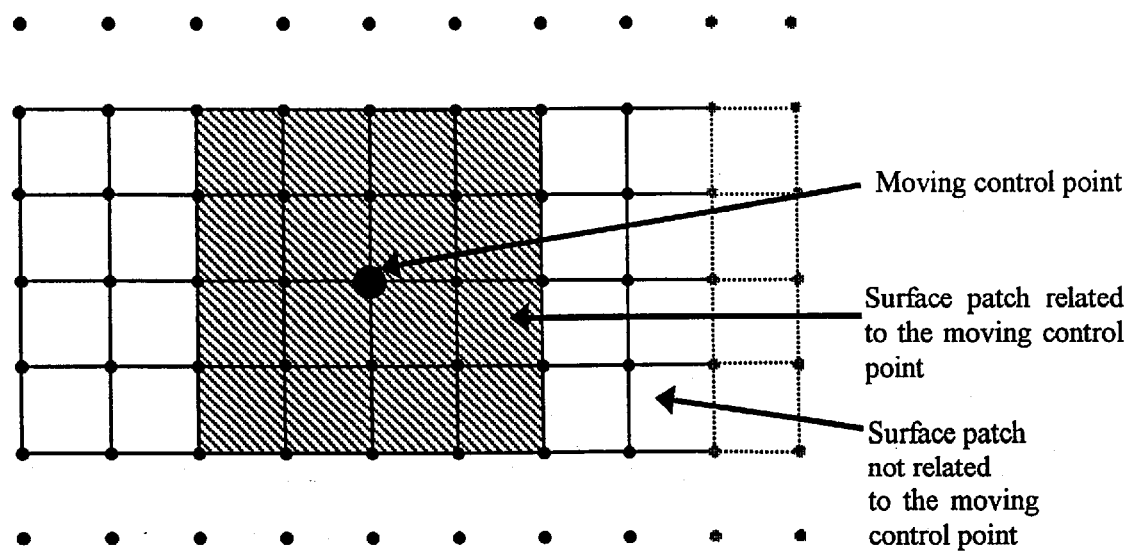
FIG. 37 is a diagram showing how the NURBS model in FIG. 36 is expanded in model form.

A case is now described wherein, as diagrammed in FIG. 36B, the control point Q at the right edge of this NURBS model is moved to the right, so that the NURBS model is deformed into a shape wherein it is pulled to the right side. In this case, the surface patches relating to the control point moved are the 16 surface patches that configure the right half of the NURBS model. FIG. 37, moreover, is a diagram representing an expansion, in model form, of this NURBS model. In FIG. 37, the surface patches related to the moving control point Q (i.e. the surface patches configuring the right half of the NURBS model) are cross-hatched.

Figure 38A:
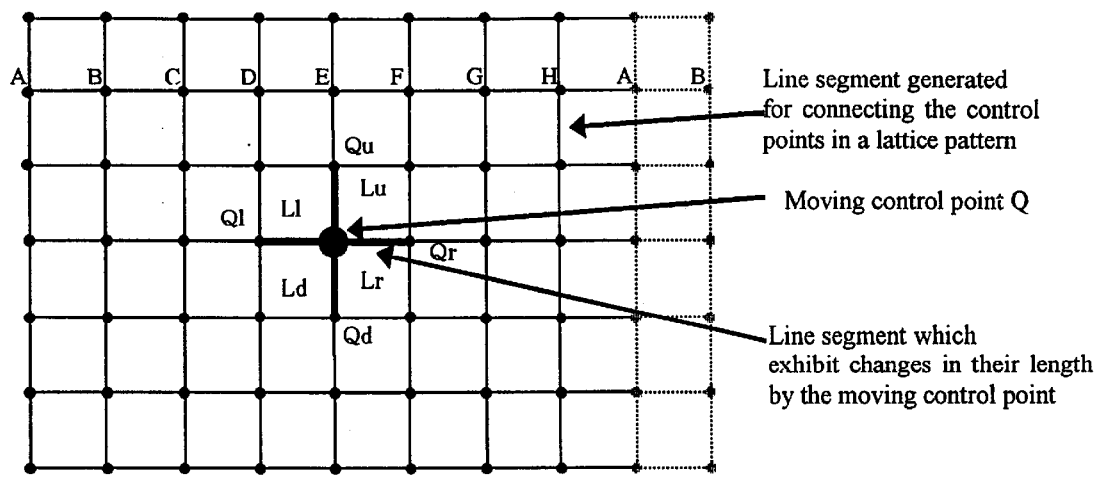
FIG. 38 is a diagram for describing a normal vector computation method.

FIG. 38 is a diagram for describing a normal vector computation method that is based on control points moved in such manner. First, as diagrammed in FIG. 38A, line segments are generated for connecting the control points in a lattice pattern. When this is done, by moving the control point Q, the line segments which exhibit changes in their length are the line segments Lu, Ld, Ll, and Lr [connecting between] the control point Q and the four control points adjacent thereto.

Accordingly, the control points for which normal vector computations are performed based on these four line segments are the moving control point Q and the four control points adjacent thereto, namely Qu, Qd, Ql, and Qr, making a total of five control points.

Figure 38B:
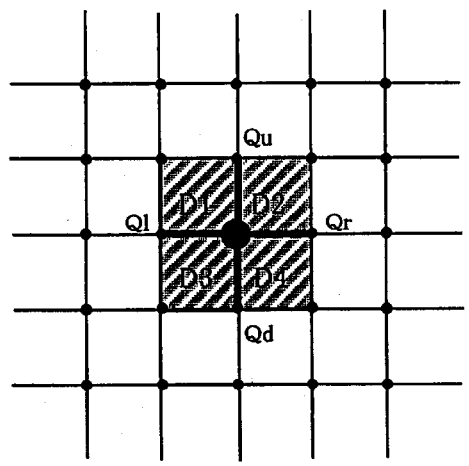

When computing a normal vector for the moving control point Q, as diagrammed in FIG. 38B, four squares D1, D2, D3, and D4 having that control point Q as one vertex are supposed. Then, as diagrammed in FIG. 38C, of the line segments that configure each of those squares, two vectors extending from the moving control point Q are supposed.

Figure 38C:
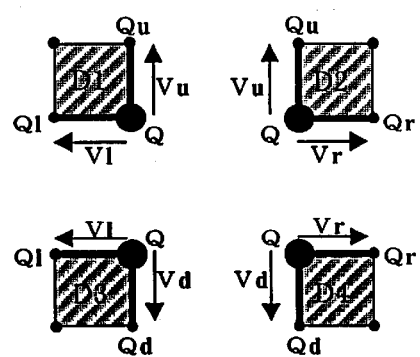

In more specific terms, in FIG. 38C, the vector for the line segment Lu extending from the control point Q to the control point Qu is defined as Vu (=Qu−Q), the vector for the line segment Ld extending from the control point Q to the control point Qd is defined as Vd (=Qd−Q), the vector for the line segment Lr extending from the control point Q to the control point Qr is defined as Vr (=Qr−Q), and the vector for the line segment Ll extending from the control point Q to the control point Ql is defined as Vl (=Ql−Q).

By this definition, the vectors for the two line segments extending from the control point Q are the vectors Vu and Vl in square D1, the vectors Vu and Vr in square D2, the vectors Vd and Vl in square D3, and the vectors Vd and Vr in square D4.

In other words, these two vectors are a vector and the adjacent vector that is in a prescribed direction of rotation centered on the control point Q for the vector. The outer products (that is, the normal vectors) for the two vectors in the squares are computed, as noted below, and then normalized.

In square D1, outer product A=Vu×Vl, normalized vector A′=A/|A|

In square D2, outer product B=Vr×Vu, normalized vector B′=B/|B|

In square D3, outer product C=Vl×Vd, normalized vector C′=C/|C|

In square D4, outer product D=Vd×Vr, normalized vector D′=D/|D|

In general, the outer product S×T in the vectors S=(Sx, Sy, Sz) and T=(Tx, Ty, Tz) is expressed as follows.

$$S \times T = (SyTz - SzTy, SzTx - SxTz, SxTy - SyTx)$$

The normalized vector S' is expressed as follows.

$$S' = S/|S| \text{ (where } |S| = \sqrt{(Sx^2 + Sy^2 + Sz^2)})$$

The four normalized outer products (normal vectors) A', B', C', D' are then averaged and the averaged outer product (normal vector) is normalized. Thus a new normal vector Vnew' is obtained for the moving control point Q. When the averaged outer product is made Vnew, this is represented $$Vnew = (A' + B' + C' + D')/4,$$

wherefore the new normal vector Vnew' becomes $$Vnew' = Vnew/|Vnew|.$$

Figure 39:
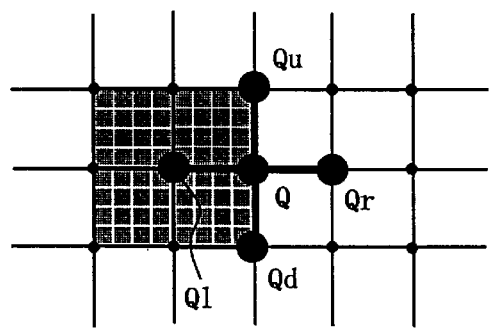
FIG. 39 is a diagram of four squares having as their vertex a control point Q1 assumed in cases where a new normal vector for the control point Q1 is determined.

By like computations, new normal vectors can be found for the four remaining points. The new normal vector for the control point Q1, for example, can be found by supposing four squares having the control point Q1 as an vertex, as diagrammed in FIG. 39, and performing the same computations as described in the foregoing.

Figure 40:
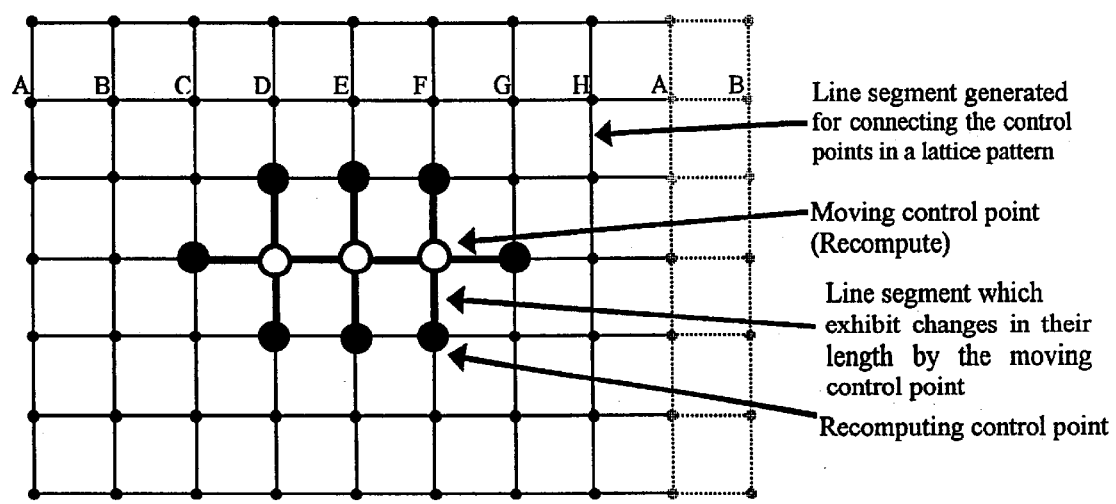
FIG. 40 is a diagram representing an example in a case where a plurality of adjacent control points are moved simultaneously.

FIG. 40 is a diagram representing a case where a plurality of adjacent control points move simultaneously. In FIG. 40, the three control points indicated by the large white dots move simultaneously. In such a case as this, the control points requiring the computation of new normal vectors are, in addition to the three control points, the control points which are adjacent thereto (i.e. the control points indicated by the large black dots). As to the coordinates of the moving control points, the coordinates of the control points used in computing the normal vectors are the coordinates after moving.

In the embodiment described earlier, the outer products of four squares having the control point Q as one vertex were found and averaged, and new normal vectors were computed, but it is permissible to find the outer products for only two, average these, and compute new normal vectors. Alternatively, the outer product of only one square may be found and made the new normal vector.

Needless to say, the new normal vectors arrived at by finding and averaging the outer products of four squares will be most accurate. Therefore it is possible to compute normal vectors having the highest precision by finding and averaging the outer products of four squares and then computing the new normal vectors.

The recomputed control point normal vectors are used after substitution from normal vectors given as data beforehand. The normal vectors of sampling points on NURBS models are found by mixing together the normal vectors of the control points relating to the sampling points according to the NURBS model computation formula (formula 3, described earlier).

That is, according to the method of the present invention, even when a NURBS model is deformed, the calculation of normal vectors for sampling points can be performed at high speed according to the NURBS model computation formula (formula 3), just as in the case when the NURBS model is not deformed.

That being so, the normal vectors of sampling points can be found using the NURBS model computation formula (formula 3), irrespective of whether or not the NURBS model is deformed.

Moreover, the method of finding normal vectors for sampling points by mixing the normal vectors, using the NURBS model computation formula (formula 3), is superior, in terms of computation volume, to the method of calculating tangential planes at sampling points on the curved surface of the NURBS model and making the perpendiculars thereto the normal vectors. This is so because, with the method of calculating the tangential planes, complex computations must be made at all of the sampling points to calculate the tangential planes, irrespective of whether or not the NURBS model is deformed.

When the control point weight is altered, that alteration is reflected at the stage where the control point normal vectors are mixed together, according to the computation formula (formula 3) for sampling points on the NURBS model.

Accordingly, weight alterations are also reflected in the normal vectors at the sampling points on the NURBS model.

According to the method of the present invention described in the foregoing, objects can be deformed faster than when objects configured by polygons are deformed. The reason for this is that, when objects configured by polygons are deformed, it is necessary to recompute the normal vectors for the vertices of all of the polygons configuring the object. In contrast thereto, according to the method of the present invention, it is only necessary to recompute the control points moved in order to deform the object, and the normal vectors for the surrounding control points, at the stage where the object is being configured in the NURBS model.

To this point, in the embodiments described in the foregoing, points on NURBS surfaces are suitably sampled and polygon data are generated in order to perform fast and attractive image processing. However, in the present invention, a method is proposed for suitably sampling points on a NURBS surface, at high speed.

In specific terms, a first feature of the present invention is that of reducing the number of divisions, which is used when dividing a NURBS object into a plurality of surface areas (regions) according to the LOD (level of detail) found by estimating the screen projection size, etc., of a NURBS object.

This is informed by the fact that it becomes increasingly difficult to visually distinguish complex shapes as the screen projection size of the NURBS object becomes smaller. Once the number of divisions has been determined, all of the valid sections in the u and v knot strings corresponding to the NURBS object are divided. At that time, it is preferable that the numbers of valid sections (number of knots) in the u and v [knot strings], respectively, be equal.

Secondly, the number of divisions, which is used when dividing a curved surface region into polygons, is calculated from areas on the screen obtained by joining groups of control points corresponding to the (curved) sides of the curved surface region.

This is because it is assumed that the larger the area on the screen obtained by joining control point groups, the longer will be the sides of the curved surface region, or the larger will be the curvature thereof.

By setting the number of polygon divisions for each side of the curved surface region, polygon division can be carried out, finely, and without meaninglessly increasing the number of polygons, even inside one NURBS object.

And finally, after the number of divisions has been determined, each curved surface region is partitioned at suitable u and v knot intervals and divided into polygons. It is preferable, at this juncture, that the respective u and v knot intervals be equal. Generally, moreover, the number of divisions will differ for each (curved) side of a region, wherefore adjustments are made, calculating division points inside the region according to certain rules.

Let us here consider, as an example of dividing a NURBS object into polygons, that a 4×4 degree NURBS object having 7×7 control points is to be divided into polygons (control points $Q_{00}$ to $Q_{66}$, knot strings $[u_0, \ldots, u_{10}]$ and $[v_0, \ldots, v_{10}]$).

First, it is assumed that the number of divisions is 2 to divide the NURBS object into the curved surface regions, in both the u and v directions, according to the LOD value. In that case, the NURBS object will be partitioned by the curves $u_5$ and $v_5$, and divided into the four regions 00 to 11 (with the valid sections in the u and v knot strings being $u_3, \ldots, u_7$ and $v_3, \ldots, v_7$, respectively, for a total of 16 sections), as diagrammed in FIG. 41.

Next to be considered is which are the control points that affect the (curved) sides of the curved surface regions. With a 4×4 degree NURBS object, there will be 4×4 (=16) control points that have an effect on the portions partitioned by one u and v knot section.

Figures 41, 42:
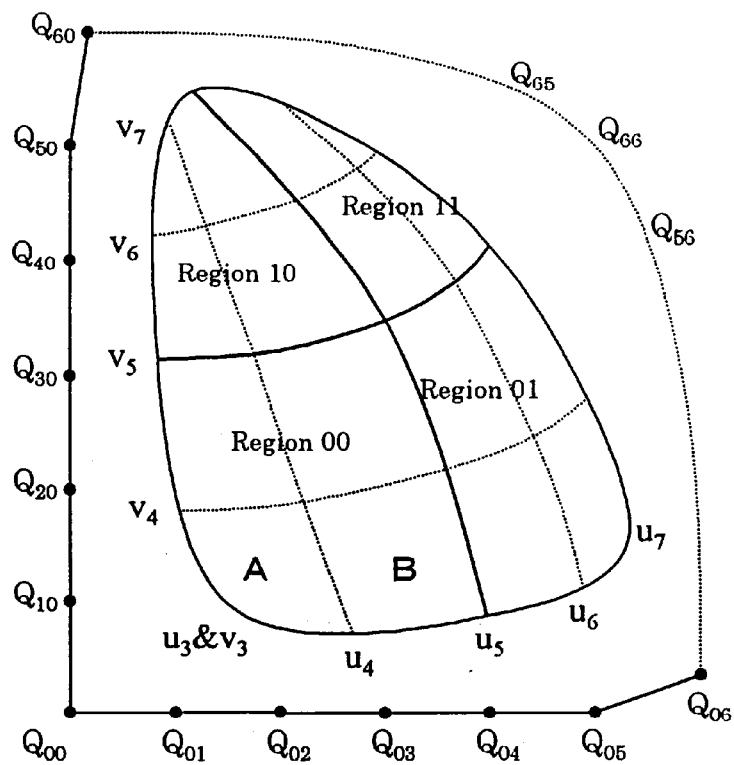
FIG. 41 is a diagram for describing a NURBS object divided into the four regions 00 to 11.
FIG. 42 is a diagram of a control point matrix for control points that affect a section A partitioned in the object diagrammed in FIG. 41.

In FIG. 41, for example, the control points that affect section A partitioned by $u_3$ to $u_4$ and $v_3$ to $v_4$ in the lower left corner will, from the control point matrix diagrammed in FIG. 42, be $Q_{00}$ to $Q_{33}$.

Similarly, the control points that affect section B partitioned by $u_4$ to $u_5$ and $v_3$ to $v_4$ adjacent thereto on the right side will be $Q_{01}$ to $Q_{34}$.

However, when only one the one side $u_4$, $v_3$ to $v_4$ is examined, it is seen that only 3×4 (=12) control points have an effect thereon, namely the control points $Q_{01}$ to $Q_{33}$ that are common to both of the control point matrixes diagrammed in FIG. 42. This is so because the two portions noted above are in contact without a break.

Figures 43A, 43B, 43C:
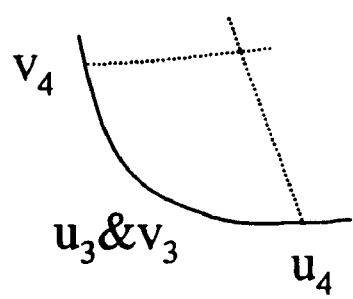
FIG. 43 is a diagram for describing control points that affect a side, represented by applying the concept diagrammed in FIG. 42.

The concept explained in the foregoing is now applied to a consideration of the side $u_3$ to $u_4$, $v_3$ and the side $u_3$, $v_3$ to $v_4$ diagrammed in FIG. 43A. The control points that affect the $u_3$, $v_3$ to $v_4$ side are the 3×4 (=12) control points $Q_{00}$ to $Q_{32}$ represented in FIG. 43B, while the control points that affect the $u_3$ to $u_4$, $v_3$ side are the 3×4 (=12) control points $Q_{00}$ to $Q_{23}$ represented in FIG. 43C.

Figure 44:
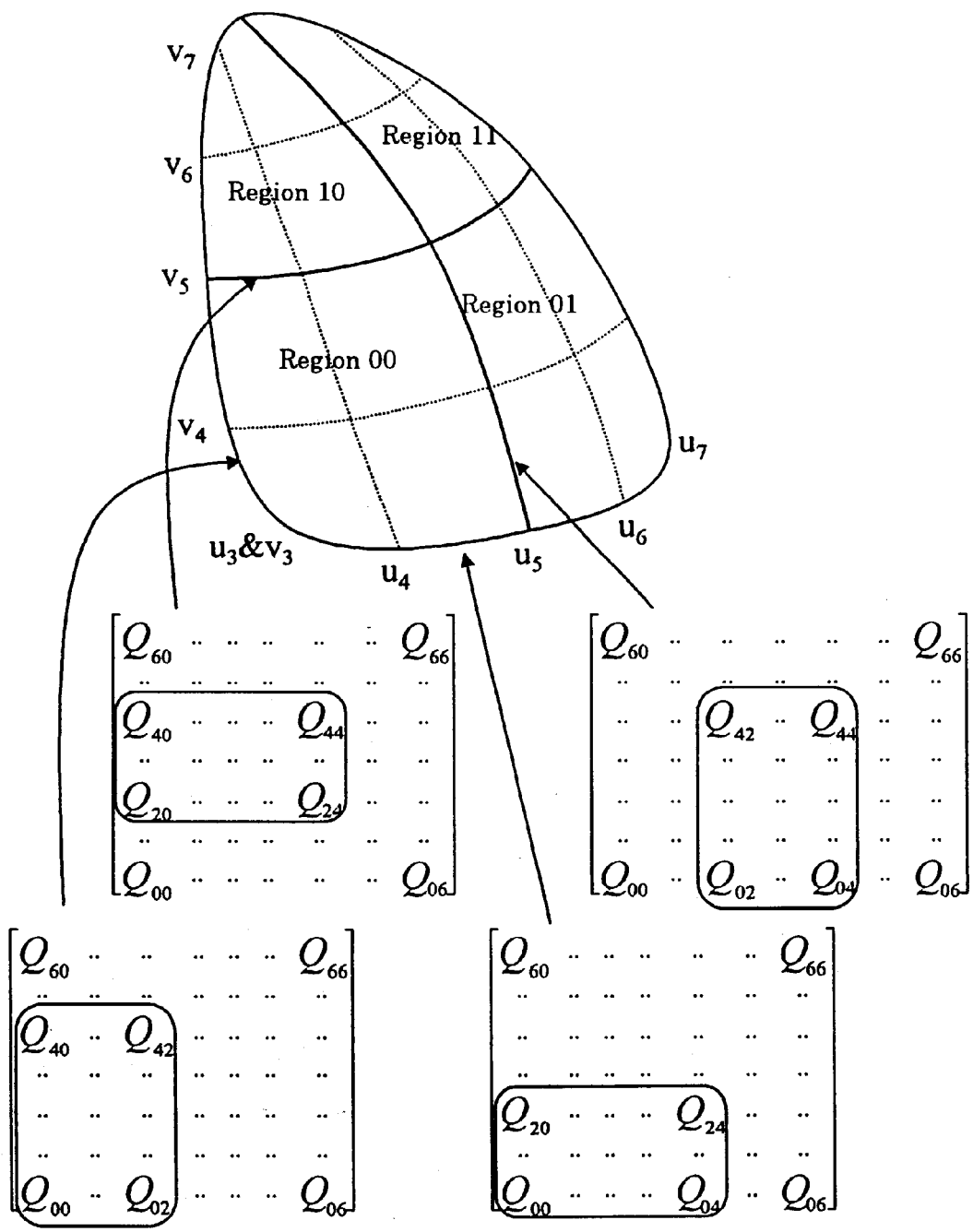
FIG. 44 is a diagram for describing control points affecting (curved) sides in the surface region 00 of the number object diagrammed in FIG. 41.

By further application, it turns out that the control points that affect the (curved) sides of the curved surface region 00 in the NURBS object are as diagrammed in FIG. 44. The same considerations can be applied to the sides of the other curved surface region.

Control point groups corresponding to the (curved) sides of a curved surface region are selected, and those control points are then converted to screen coordinates. An example thereof is diagrammed in FIG. 45. As represented in FIG. 45B, when the control point group $Q_{00}$ to $Q_{42}$ has been selected, the control points diagrammed in FIG. 45A are converted to screen coordinates.

Figure 45A:
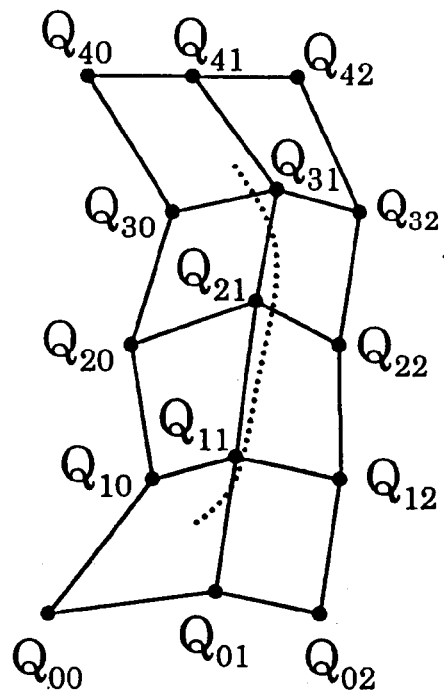
FIG. 45 is a diagram for describing how a group of control points corresponding to (curved) sides in a surface region is selected and those control points are converted to screen coordinates.
Figure 45B:
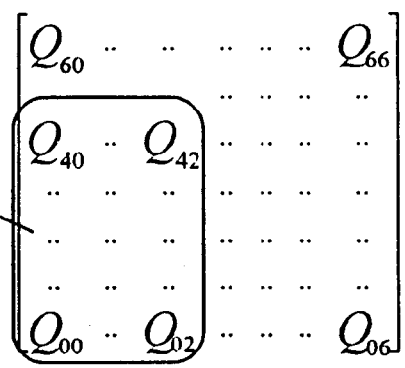

Following that, as diagrammed in FIG. 45A, quadrangles are formed by joining mutually adjacent control points, and the area of each quadrangle is calculated. The dotted line in FIG. 45A is a diagram corresponding to the shape of a side.

Figure 46:
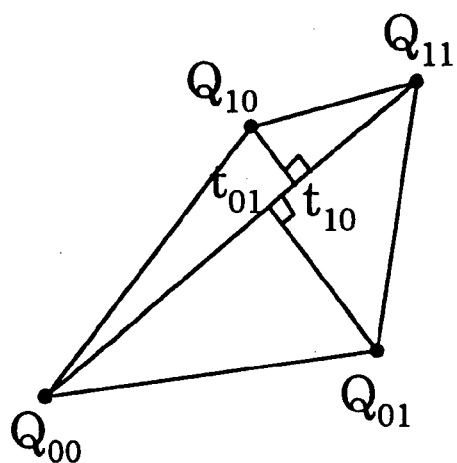
FIG. 46 is a diagram for describing a computation method for finding the surface area of four-sided polygons.

The sum of the areas of the quadrangles calculated is taken and called the "area on the screen obtained by joining control point groups." The areas of the quadrangles are found by formula 6, given below, breaking the quadrangle having the control points $Q_{00}$ to $Q_{11}$ down into right triangles as diagrammed for example in FIG. 46.

$$\left.\begin{aligned}
&\text{base } Q_{00} - Q_{11}: \sqrt{(x_{11} - x_{00})^2 + (y_{11} - y_{00})^2} \\
&\text{height } t_{10} - Q_{10}: \sqrt{(Q_{00} \sim Q_{10})^2 - (Q_{00} \sim t_{10})^2} = \sqrt{(x_{10} - x_{00})^2 + (y_{10} - y_{00})^2 - \frac{\{(x_{10} - x_{00})(x_{11} - x_{00}) + (y_{10} - y_{00})(y_{11} - y_{00})\}}{(x_{11} - x_{00})^2 + (y_{11} - y_{00})^2}} \\
&\text{height } Q_{01} - t_{01}: \sqrt{(Q_{00} \sim Q_{01})^2 - (Q_{00} \sim t_{01})^2} = \sqrt{(x_{01} - x_{00})^2 + (y_{01} - y_{00})^2 - \frac{\{(x_{01} - x_{00})(x_{11} - x_{00}) + (y_{01} - y_{00})(y_{11} - y_{00})\}}{(x_{11} - x_{00})^2 + (y_{11} - y_{00})^2}} \\
&Q_{10} \text{ direction as seen from } t_{10}: \\
&\text{comparing } y_{00} + \frac{x_{10} - x_{00}}{x_{11} - x_{00}}(y_{11} - y_{00}) \text{ with } y_{10} \\
&Q_{01} \text{ direction as seen from } t_{01}: \\
&\text{comparing } y_{00} + \frac{x_{01} - x_{00}}{x_{11} - x_{00}}(y_{11} - y_{00}) \text{ with } y_{01}
\end{aligned}\right\} \quad (6)$$

The x and y in the above formula are the x and y coordinates on the screen. Whether the sum or difference of the two triangle areas is taken is determined by the direction of $Q_{10}$ as seen from $t_{10}$ and the direction of $Q_{01}$ as seen from $t_{01}$.

When this is done, there will be cases, such as when the size of the object on the screen is small, when it is not necessary to accurately calculate the size of the area by adding the areas of all of the quadrangles. (The size of the area will not change irrespective of the complexity of the shape, so calculating the size of the area accurately will result in poor image processing efficiency.)

Accordingly, it is possible to change the number of control points to be considered according to the LOD (level of detail). That is, the smaller is the size of the object on the screen, the fewer is made the number of control points considered when estimating the size of the area.

Figure 47A:
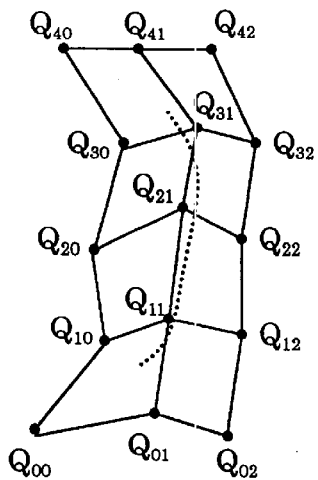
FIG. 47 is a diagram for describing an example of changing the number of control points in view by the LOD (level of detail)
Figure 47B:
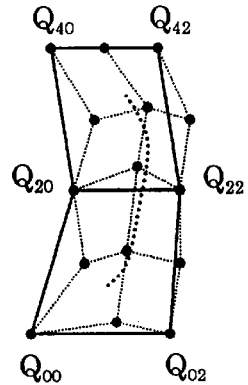
Figure 47C:
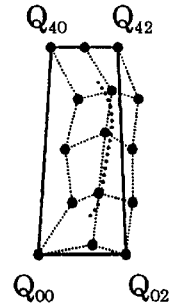

FIG. 47 is a diagram for describing an example of changing the number of control points considered, according to the LOD (level of detail), when estimating the size of the area. In FIG. 47A, if the number of control points when the LOD=1 is taken as a reference, then, as diagrammed in FIGS. 47B and 47C, the larger the LOD becomes and, accordingly, the smaller the size of the object displayed becomes, the fewer is made the number of control points when estimating the size of the area. For the (curved) sides of each of the curved surface regions, then, the number of divisions in a side is determined in direct proportion with the estimated area size.

Figure 48A:
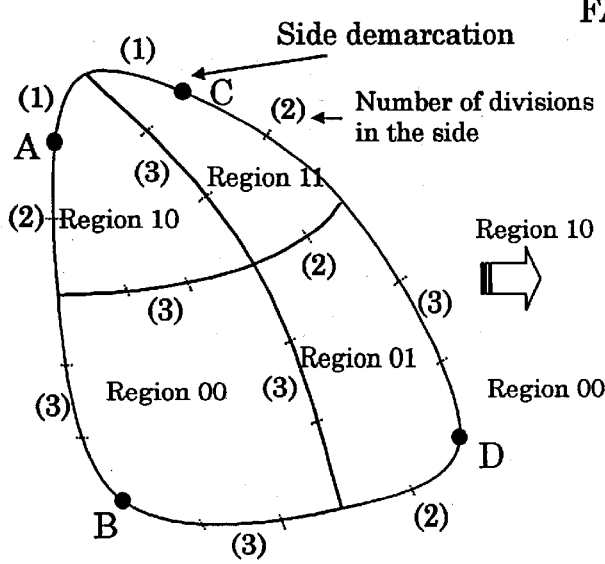
FIG. 48 is a diagram for describing the division of u and v knot sections.

Next, when the number of divisions in the curved surface regions has been determined, the u and v knot sections are divided, preferably making the u and v intervals equal. FIG. 48 is a diagram for explaining how the u and v knot sections are divided. In FIG. 48A, the black dots are object side demarcations, and the numerals in parentheses placed next to the sides joining the black dots are the number of divisions in the side.

For example, in FIG. 48, the side joining the black dot A in region 10 with the black dot B in region 00 can be called the left side, the right side corresponding thereto can be called the side joining the black dot C in region 11 with the black dot D in region 01, the side joining the black dots A and C can be called the upper side, and the side joining the black dots B and D can be called the lower side.

Figure 48B:
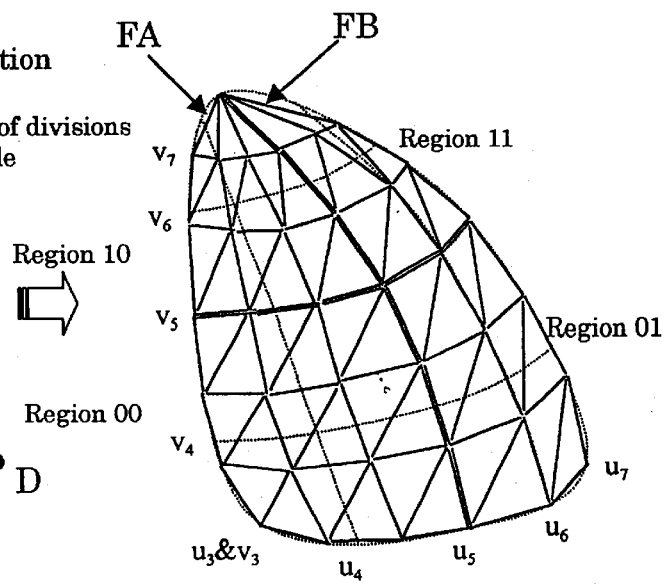

In FIG. 48A, the numerals in parentheses at the sides are the number of divisions in the side. Here, in general, the number of divisions will differ between the upper and lower and the left and right sides (totaling 4 (curved) sides) in the region. Accordingly, as represented in FIG. 48B, internal division points are made and the region is divided into polygons of triangle strips and a triangle fan.

Figure 49A:
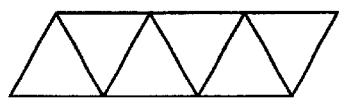
FIG. 49 is a diagram for describing a polygon triangle strip and triangle fan.

By polygon triangle strip here is meant a pattern like that diagrammed in FIG. 49A formed by sequentially generating one new vertex and alternately connecting triangle polygons so that they share the generated vertex and two [other] vertices.

Figure 49B:
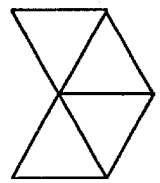

By triangle fan is meant a pattern such as diagrammed in FIG. 49B wherein triangle polygons are connected so that they all share one vertex. In FIG. 48B, the patterns FA and FB are triangle fans, and the other polygons are lined up in triangle strips.

Let us here consider the merit of first making a NURBS object into curved surface regions. When a NURBS object is divided into polygons, instead of immediately determining the number of polygon divisions according to the LOD value, in the method of the present invention, a division is first made into surface regions. This is done in order to have the number of polygon divisions correspond as much as possible to the different portions, there being comparatively flat portions and portions of high curvature in a NURBS shape.

Let us consider, for example, the processing for a folded figure having comparatively flat portions and portions of high curvature, such as is diagrammed in FIG. 50. When the number of polygon divisions is determined directly according to the LOD value, as in FIG. 50B, for the original NURBS object diagrammed in FIG. 50A, the number of divisions will be the same for the comparatively flat portions and the portions of high curvature, and it will be difficult to display the portions of high curvature.

Figure 50A:
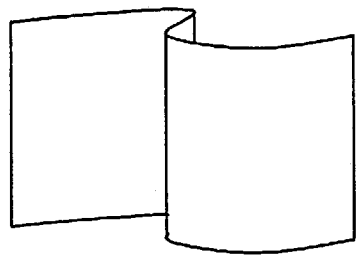
FIG. 50 is a diagram for describing the processing of a folded figure having comparatively flat portions and portions of high curvature.
Figure 50C:
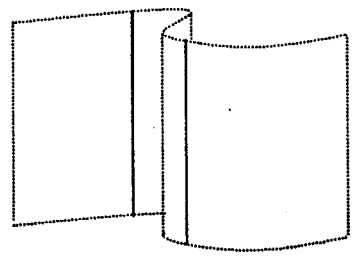
Figure 50B:
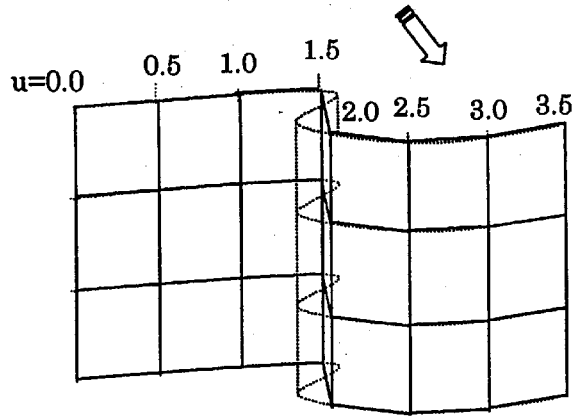
Figure 50D:
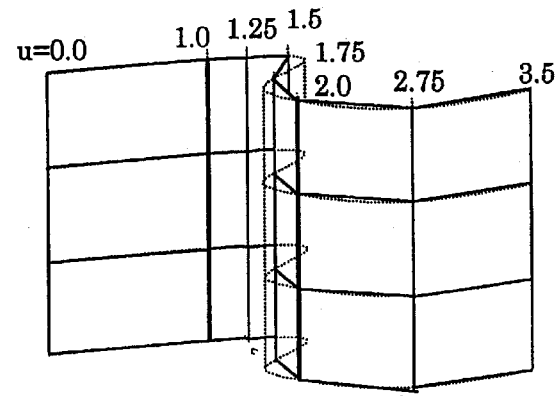

On the other hand, when the number of polygon divisions is determined according to the distance between representative control points, as diagrammed in FIG. 50D, after first making the surface regions (dividing into three surface regions), as diagrammed in FIG. 50C, it is possible to display the portions of high curvature better.

Figure 51A:
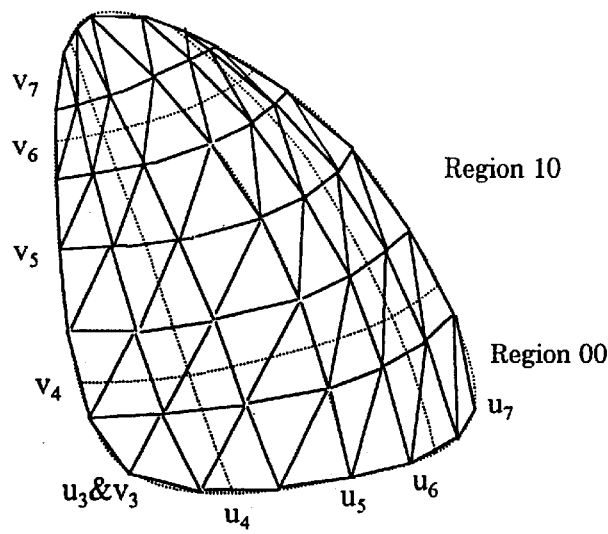
FIG. 51 is a diagram for comparing a case where the number of polygon divisions is determined directly by the LOD value and a case where the number of polygon divisions is determined after forming the surface regions.
Figure 51B:
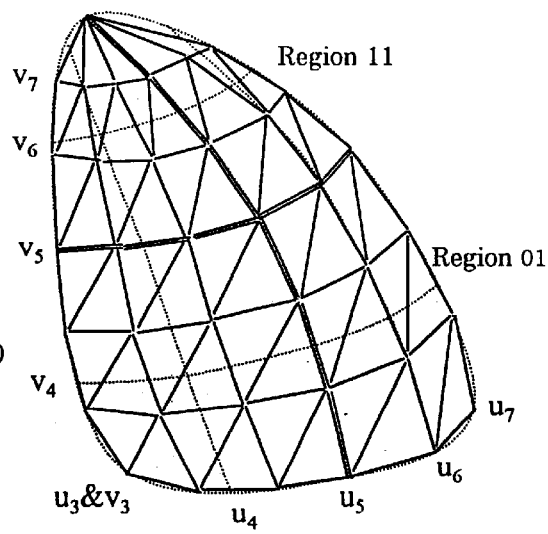

FIG. 51 is a diagram which compares the case (FIG. 51A) where, for the NURBS object diagrammed in FIG. 49A, the number of polygon divisions is determined directly according to the LOD value and the case (FIG. 51B) where the number of polygon divisions is determined after first making surface regions. FIG. 51B is displayed more efficiently.

Next, using the figure diagrammed in FIG. 52 as an example, a description is given of how a surface patch is divided into triangular polygons. The figure diagrammed in FIG. 52A has a side A between the demarcation points (0,0) and (1.0, 0), a side B between the demarcation points (0,0) and (0,1.0), a side C between the demarcation points (1.0, 1.0) and (1.0,0), and a side D between the demarcation points (0,1.0) and (1.0, 1.0). The numbers of divisions in sides A, B, C, and D are 3, 2, 4, and 4, respectively.

Figure 52A:
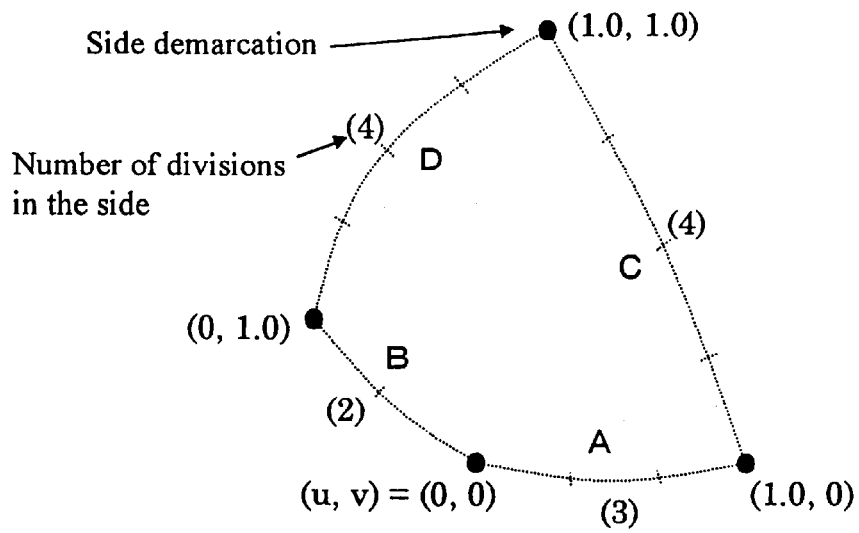
FIG. 52 is a diagram for describing the sequence wherewith a surface patch is divided into triangular polygons.
Figure 52B:
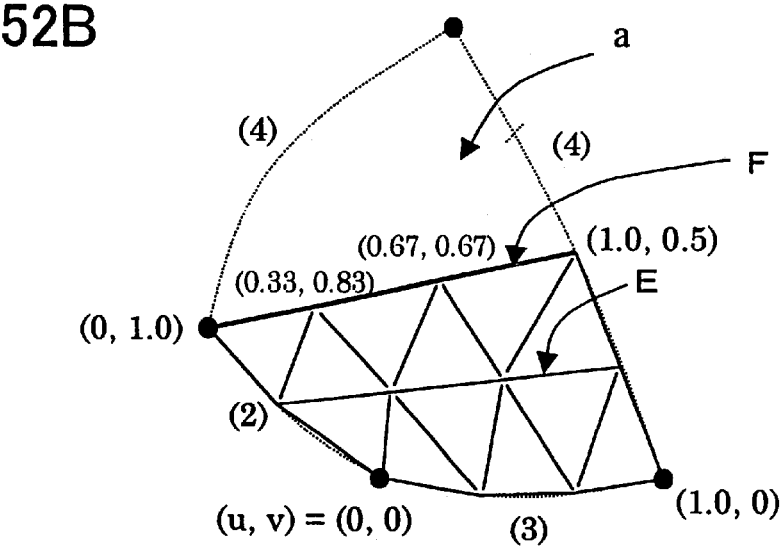

For such a figure as that diagrammed in FIG. 52A, firstly, as diagrammed in FIG. 52B, one (curved) side A is taken as the base, and the division points in the two adjacent sides B and C are joined, one by one, beginning from the points near the base, until one or other of the adjacent demarcation points is reached. In FIG. 52B, the joining is done until the demarcation point (0,1.0) is reached.

The sides E and F created in this way are divided with the same number of divisions as the base (the number of divisions being 3 in the example given in FIG. 52), so that the knot intervals are as uniform as possible, thus making interior division points. The interior division points so made are joined to form a triangle strip (cf. FIG. 49A).

The portion "a" not divided into polygons becomes a triangle, as represented in FIG. 52B, by the process described in the foregoing.

Figure 52C:
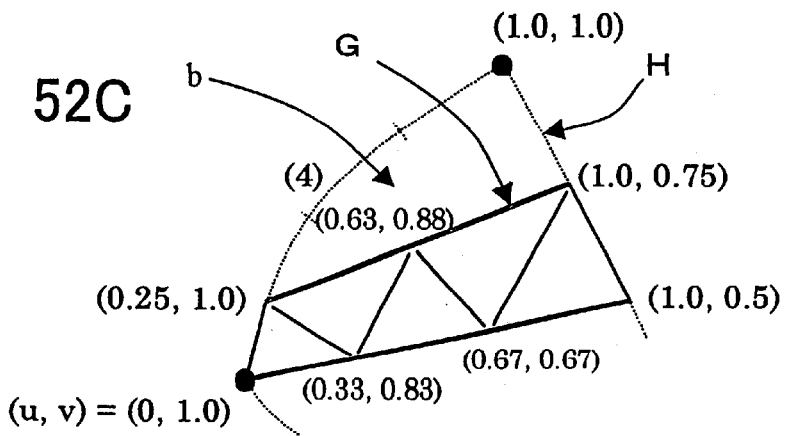

Taking the side F of the internal division points created by the first process as the base, similarly, the division points of the two adjacent sides are joined, one by one, from the points nearest the base, until there are no longer any division points in one or other of the sides, as diagrammed in FIG. 52C.

Next, as a second process, the side G mentioned earlier is divided by the number of divisions for (base-1) (or not divided if the base is 1), and internal division points are made. These internal division points are joined to form a triangle strip as in the first process described above.

By the second process, moreover, the portion b that is not divided into polygons becomes a triangle having division points in at most only two sides.

Figure 52D:
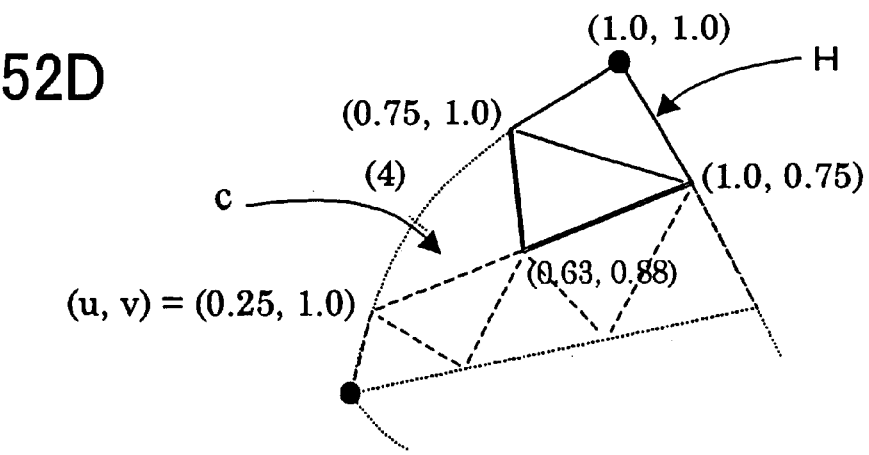
Figure 52E:
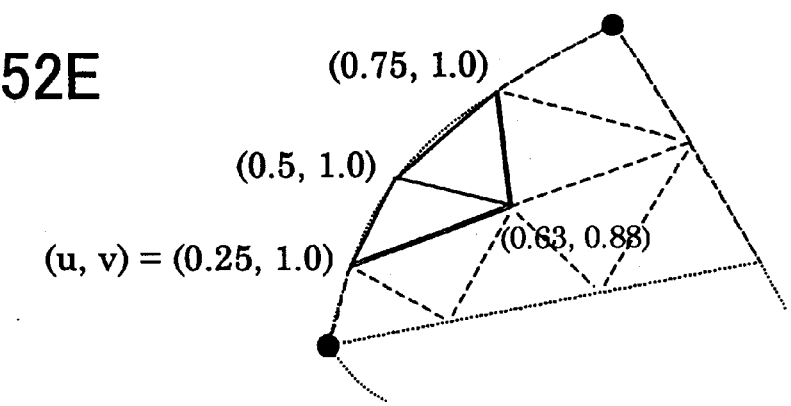

As a third process, the side H having no division points is made the base, and the division points in the two adjacent sides are joined, one by one, beginning from the points near the base, until there are no longer any division points in one or other of the sides, as diagrammed in FIG. 52D. The diagonals of the quadrangles formed thereby are connected to form two triangles in each. In the example diagrammed in FIG. 52D there is only one quadrangle.

Next, in a fourth process, the portion c not polygon-divided by the third process becomes a triangle having a division point in at most only one side. Accordingly, as diagrammed in FIG. 52E, the remaining division point and the contact points of the two sides having no division point are joined to form a triangle fan (cf. FIG. 49B).

Figure 52F:
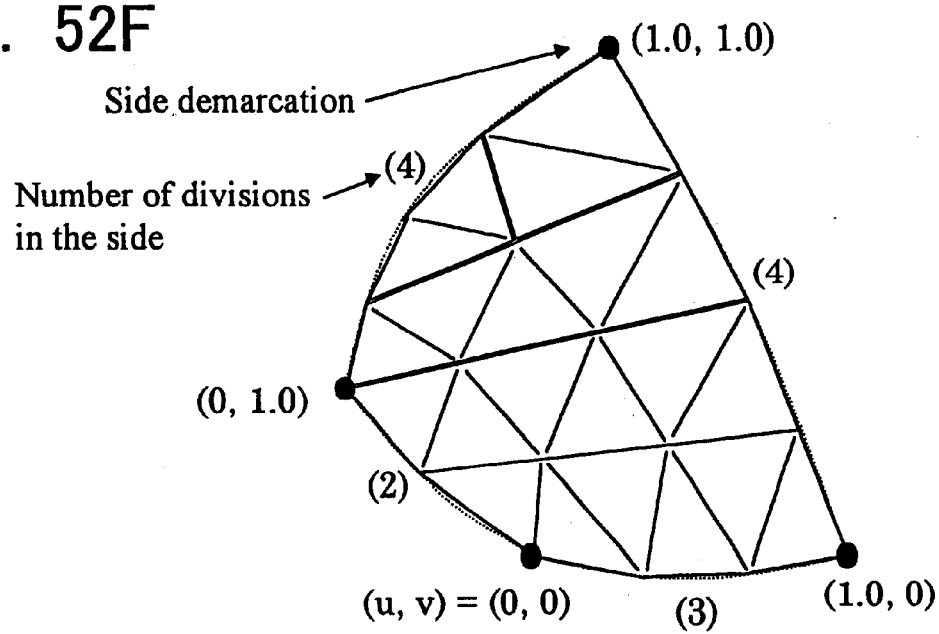

Finally, the surface patch is divided into a plurality of triangular polygons as diagrammed in FIG. 52F.

Figure 53A:
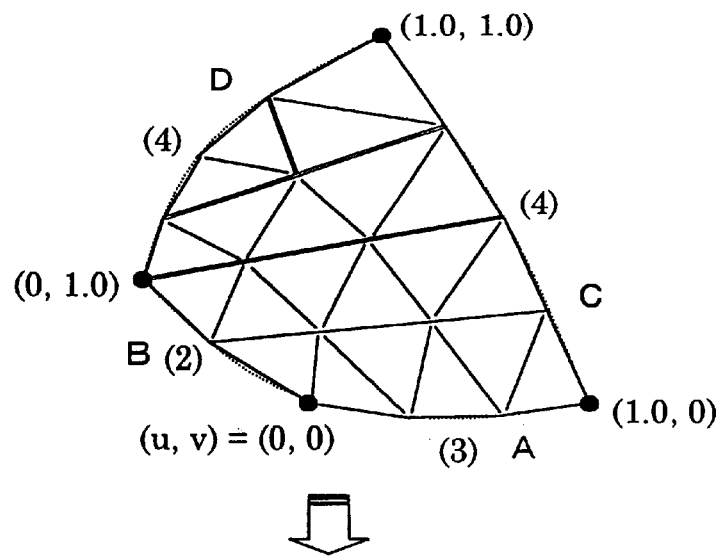
FIG. 53 is a diagram for describing the effect on the number of polygon divisions resulting from the selection of any one (curved) side of a surface patch.
Figure 53B:
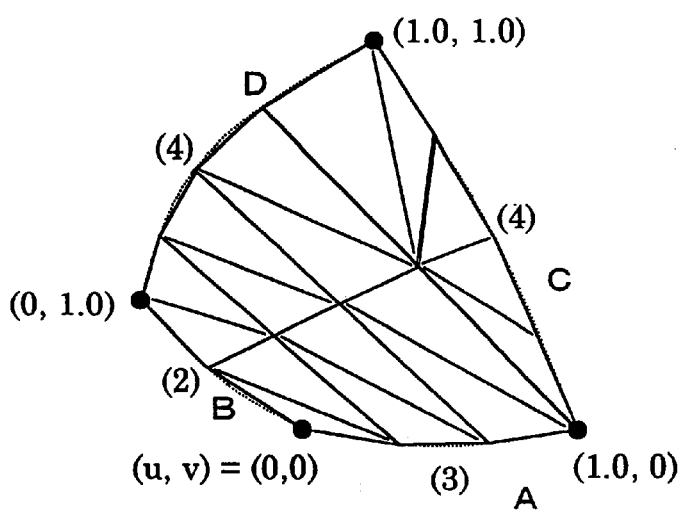

Here, with the division method described with reference to FIG. 52, any one (curved) side A of the surface patch is taken as the base (cf. FIG. 53A). However, if it should happen that the side B having the fewest division points (the number of division points being 2 in this case) is taken as the base, there is a possibility that the polygon surface approximation error will exceed the range allowable. In other words, when the side B having the fewest division points, in FIG. 53B, is taken as the base, the divisions become too rough.

In order to prevent this from happening, a method is possible wherein either condition 1 or condition 2 noted below is imposed and the base side is not left up to discretion.

Condition 1: The side having the most divisions is taken as the base. (In this case, while the approximation error is minimized, the number of polygons generated becomes larger.)

Condition 2: The side having a number of divisions closest to the average value of the number of divisions of all of the sides is taken as the base.

The method of dividing a NURBS surface patch into triangular polygons can be generalized and summarized by the following algorithms.

1. Find the base side by either condition 1 or condition 2 noted above.

2. Find UV values by interpolation between the left and right sides, by precisely the number of U or V steps that is shorter, or precisely the number of steps −1 if the number of steps in the left and right sides are the same, and by precisely the number of steps for the base for each step, thereby generating triangle strip information.

Figure 53C:
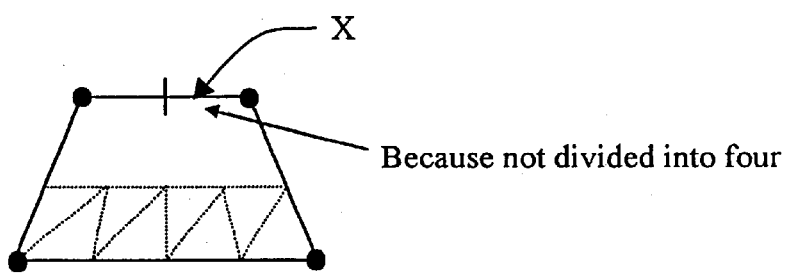

The condition "precisely the number of steps −1 if the number of steps in the left and right sides are the same" noted above is imposed so that side X will not be divided into four in a case such as is diagrammed in FIG. 53C.

3. Find uv values by interpolating between the left and right sides by precisely the number of U or V steps for (long step number −1−short step number) or (next side step number −1), whichever is shorter, and by precisely the (base step number −1) number of steps for each step.

In 2 above, however, nothing is done if the number of steps for the left and right sides is the same, whereupon new triangle strip information is generated.

Figure 53D:
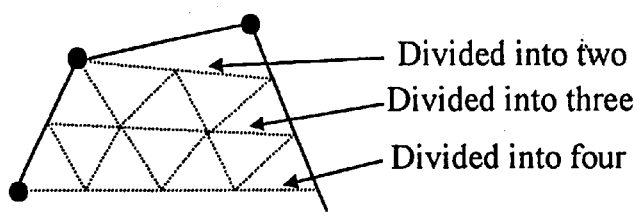

When the steps in 3 are [done] a plurality of times, the number of steps is lessened one each, as diagrammed in FIG. 53D.

4. Switch the base to the remaining step portion of the longer of the left and right sides.

5. Generate triangle strips by precisely (shorter step number −1) of left and right sides for the base switched to.

6. Generate (a) triangle fan(s) using the remaining steps.

The computation processing in the division of the NURBS object described above is now considered.

In dividing a NURBS object into curved surface regions, then taking sampling points and dividing further into triangle strips or triangle fans, if 3D vertex coordinates are calculated from the vertex u and v knot values for the polygons every time a triangle strip or triangle fan is generated, the computations will be done redundantly two or three times for the vertices of the surface regions, which is inefficient.

That being so, in the present invention, a table is prepared so that all of the vertices in the surface regions can be included, and the u and v knot values for the vertices are temporarily stored. Connection information for returning to the triangle strips or triangle fans is also produced.

Then measures are taken so that the polygon 3D vertex coordinates are calculated from the u and v knot values stored. By so doing, redundant computations for the vertices are eliminated, so efficiency is good.

Figure 54A:
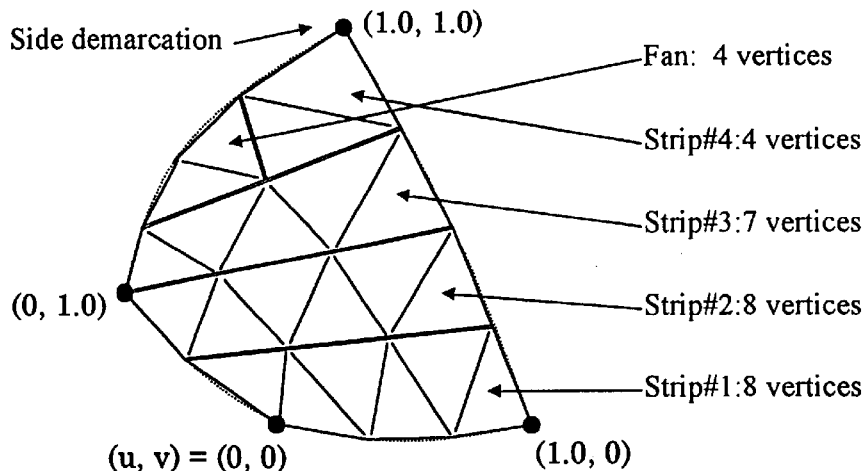
FIG. 54 is a diagram representing an example of making fewer the number of computations for 3D vertex coordinates.
Figure 54B:
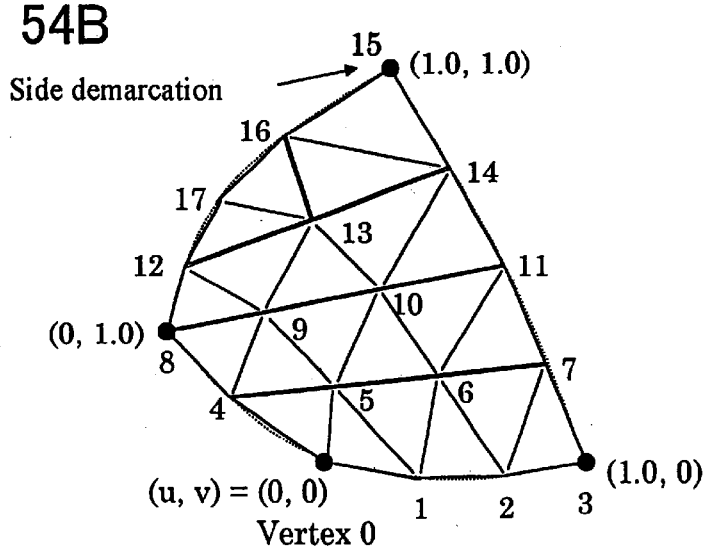

An example of reducing the number of computations for such 3D vertex coordinates is diagrammed in FIG. 54. In the case diagrammed in FIG. 54A, vertex coordinates are computed every time a triangle strip is generated. Accordingly, strip #1 and strip #2 each have 8 vertices, strip #3 has 7 vertices, strip #4 has 4 vertices, and the one fan has 4 vertices.

The total number of vertices is therefore 31. These 31 vertices exist redundantly for the strips #1 to #4 and the fan, as a result of which chances for redundant computations arise in the 31 vertex computations.

Figures 55, 56:
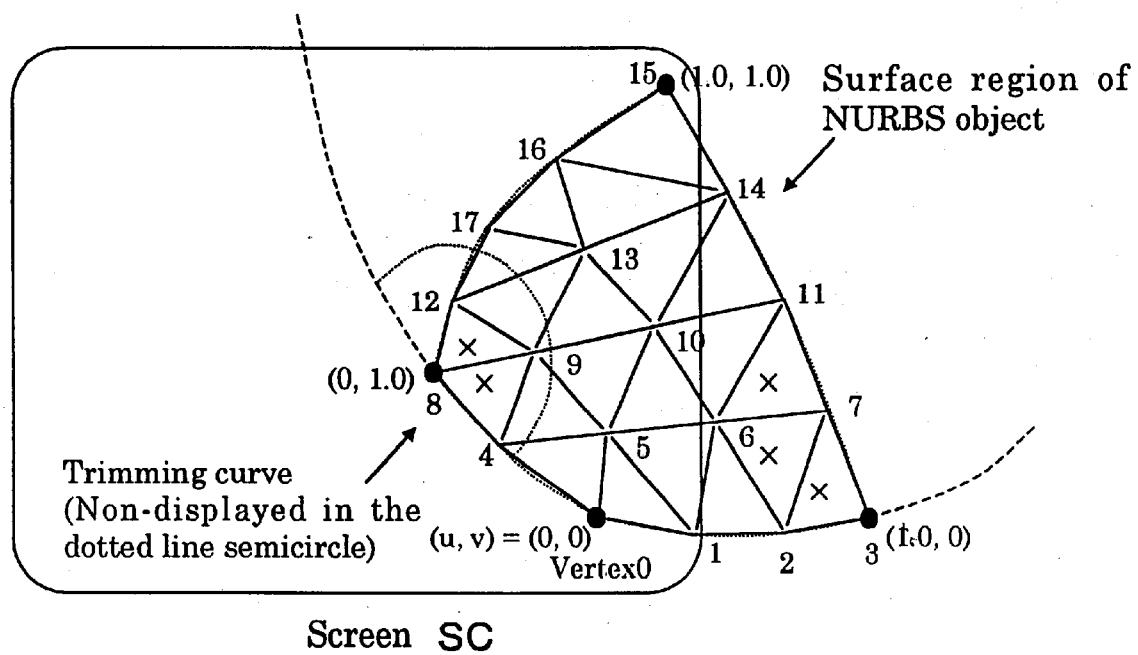
FIG. 55 is a diagram representing a table of vertex numbers registered when division into polygons is done.
FIG. 56 is a diagram for describing polygon deletion.

To counter this, a table of vertex numbers is registered when dividing into polygons, as represented in FIG. 55. 3D vertex coordinates x, y, z are calculated from the (u, v) corresponding to the vertex numbers for the NURBS object registered in the table given in FIG. 55. In this way, the strips #1 to #4 and the fan are specified by the connection information for joining these vertices, as diagrammed in FIG. 54B.

That is, strip #1 looks like vertices 3-7-2-6-1-5-0-4. For the fan, the vertex 13 is redundant, so it is specified with the connection information 13=16-17-12.

By using such a table as this, the task can be completed with vertex computation iterations corresponding to 18 vertices.

Thereupon, by computing the 3D vertex coordinates from the vertex numbers registered in the table, it can be learned whether a polygon is positioned inside or outside of the screen, as described earlier in conjunction with FIG. 13 and FIG. 14, and whether [that polygon] faces forward or backward from the viewing point.

Accordingly, it is possible, just after the 3D vertex coordinate calculation stage, to eliminate the vertices of polygons positioned outside the screen or facing backward from the viewing point. This then makes it possible to reduce the load involved subsequently in vertex NURBS computations for attributes (texture coordinates, normal vectors, color, translucency, etc.).

It is also possible, just after the stage of calculating the 3D vertex coordinates, to perform trimming, and to eliminate polygon vertices.

FIG. 56 is a diagram for describing such polygon deletion. A triangle, that is, a polygon, which contains the vertices 3 and 7 in a NURBS object, becomes non-displayable because it is outside a screen SC. Accordingly, it is possible to delete the vertices 3 and 7 from the vertices to be computed.

Even if inside the screen SC, in cases where deletion is performed by trimming, the result is non-display. In the example diagrammed in FIG. 56, the dotted-line semicircle containing the vertex 8 is deleted by trimming, wherefore the triangle having this vertex 8 contained in the dotted-line semicircle becomes non-displayed, so the vertex 8 can be deleted from computation.

Vertices in polygons that have become backward-facing from the viewing point can also be deleted, but the determination of whether this polygon is on the back or not can be determined by finding the outer product (normal vector) of two sides and examining the direction thereof.

Next, formulas for calculating data for sampling points on a NURBS surface will be studied and a method proposed for further reducing the computation load.

Points P(u,v) on a NURBS surface are found by the formulas 3 to 5 given earlier. In actuality, the control points Q and the points P on the curved surface have the following parameters, and those parameters must be calculated using the formulas 3 to 5.

(1) 3D coordinates: x, y, z
(2) 2D texture coordinates: s, t
(3) Normal vectors: (Nx, Ny, Nz)
(4) Color, translucency: R, G, B, α

Parameters (2), (3), and (4) above are attributes.

In order to calculate the 3D coordinates $x_P$ for a point P on a curved surface, for example, the computation represented in formula 7 below must be performed.

$$x_P(u, v) = \frac{\sum_{i=i\min}^{i\max}\sum_{j=j\min}^{j\max} M_{i,k}(u)N_{j,L}(v)\omega_{ij}x_{ij}}{\sum_{i=i\min}^{i\max}\sum_{j=j\min}^{j\max} M_{i,k}(u)N_{j,L}(v)\omega_{ij}}$$

Eliminating as many useless sampling points as possible is therefore effective in reducing the computation load.

Now will be described an example configuration of a computation unit for performing, according to the present invention, at high speed, the calculation of values for B-spline blending functions (Cox-deBoor recurrence formulas) such as are necessary in calculating sampling points that can be used in a method for sampling points on a NURBS surface and dividing into polygons, such as is described in the foregoing.

The principle of this computation unit is first described. Taking knot values u and knot strings $[u_0, u_1, u_2, \ldots, u_{m-1}]$ (where m=number of control points+degree K) as inputs, the values $M_{x,k}$ (where the number of M's is the same as the degree) of a blending function are calculated for the output.

The blending function is a recurrence formula, wherefore, in order to calculate the value of the blending function at some degree, the value of the blending function at one small degree must be calculated.

That being so, the values of the blending function are calculated one degree at a time, beginning with a small degree. Because the computations are performed in a pipeline scheme, however, the timing wherewith the final blending function value at one degree is calculated overlaps the timing wherewith the first blending function value at the next degree is calculated.

Figure 88:
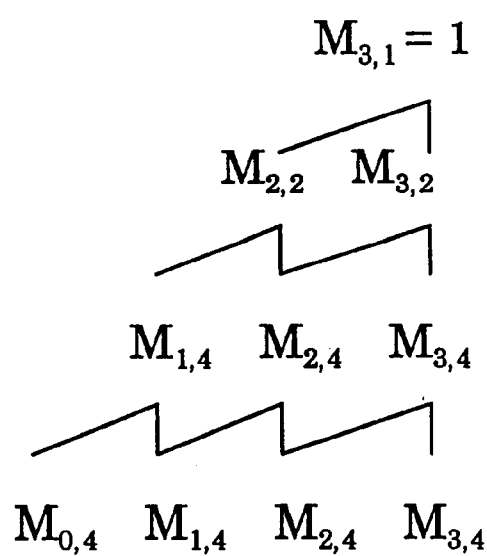
FIG. 88 is a diagram representing blending functions corresponding to FIG. 87.

As described in conjunction with FIG. 88 and also diagrammed in FIG. 57, in an example Cox-deBoor recurrence formula, the value of a blending function at one degree is calculated from product terms using the value of the blending function at one small degree. As an example, $M_{x,2}$ is calculated from $M_{x,1} + M_{(x+1),1}$.

Now, the four product terms comprising the two product terms at either end can be calculated faster than the other product terms by the time required for the addition of two product terms in order to calculate the value of the blending function at the one small degree.

Making use of this fact, four computation units are used to calculate in parallel the four product terms comprising the two product terms at either end (or the two product terms comprising one at either end in the case of two computation units), and an adder is used to add the two product terms and thus calculate the value of one blending function. That is, blending function values, in one degree, are calculated sequentially from both ends toward the middle.

In FIG. 58 is given an example computation for a 5-degree NURBS curve. This computation is performed stepwise, as indicated in FIG. 59, following the principle described with FIG. 57.

In FIG. 58, for example, in step 1, $M_{3,2}$ and $M_{4,2}$ are found from $M_{4,1}=1$. In step 2, $M_{2,3}$ and $M_{4,3}$ are determined, whereas in step 3 $M_{33}$ is determined. This is because an addition process is involved in computing $M_{3,3}$. Next, whereas $M_{1,4}$ and $M_{4,4}$ are determined in step 3, in step 4 $M_{2,4}$ and $M_{3,4}$ are determined.

The reason for this is that, in a Cox-deBoor recurrence formula, whereas $M_{1,4}$ and $M_{4,4}$ are calculated from only $M_{2,3}$ and $M_{4,3}$, [the calculation of] $M_{2,4}$ and $M_{3,4}$ also requires $M_{3,3}$.

Figure 60:
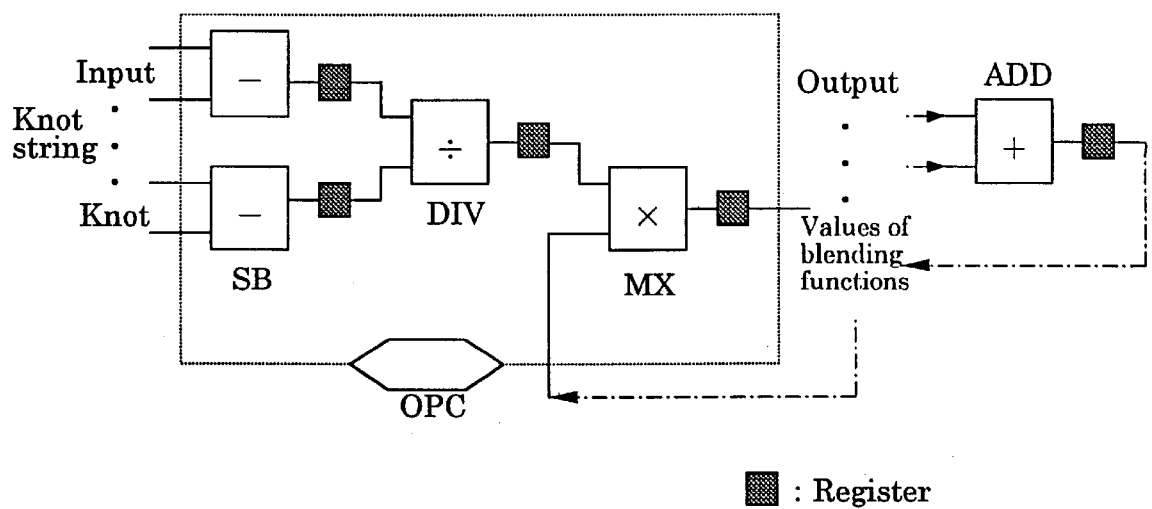
FIG. 60 is a diagram of an example configuration of a unit computation unit that configures a computation device for computing recurrence formulas at high speed.

In order to compute the above recurrence formulas at high speed, the computation system has, in the B-spline computation unit 203 indicated in FIG. 1, [two] subtractors SB for subtracting two knot strings input for subtraction at a time, as indicated in FIG. 60, a divider DIV for performing the divisions input from the two subtractors SB, and a multiplier MX for multiplying the output of the divider DIV and the output of an adder ADD, that is, a computation unit OPC which functions as a unit computation unit for performing pipeline computations.

Figure 61:
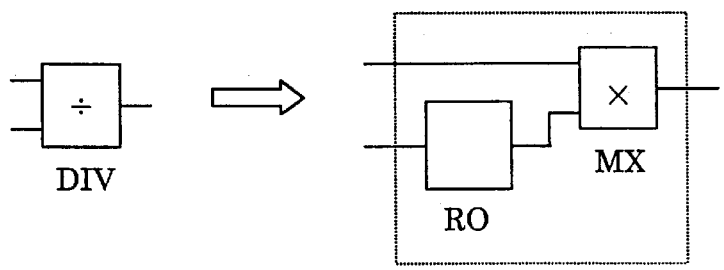
FIG. 61 is a diagram of an example configuration of a divider in the computation unit configuration diagrammed in FIG. 60.

In the configuration of the computation unit in FIG. 60, the divider, as diagrammed in FIG. 61, comprises an inverter RO for inverting the sign of one input and a multiplier MX. Accordingly, in FIG. 60, the unit for computing the recurrence formulas at high speed can basically be configured by an addition-subtraction circuit and a multiplier.

Figure 62:
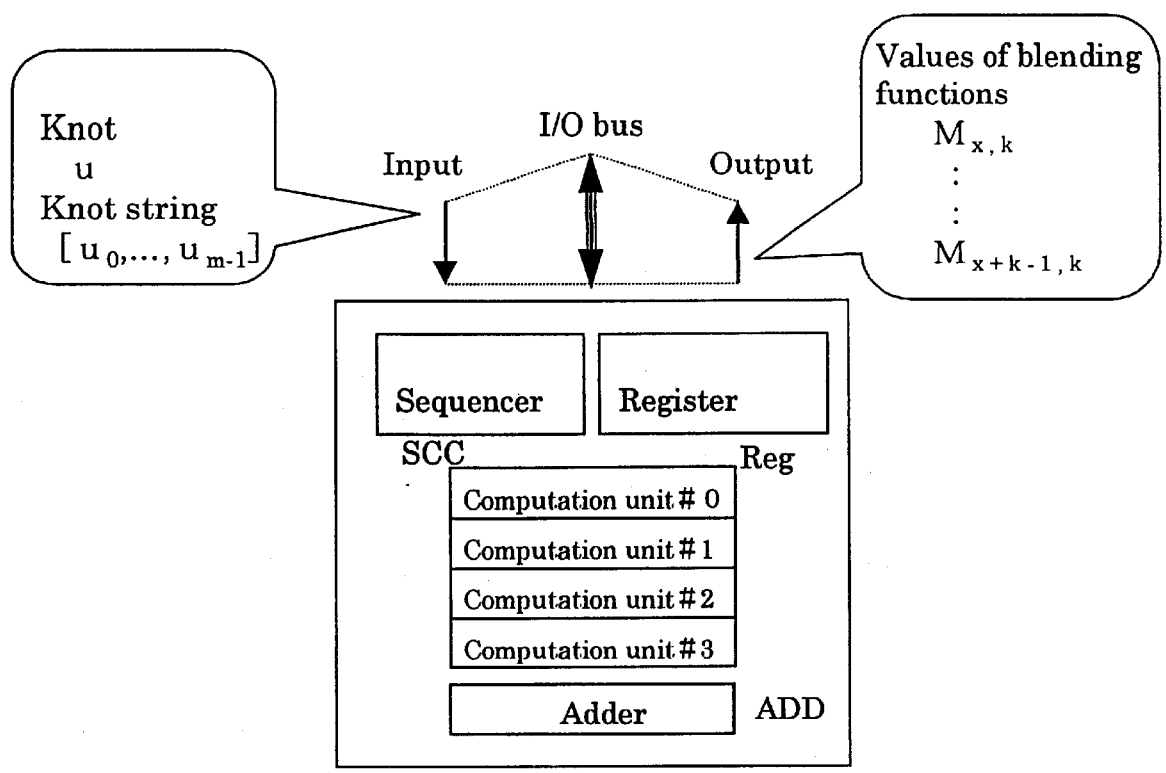
FIG. 62 is a diagram for describing an example configuration of a computation device for computing recurrence formulas at high speed that is configured inclusive of the unit computation unit diagrammed in FIG. 60.

The computation system, as is indicated in the overall configuration diagrammed in FIG. 62, has four of the unit computation units (#0 to #3) diagrammed in FIG. 60. (Or it may be configured with two computation units to keep the cost down.) The system also has an adder ADD for adding the outputs from the four unit computation units #0 to #3. The system also has a sequencer SCC for regulating the operation of the unit computation units #0 to #3 and a register Reg for temporarily holding outputs. The data input to this computation system diagrammed in FIG. 62 are knot values u and knot strings $[u_0, u_1, u_2, \ldots, u_{m-1}]$ (where m=number of control points+degree K). The system outputs the values $M_{x,k}$ (where the number of M's is the same as the degree) of blending functions which it calculates. These input and output data are connected to the polygon generator 202 via an I/O bus.

Figure 63:
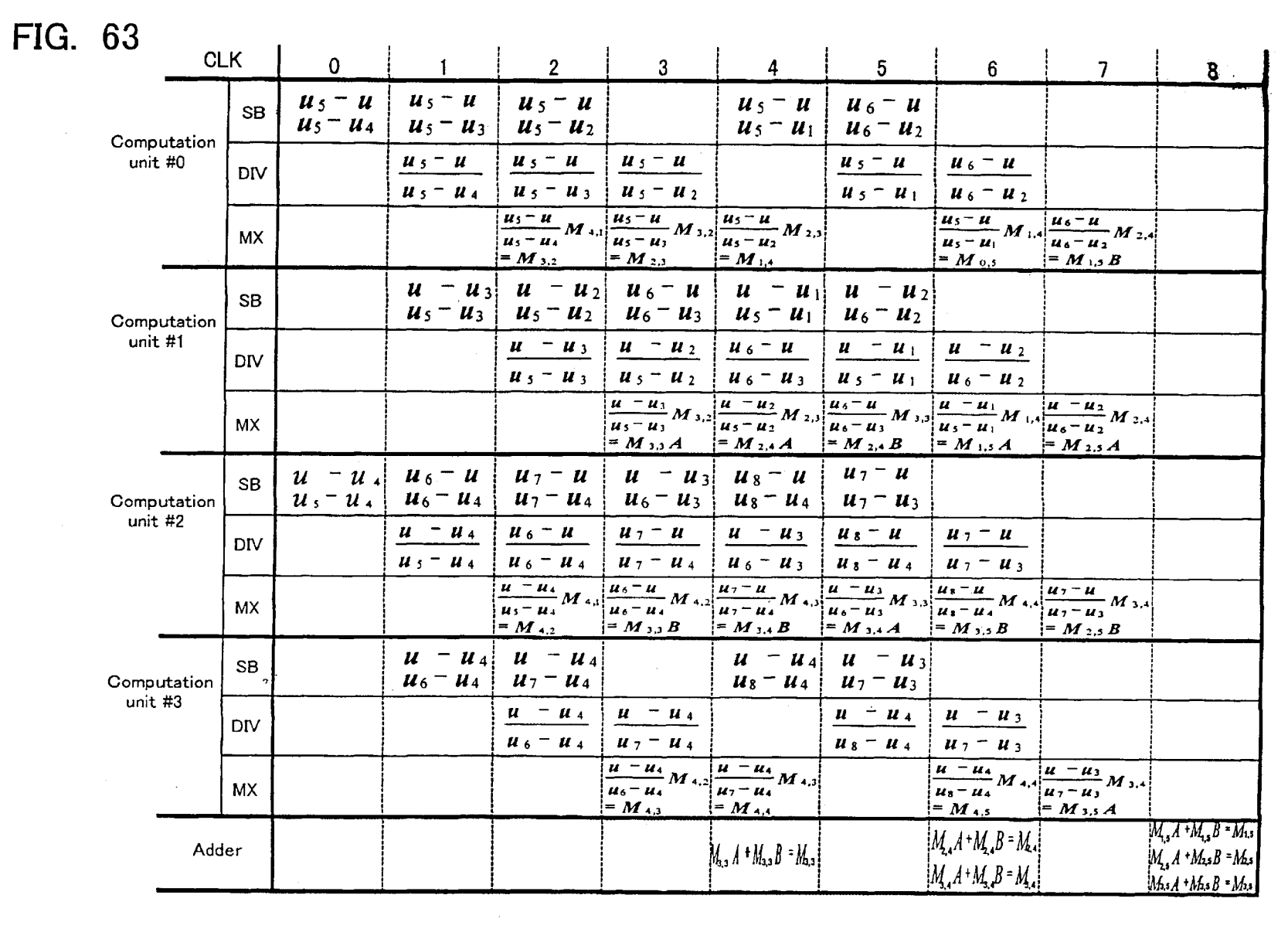

The computation routines of the computation system diagrammed in FIG. 62 are diagrammed in FIG. 63. In FIG. 63, clock signals CLK are plotted on the horizontal axis and the process routines of the #0 to #3 computation units are indicated on the vertical axis. The process particulars for the subtractors SUB, divider DIV, and multiplier MX are indicated in the computation unit process routines.

We now examine the computation system indicated above (FIG. 62) together with the computation routines therefor (FIG. 63), and also look at how these are applied to NURBS objects made up of many and/or high-degree patches.

To begin with, in the case of many patches, the B-spline blending functions applied to adjacent patches are simply shifted one at a time as in the example diagrammed in FIG. 64. Accordingly, if, for patches which are adjacent to the many patches, the knots and knot strings input to the computation system are shifted over one at a time, the computation system diagrammed in FIG. 62 and the computation routines therefor (FIG. 63) can be used.

In the case of a high-degree patch, the number of blending functions required is large compared to what is needed for a lower-degree patch, and the procedures for calculating those blending functions are complex. Nevertheless, as may be understood from the fact that the values of blending functions at one degree are calculated using the values of blending functions at one level lower degree, the computation procedures for calculating the values of lower-degree blending functions can be used as is when calculating high-degree blending functions.

In other words, the computation procedures for calculating blending functions at some given degree is, the computation procedures for calculating the blending functions at that given degree −1, and subsequently the computation for calculating the blending functions at the given degree using the blending functions at the given degree −1. An example of such a relationship is also seen in the computation procedures for calculating the 4-degree blending functions represented in FIG. 65.

To this point, various descriptions have been given of embodiments according to the present invention, in an apparatus for dividing a NURBS surface model into a plurality of polygons, and performing image display. Ordinarily, however, the three-dimensional coordinate model images of humans and the like displayed in video game devices and the like are configured from a plurality of small portions (hereinafter called "sections").

In some cases, there are closed curves such as circles in the section portions, that is, cases where trimming portions are formed that are represented by trimming curves. When polygonization is effected with such trimming portions in view, as in the technology cited in Japanese Patent Application Laid-Open No. H1-201777/1989 (published), for example, intersections between u and v lattices for parametric curved surfaces containing NURBS surfaces and segments of trimming curves, and vertices of segments of trimming curves, are calculated.

Then, together with newly calculated vertices, polygonization is performed. Accordingly, with such conventional methods as this, the number of polygon vertices is extravagantly increased. Due to this, the computation volume increases dramatically, and the computation processing load on the CPU becomes large.

Determinations are also made as to whether or not trimming has been done on polygons not subject to NURBS surface trimming. Accordingly, the volume of computations required for polygonizing one NURBS surface section becomes enormous.

For this reason, the method for processing trimming curves according to the technology described in the laid-open and published patent application cited above is very difficult to apply to three-dimensional image processing systems having interactive and real-time applications such as video game devices.

The present invention provides, as embodiments, a method for processing trimming curves that as much as possible simplifies computations for trimming when handling data for such a NURBS surface model, and a three-dimensional image processing system which uses that method.

The present invention also provides a method for processing trimming curves that makes it possible to draw trimmed NURBS surface models in real time, and a three-dimensional image processing system which uses that method.

The trimming curve processing method that achieves the objects of the present invention, in its basic configuration, has the following processing steps. The three-dimensional image processing system that uses this method is configured so that it has corresponding processing means.

A summary description is now given of those processing steps. Corresponding to a parametric curved surface represented by a plurality of vertices in the u and v directions in parametric space, a two-dimensional array having the same size as the number of vertices in the u and v directions is generated. Next, trimming curves on the parametric surface are converted to polygons based on straight line segments in the two-dimensional array. Then determinations are made as to whether to make the vertices in the polygons converted to valid or invalid.

Further, in terms of a specific mode, when, in the description above, the vertices in a polygon converted to are made valid, that polygon is treated as one to be drawn, and when the vertices inside a polygon converted to are made invalid, that polygon is deleted from among the polygons to be drawn.

Triangular polygons are then generated based on the vertices determined to be valid. In terms of a specific mode, when three vertices have been determined to be valid, a triangular polygon having the three vertices determined to be valid is generated. Alternatively, when at least one of three vertices has been determined to be valid, a triangular polygon containing the one vertex determined to be valid is generated.

The method of drawing trimmed curved surfaces in real time that is an embodiment here in the present invention is also implemented in the image display apparatus according to the present invention diagrammed in FIG. 1. In particular, it is implemented by the polygon generator 202 in FIG. 1.

Figure 66:
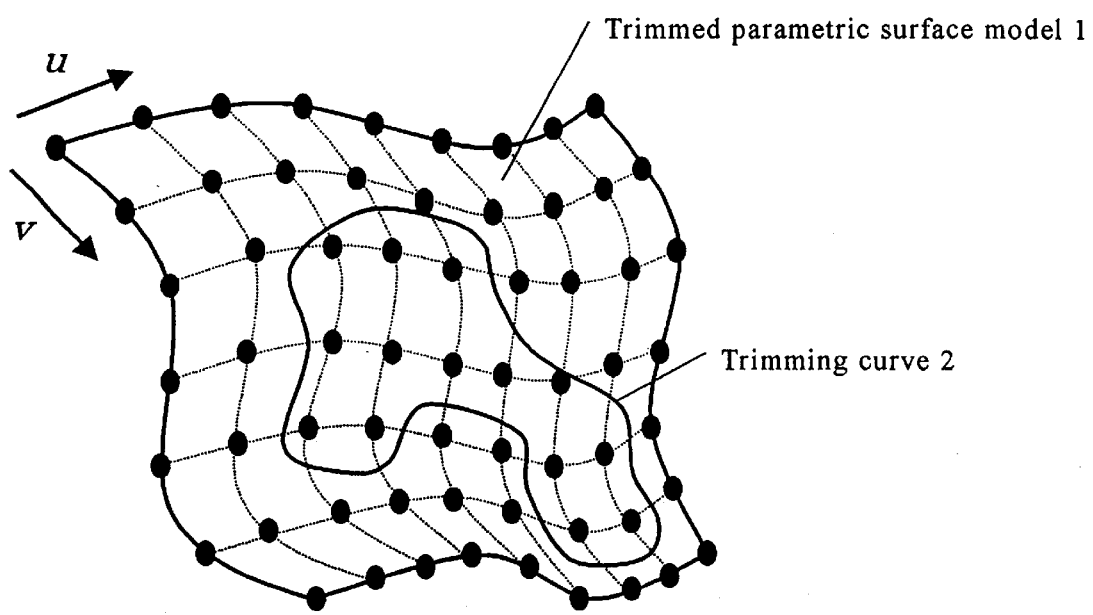
FIG. 66 is a diagram of one example of a patch formed by a parametric surface model e.g. a NURBS surface or the like formed by a parametric curve 1 having a u direction and a v direction.

In FIG. 66 is diagrammed an example of a section formed by a parametric surface model such as a NURBS surface in the u and v directions as noted earlier. This section of the parametric surface model 1 has a trimming area defined by a trimming curve 2.

The present invention relates to a technique for drawing, in real time, parametric surface models such as those having such trimmed NURBS surfaces. Polygon generation processing for drawing a trimmed parametric surface model in real time according to the present invention is now described with reference to the process flowchart given in FIG. 67.

Figure 67:
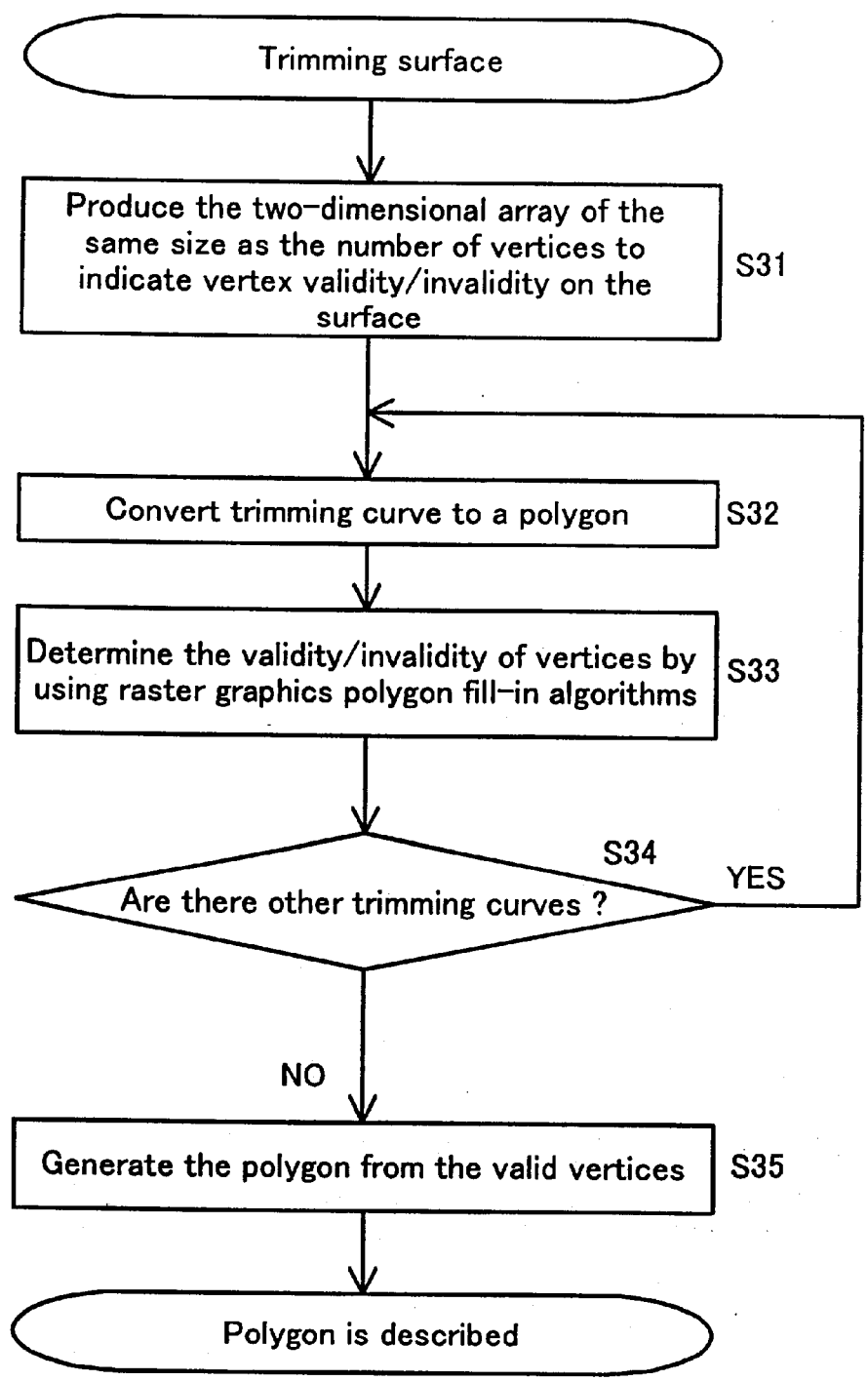
FIG. 67 is a flowchart for a polygon generation processing method for drawing a trimmed parametric surface model in real time.

FIG. 67 is a flowchart of operation processing in the polygon generator 202 and B-spline computation unit 203 of FIG. 1. More particularly, the process routines in step S32 are executed in the polygon generator 202 and B-spline computation unit 203, while the process routines in the other steps, namely step S31 and steps S33 to S35, are performed in the polygon generator 202.

At this time, the processing routines in the polygon generator 202, and B-spline computation unit 203, respectively, are controlled and executed by a program stored in a memory (not shown). First, a two-dimensional array of the same size as the number of vertices in the u and v directions configuring the parametric surface model diagrammed in FIG. 66 is produced as diagrammed in FIG. 68 and initialized (step S31). This two-dimensional array is hereinafter called an "vertex array."

Ordinarily, a plurality of data such as coordinate values are contained as vertex (black dots in FIG. 68) data, as described earlier. The elements in the vertex array produced here, however, may be limited to flags indicating vertex validity/invalidity. That is, the two-dimensional array produced could be called a bit map comprising flags indicating the validity or invalidity of vertices.

Initialization is performed by the values of the "trimming flags" given for each trimming curve. These flags differ from the flags contained in the elements of the vertex array described above. By "trimming flag" here is meant a flag that designates whether the interior or exterior of a trimming curve is to be trimmed.

These trimming flags are included beforehand in trimming curve data. For example, a trimming flag value of "1" means that the area inside a trimming curve is valid, while a value of "0" means that the area outside the trimming curve is valid.

Figure 69:
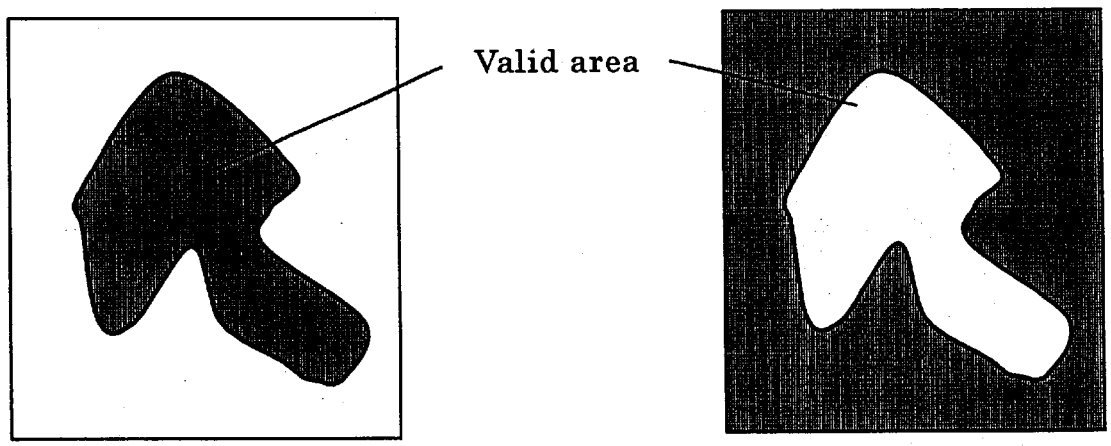
FIG. 69 is a diagram of an example wherein validity and invalidity of areas inside a trimming curve are indicated by trimming flags.

FIG. 69 is a diagram that represents examples of designations made by trimming flags. In FIG. 69A, the trimming flag is "1" and the area inside the trimming curve is valid. In FIG. 69B, the trimming flag is "0" and the area outside the trimming curve is valid.

In the polygon generator 202, when a trimming flag has a "1" value, all of the elements of the vertex array are initialized to "0." When the trimming flag has a "0" value, all of the elements in the vertex array are initialized to "1." A value of "0" for an element in the vertex array signifies that that vertex is invalid, while a value of "1" signifies that that vertex is valid.

Figure 68:
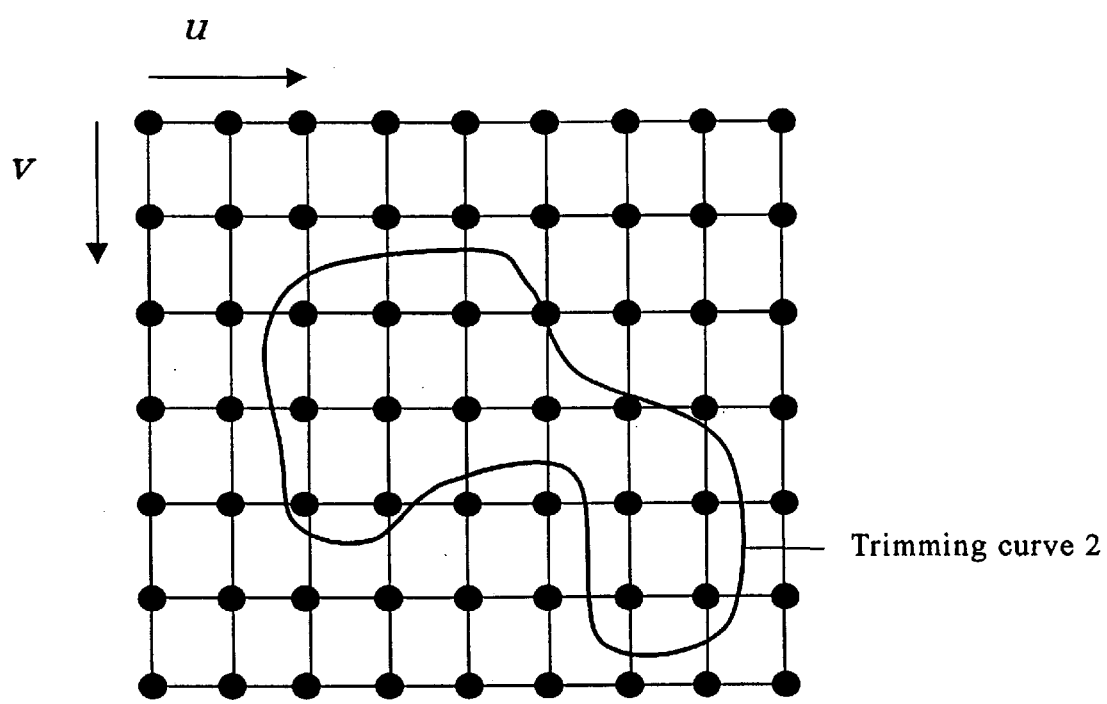
FIG. 68 is a diagram of a two-dimensional array having the same size as the number of vertices in the u and v directions that configure a parametric surface model.

In the example represented in FIG. 68, the curved surface is configured by nine vertices in the u direction and seven vertices in the v direction. From the vertex array represented in FIG. 68, the trimming curve 2 is converted to a polygon configured by line segments as diagrammed in FIG. 70 (step S32). Hereinafter, that which has been converted to this polygon will, as convenient, be called a trimming polygon 20. The conversion to such a trimming polygon 20 is done using the B-spline computation unit 203.

When the trimming curve 2 has been given as a polygon from the beginning, this conversion is not particularly necessary. When given by a parametric curve such as a NURBS curve, the curve is converted to the polygon 20 according to a predesignated number of curve divisions.

Next, the validity/invalidity of the vertices inside the trimming polygon 20 obtained is determined (step S33). Whether the interior of the trimming polygon 20 is valid or invalid will differ according to the value of the trimming flag for the trimming curve 2.

Here the determination of vertex validity/invalidity is performed in the polygon generator 202 with reference to the trimming flags. The vertices contained inside the trimming polygon are determined by using raster graphics polygon (including concave polygon) fill-in algorithms. The value of the trimming flags are written [to memory] for determined vertices.

A method for determining the validity/invalidity of vertices inside a trimming polygon 20 (polygon fill-in) is now described concretely.

Figure 70:
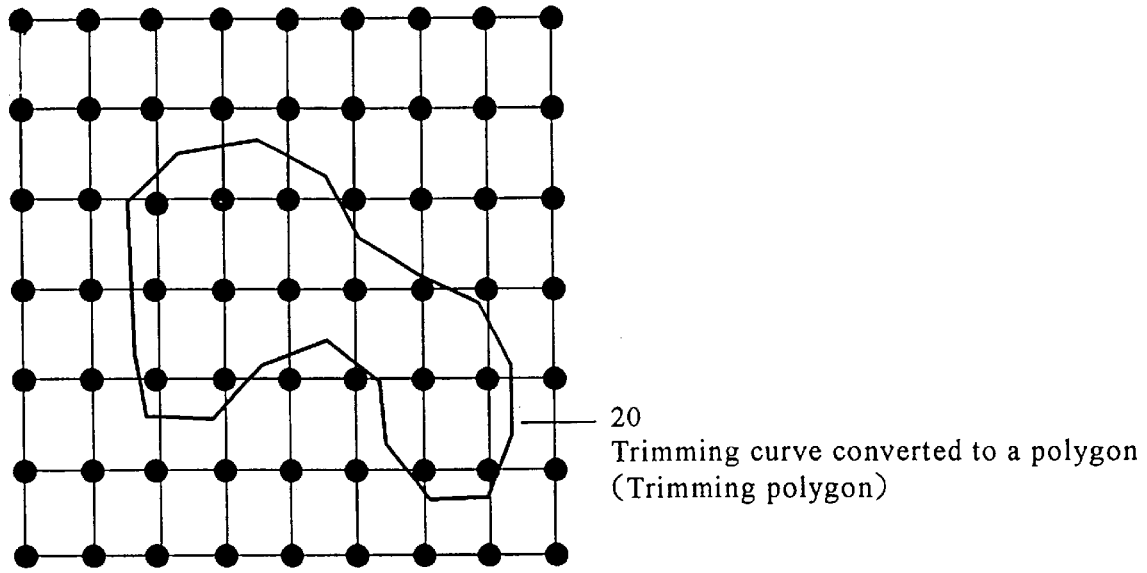
FIG. 70 is a diagram of an example of converting from a trimming curve 2 to a polygon configured by the line segmentations in the vertex array diagrammed in FIG. 68.
Figure 71:
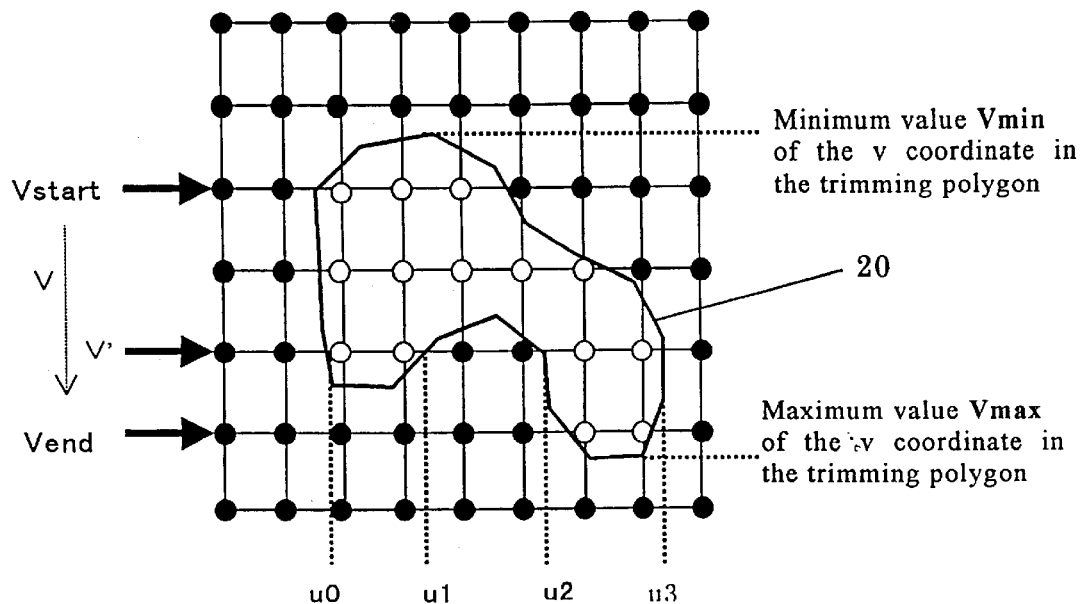

FIG. 71 is a diagram redrawn from FIG. 70 for the purpose of describing the determination of validity/invalidity inside such a trimming polygon 20. In FIG. 71, the minimum value $V_{min}$ of the v coordinate in the trimming polygon 20 is found, and a minimum v larger than that value is found. That v becomes Vstart in FIG. 71.

Next, the intersections for all sides of the trimming polygon that cross the v line are found, and the u values are sorted in order from the smaller. The sorted values are designated $u_0, u_1, u_2, \ldots, u_{n-1}$ (where n is the number of intersections, and $u_i \leq u_{i+1}$). In the example in FIG. 71, when v is the v' line, there are four intersections. Those intersections, after sorting, become $u_0, u_1, u_2, u_3$ as indicated in FIG. 71.

Next, the intersections $u_0, u_1, u_2, \ldots, u_{n-1}$ are joined two at a time into pairs (that is, making the pairs $u_0$ and $u_1$, $u_2$ and $u_3$, \ldots, $u_{n-2}$ and $u_{n-1}$), and trimming flag values are written to [memory for] the vertices contained in each of these sections.

In the example in FIG. 71, the value of the trimming flag(s) inside the trimming polygon 20 is "0," so the points inside the trimming polygon 20 are made invalid by writing in the "0" value of the trimming flag(s) (indicated by white dots in FIG. 71).

When the processing described in the foregoing has been completed, v is then moved to the next lower row. If v does not exceed the maximum value $v_{max}$ of the v coordinate for the trimming polygon, processing is repeated as described above. When $V_{max}$ is exceeded, this processing is terminated. Accordingly, in FIG. 71, v moves until it reaches v end.

In the process flow charted in FIG. 67, when there are other trimming curves, step S31 is returned to. The polygon is generated from the vertices made valid by the above processing (step S35).

Next, the particulars of how polygons are generated from vertices rendered valid are described. In the embodiments of the present invention, triangular polygons are generated in order to avoid such problems as twisting.

Figure 72:
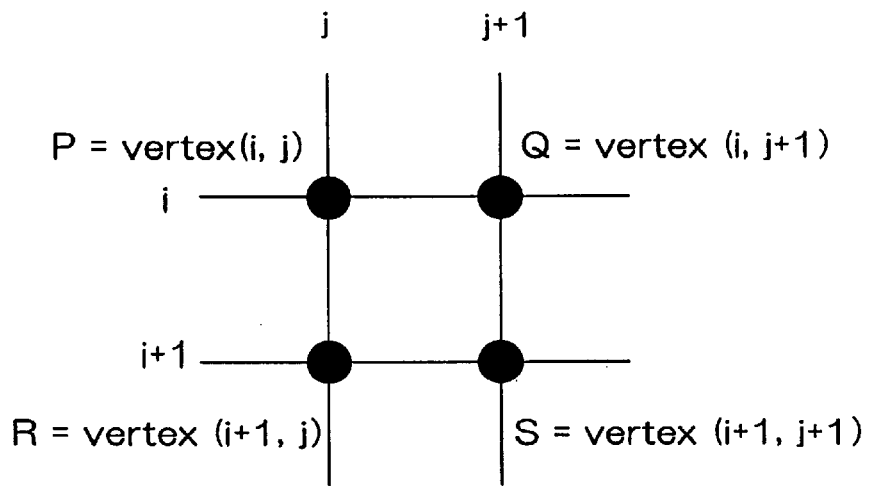
FIG. 72 is a diagram for describing the four vertices P, Q, R, and S for forming a triangular polygon.

Now, as diagrammed in FIG. 72, the vertex P(i,j) and the vertices adjacent thereto are designated [P], Q, R, and S. These four vertices P, Q, R, and S are divided to form triangular polygons. At this juncture, how the division into triangles is made is indicated by a variable "type."

Figure 73A:
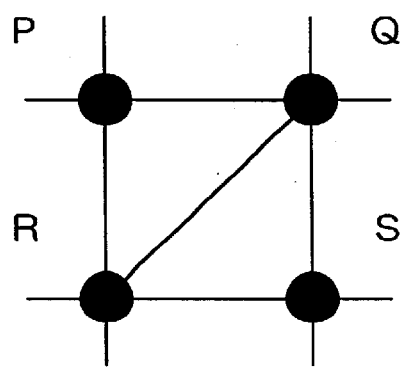
FIG. 73 is a diagram for describing a variable (type) for dividing the four vertices P, Q, R, and S and forming a triangular polygon.
Figure 73B:
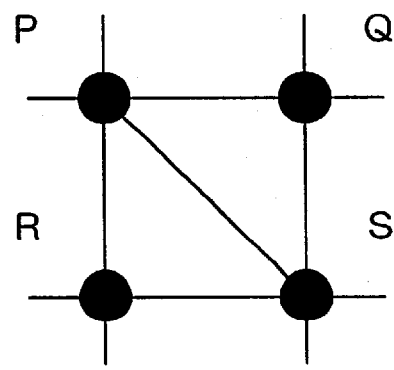

The four vertices are classified by the variable type, as diagrammed in FIG. 73, into type=0 (FIG. 73A) and type=1 (FIG. 73B).

Figure 74:
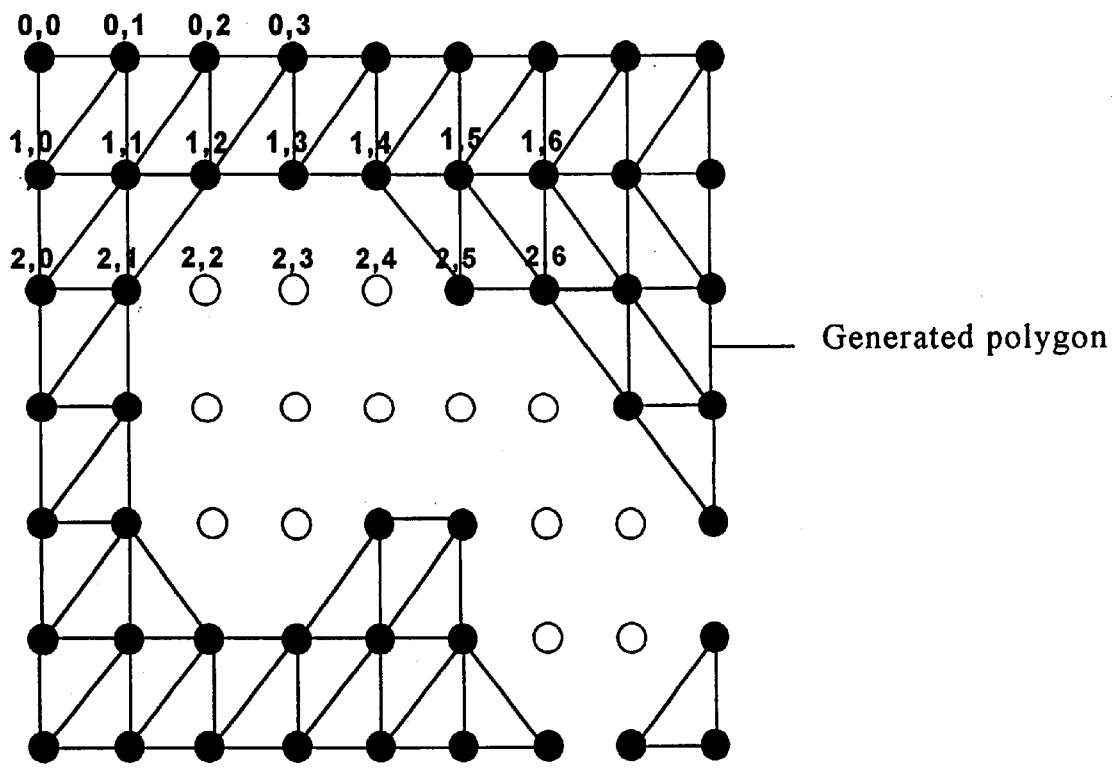
FIG. 74 is a diagram representing an example wherein a triangular polygon is formed according to the variables described in FIG. 73 for the example diagrammed in FIG. 71.

Accordingly, in the example diagrammed in FIG. 71, first, as diagrammed in FIG. 74, one triangular polygon is formed by the vertices (0,0), (0,1), and (1,0). Following that, polygons are sequentially formed in the order of vertices (0,1), (1,0), (1,1) and vertices (0,1), (0,2), (1,1).

Vertex (2,2), vertex (2,3), and vertex (2,4) are invalid, so polygons are not formed using these vertices. Accordingly, after the polygon has been formed from the vertices (1,1), (1,2), and (2,1), the polygon having the vertices (1,4), (1,5), and (2,5) is formed. Then the polygon having the vertices (1,5), (2,5), and (2,6) is formed.

Here, the area removed by trimming performed on the curved surface comprised of the polygons generated by the method according to FIG. 73 described in the foregoing, as illustrated in FIG. 74, becomes larger than the area enclosed by the trimming curve 2, that is, by the trimming polygon 20. Also, when the outside of the trimming curve 2 is cut away, the trimmed surface becomes smaller than the area enclosed by the trimming curve 2.

Because computations are simplified as much as possible in the present invention, differences develop between such a trimming curve 2 and the trimmed areas.

Figure 75:
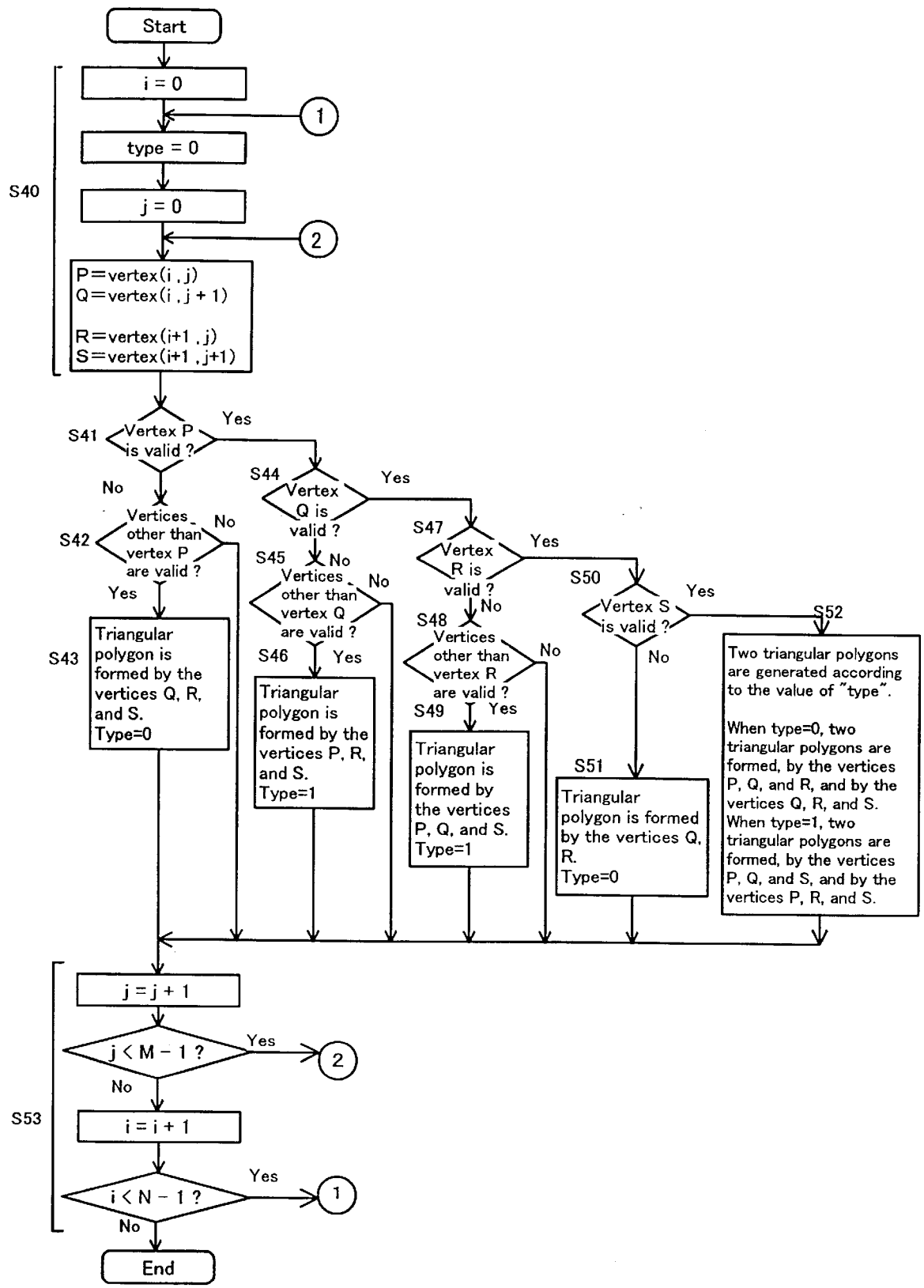
FIG. 75 is a flowchart of operations for adopting a procedure for changing the method wherewith a polygon is generated for an vertex array wherein validity and invalidity have been determined, and generating the polygon.

In FIG. 75 is given a flowchart of operations for generating polygons such as illustrated in FIG. 74. In FIG. 75, the vertex that is the i'th vertex in the v direction and the j'th in the u direction is designated vertex (i,j). M and N indicate the number of vertices in the u and v directions, respectively.

Also, for expediency, the vertices adjacent to the vertex P(i,j) are designated Q, R, and S, as in FIG. 72. The four vertices P, Q, R, and S are divided to make triangular polygons. At this time, how the divisions are made into triangles is indicated by the variable "type."

The four vertices are classified by the variable type, as diagrammed in FIG. 73, into type=0 (FIG. 73A) and type=1 (FIG. 73B).

In these preconditions, i=0, j=0, and type=0 are set as initial values in registers contained in the polygon generator 202. At the same time, similarly, P(i,j), Q(i,j+1), R(i+1,j), and S(i+1,j+1) are set for P, Q, R, and S, respectively, in coordinate registers contained in the polygon generator 202 (step S40).

Next, a determination is made as to whether or not vertex P is valid (step S41). If it is invalid, a decision is made as to whether the vertices other than vertex P are valid (step S42). If the vertices other than vertex P are valid, then a triangular polygon is formed by the vertices Q, R, and S (step 43).

If in steps S41 and S44 vertex P is determined to be valid and vertex Q to be invalid, a decision is made as to whether the vertices other than vertex Q are valid (step S45). If the vertices other than vertex Q are valid, a triangular polygon is formed by the vertices P, R, and S (step S46).

Similarly, if in steps S41, S44, and S47 it is determined that vertices P and Q are valid and vertex R is invalid, a decision is made as to whether the vertices other than vertex R are valid (step S48). If the vertices other than vertex R are valid, a triangular polygon is formed by the vertices P, Q, and S (Step S49).

Further, if in steps S41, S44, S47, and S50 it is determined that the vertices P, Q, and R are valid and vertex S is invalid, a triangular polygon is formed by the vertices P, Q, and R (step s51).

And, further still, if in steps S41, S44, S47, and S50 it is determined that all of the vertices P, Q, R, and S are valid, then two triangular polygons are generated, according to the value of "type" (step S52).

When type=0, then, as diagrammed in FIG. 73A, two triangular polygons are formed, by the vertices P, Q, and R, and by the vertices Q, R, and S. When type=1, then, as diagrammed in FIG. 73B, two triangular polygons are formed, by the vertices P, Q, and S, and by the vertices P, R, and S.

When triangular polygons have been formed, in this fashion, j and i are advanced by 1 each, and the processing routines from steps S40 to S52 are repeated for the number of vertices contained in the section (step S53).

Conversely, there are cases where it is desirable either that the area trimmed on the trimming surface be smaller than the area enclosed by the trimming curve 2, or that a surface from which the outside has been trimmed be larger than the area enclosed by the trimming curve 2.

Such cases can be handled by altering the method of generating polygons for vertex arrays for which validity/invalidity determinations have been made. With the method noted in the foregoing, specifically, polygons are only generated for cases where the triangle vertices are all valid.

On the other hand, if any one of the vertices for configuring a triangle is valid, a triangle is generated. In that way, the area trimmed on the trimming surface can be made smaller than the area enclosed by the trimming curve 2, or a surface from which the outside has been trimmed can be made larger than the area enclosed by the trimming curve 2.

In other words, if any vertex among the four vertices P, Q, R, and S deployed in the lattice pattern diagrammed in FIG. 72 is valid, then a triangular polygon is generated as diagrammed in FIG. 76.

Figure 76A:
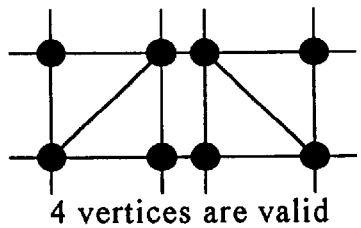
FIG. 76 is a diagram for describing an example wherein a triangular polygon is generated if any vertex among the four vertices P, Q, R, and S arranged in a lattice is valid.
Figure 76B:
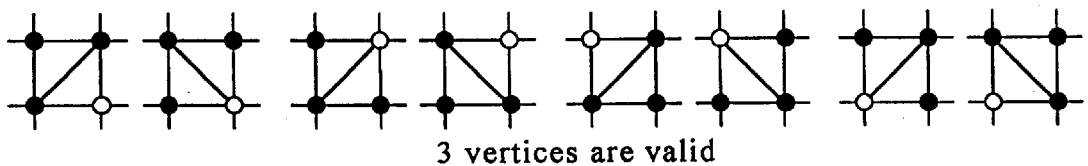
Figure 76C:
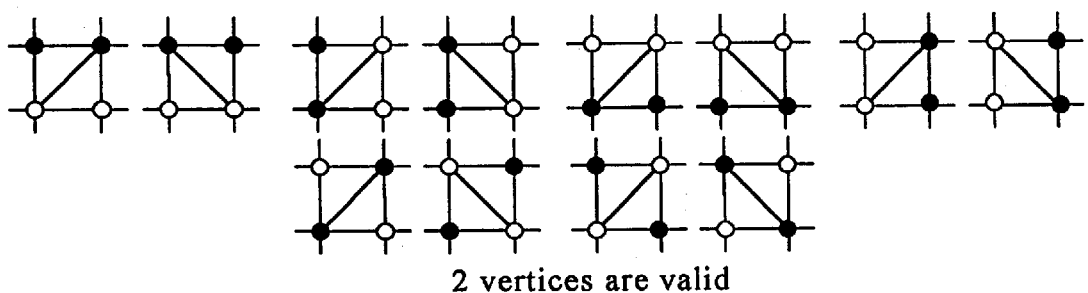

In FIG. 76A, all of the vertices are valid, and two triangular polygons are generated. Similarly, in FIG. 76B, where three vertices are valid, and in FIG. 76C, where two vertices are valid, two triangular polygons are formed, respectively.

Figure 76D:
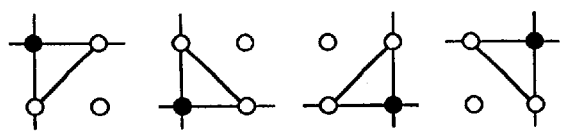

FIG. 76D represents the case where only one vertex is valid among the four vertices P, Q, R, and S deployed in the lattice pattern diagrammed in FIG. 72. In this case, one triangular polygon is generated containing the one valid vertex.

Figure 77:
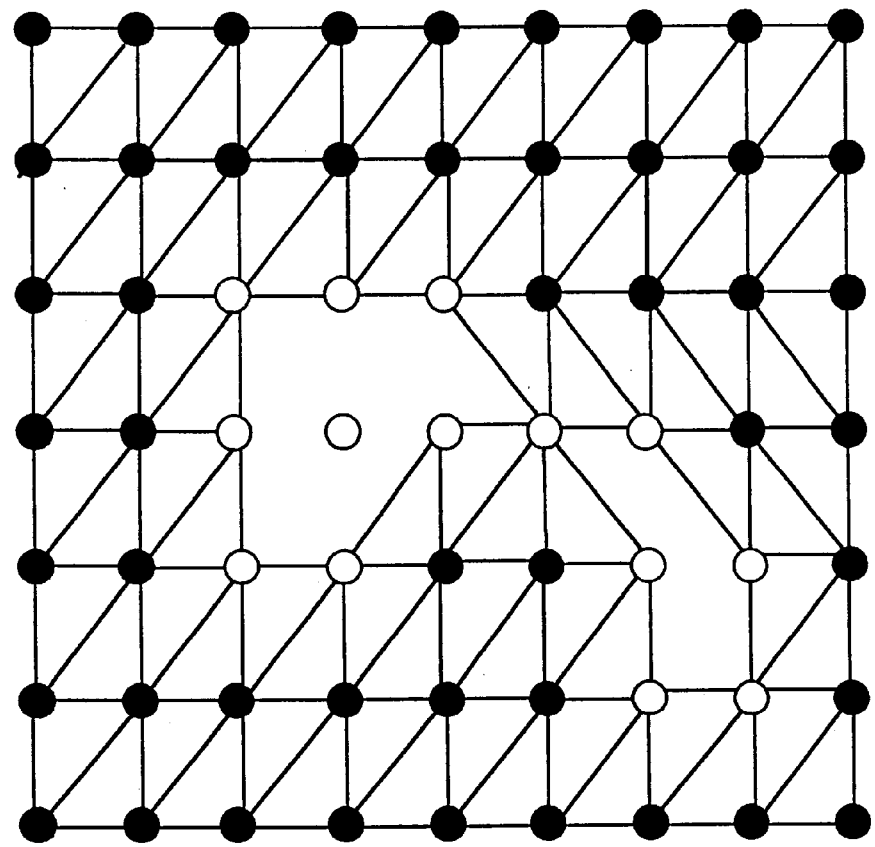
FIG. 77 is a diagram wherein a polygon is generated according to FIG. 75 in the example diagrammed in FIG. 71.

By generating polygons in this way, the polygons diagrammed in FIG. 77 are generated in the section having the trimming curve 20. In this case, comparing it to the example diagrammed in FIG. 74, the area trimmed on the trimming surface can be made smaller than the area enclosed by the trimming curve 20.

Trimming methods are now proposed which are different from the trimming method based on the trimming curve 2 diagrammed in FIG. 66 and described in the foregoing.

A first such method is a method for performing trimming (called texture-based trimming) by cutting away trimming shapes configured by 2D polygons (or 2D polylines), and applying other texture to those polygons.

Yet another method is a method (called volume-mask-based trimming) wherein trimming objects are defined in a three-dimensional coordinate system, and, when drawing the pixels of an object in a frame buffer, either pixels are not drawn if they are inside a trimming object, or other texture is imparted.

A specific embodiment of the texture-based trimming noted above is now described.

Trimming is performed by manipulating 2D texture data that are applied to objects (which may be curved surface objects such as NURBS, or polygon objects) to be trimmed.

Supposing, for example, that 2D texture defined by a uv plane is to be applied to a NURBS object, the shape that is to be trimmed beforehand on that 2D texture is configured by (either one or a plurality of) 2D polygons.

In doing this, it is permissible either to consider the 2D polygons to be "transparent" and cut them away the portion to be drawn, or to prepare other texture for the 2D polygons and replace the original texture therewith.

The advantage of configuring the trimming shape with 2D polygons (an not with a texture pattern) is that it is then easy to deform shapes interactively and in real time.

Alternatively, the trimming shape may be configured by 2D polylines wherein sampling points on a trimming curve are connected together, and trimming performed by making inside-polyline/outside-polyline determinations for each texel. While this method requires time for drawing, it does not require a separate drawing unit for drawing the 2D polygons.

FIG. 78 is a diagram for describing an embodiment of texture-based trimming.

Figure 78A:
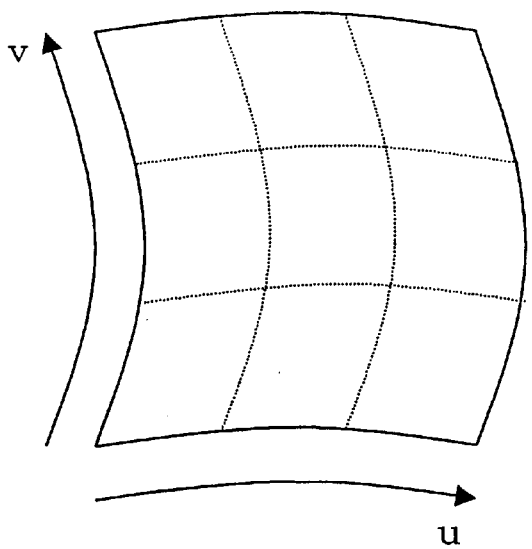
FIG. 78 is a diagram for describing an embodiment of trimming with texture.
Figure 78B:
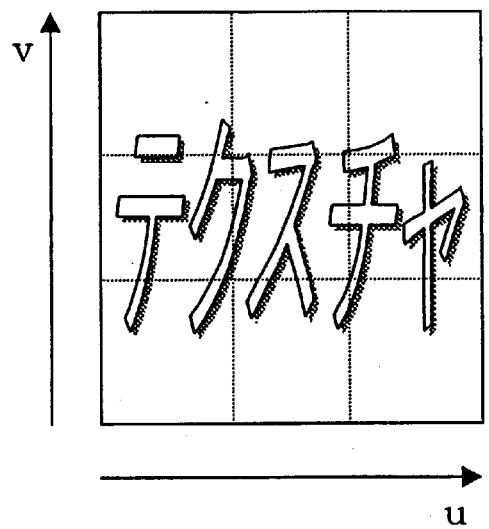

A NURBS surface object is now assumed which comprises. 3×3=9 patches as diagrammed in FIG. 78A. To this object is applied 2D texture data defined by a uv plane as diagrammed in FIG. 78B.

Figure 78C:
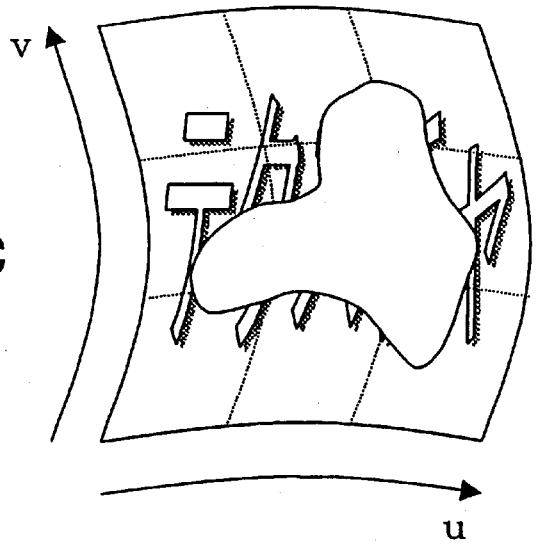

We here consider a case where trimming is performed in a NURBS surface object to make the surface diagrammed in FIG. 78C which has a hole opened therein.

First, as diagrammed in FIG. 79, trimming is performed by manipulating 2D texture defined on a uv plane. The shape to be trimmed is configured and drawn on that 2D texture, but there are two ways to configure the trimming surface.

Figure 79A:
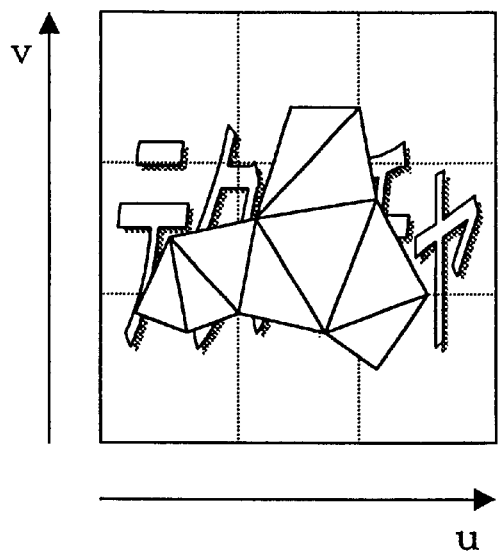
FIG. 79 is a diagram for describing a method for trimming that is conducted by manipulating 2D texture defined on a uv plane.

One way is the method of forming the shape to be trimmed by 2D polygons, as diagrammed in FIG. 79A. The 2D polygons represented in FIG. 79A are considered to be transparent, and the portion to be drawn is cut away and a hole opened in the surface object as diagrammed in FIG. 79C.

Here, by configuring the trimming area with 2D polygons, an advantage is realized in that it is easy to deform the trimming shape interactively and in real time.

Figure 79C:
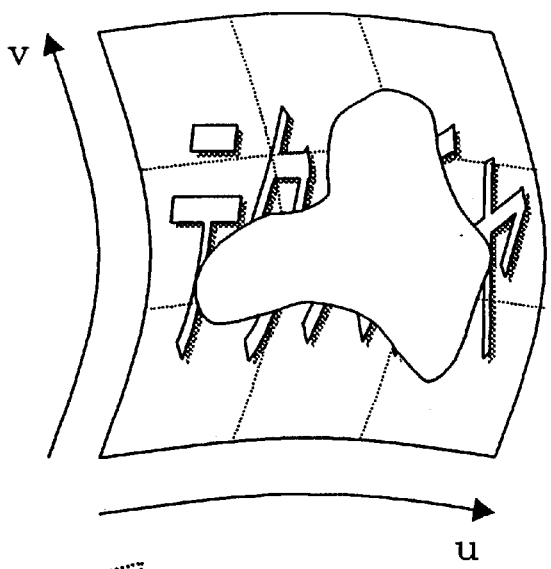
Figure 79B:
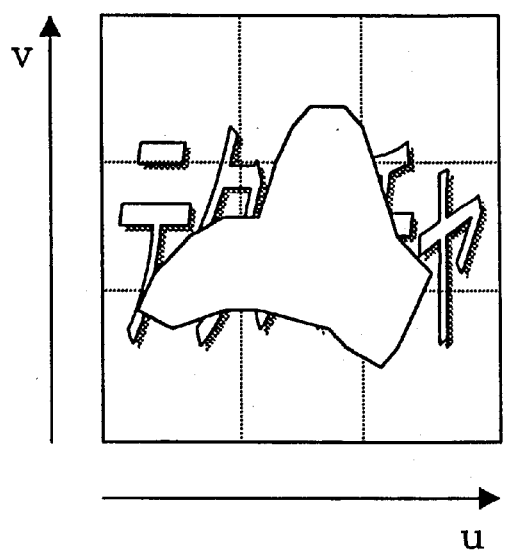

In FIG. 79B is represented a method wherewith the shape to be trimmed is configured by 2D polylines wherein sampling points on a trimming curve are connected together, and inside-polyline/outside-polyline determinations are made texel by texel.

Similarly, in this case also, the inside of the 2D polylines is considered to be transparent, and the portion to be drawn is cut away to open a hole in the surface object as diagrammed in FIG. 79C.

In FIG. 80 is diagrammed an application of the trimming method represented in FIG. 79. It is possible to prepare separate texture for either 2D polygons (FIG. 80A) or 2D polylines (FIG. 80B), and replace the original texture therewith (FIG. 80C).

In FIG. 81 is represented a method wherewith the outside of the trimming surface is replaced so that it is transparent, and only the trimming surface is cut away. In FIG. 81, FIG. 81A represents the case when based on 2D polygons, and FIG. 81B the case when based on 2D polylines. In both cases, the outside is replaced so that it is transparent and only the trimming surface is taken out, as diagrammed in FIG. 81C.

FIG. 82 is a diagram for describing volume-mask-based trimming, mentioned earlier.

When drawing an object that is to be subjected to trimming to a frame buffer pixel by pixel, a determination is made as to whether or not each pixel of that object is positioned inside a volume mask (trimming object) defined in a 3D coordinate system (which may comprise local coordinates, world coordinates, or viewing point coordinates). If it is positioned inside (or it may be positioned outside), then trimming is performed by not drawing [the object], or by imparting thereto other texture prepared beforehand, or by drawing the trimming object itself.

Figure 82A:
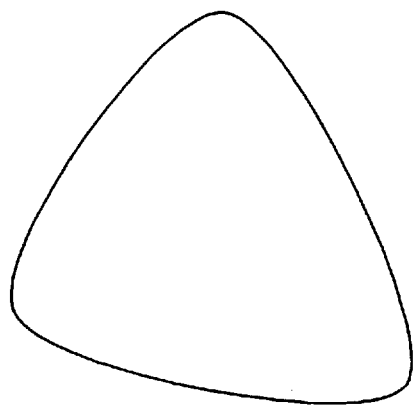
FIG. 82 is a diagram for describing trimming by a volume mask.
Figure 82B:
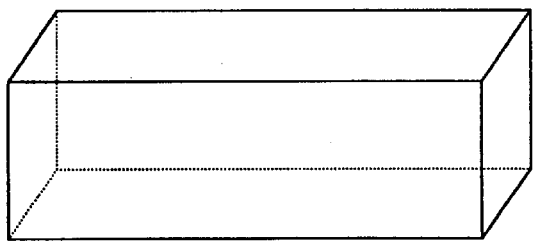
Figure 82C:
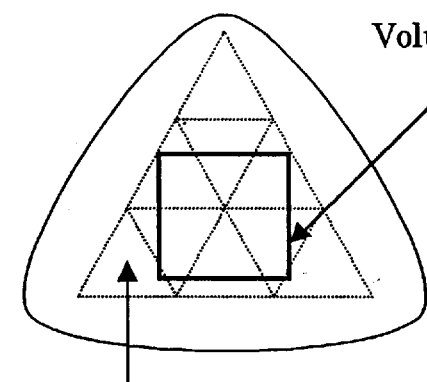
Figure 82D:
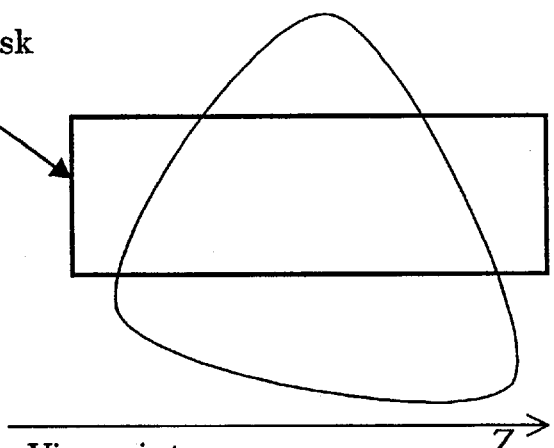

For example, in FIG. 82, a NURBS surface object to be trimmed such as represented in FIG. 82A is considered. A volume mask is defined in a 3D coordinate system, such as is represented in FIG. 82B. FIG. 82C and 82D are diagrams that present an example wherein the object (FIG. 82A) and the volume mask (FIG. 82B) are superimposed, as seen from the front and from the side, respectively.

When the pixels are being drawn to the frame buffer, a determination is made as to whether or not the object is enclosed in the volume mask.

It is possible to distinguish whether points on the object are inside or outside of the volume mask by the method diagrammed in FIG. 83.

As indicated in FIG. 83, if the volume mask lies in front of a pixel (object point) to be drawn an even number of times, as seen from the viewing point, that pixel is deemed to be outside the volume mask. If an odd number of times, it is deemed to be inside the volume mask.

Figure 83A:
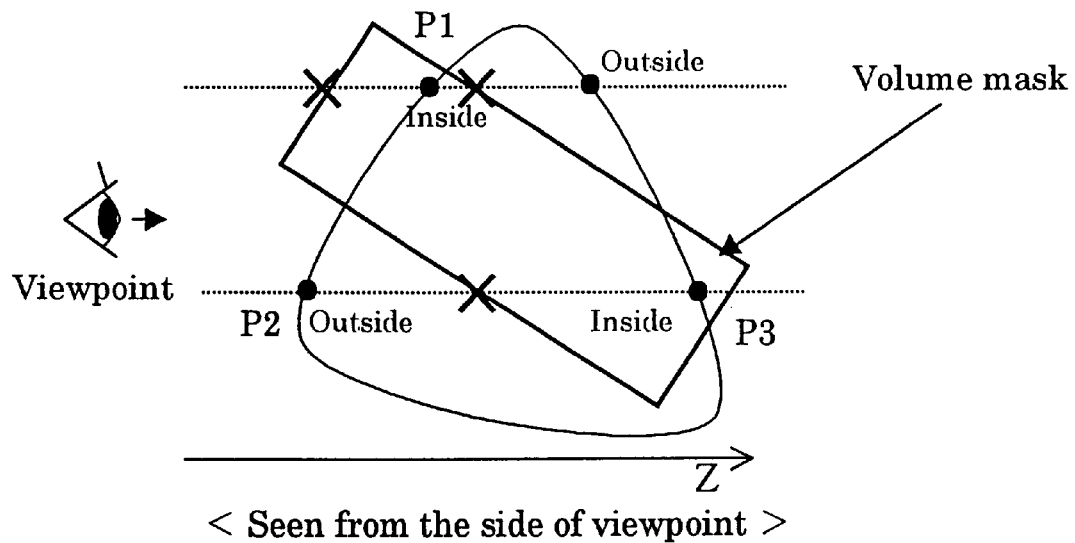
FIG. 83 is a diagram for describing a method for determining whether a point of an object is inside or outside a volume mask.
Figure 83B:
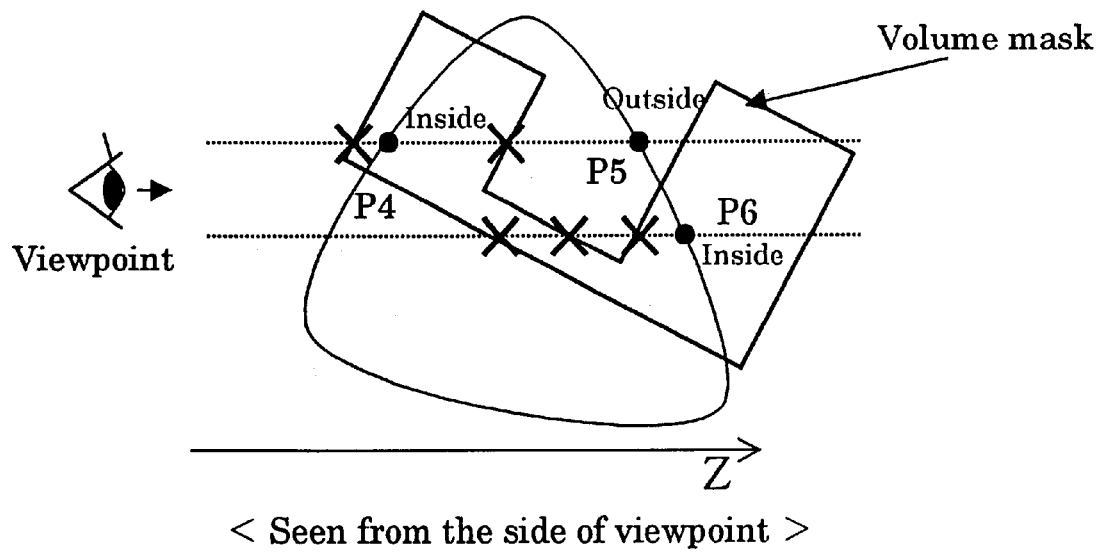

FIG. 83A and 83B represent a number of examples, and indicate the results of the determinations made for the sampling points P1 to P6. The volume mask lies in front of the point P2 zero times, wherefore, in this case, that point is judged to be outside.

When the determinations have been concluded, drawing is performed inside and outside the volume mask by methods respective thereto. Drawing methods are diagrammed in FIG. 84.

Figure 84A:
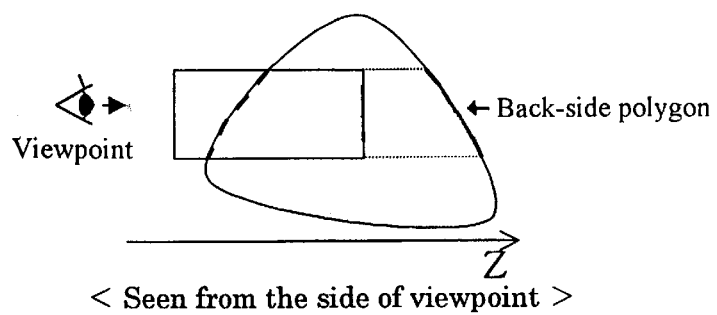
FIG. 84 is a diagram for describing a drawing method for drawing inside and outside of the volume mask, with methods respective thereto, after the determination diagrammed in FIG. 83 has been made.
Figure 84B:
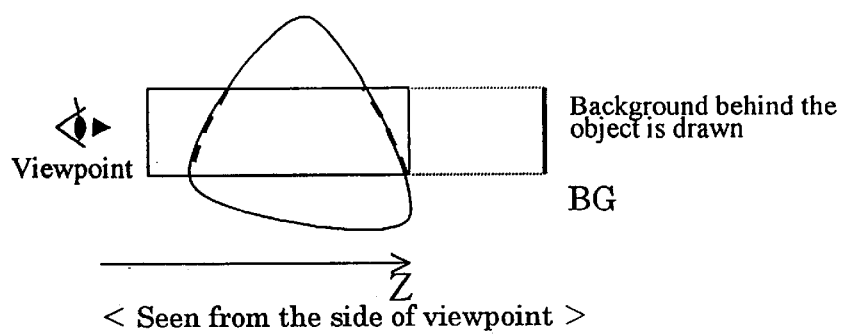

In FIG. 84A, pixels inside the volume mask are not drawn. Hence a back-side polygon PG further in the rear is drawn. In FIG. 84B, pixels inside the volume mask are not drawn. Hence background BG behind the object is drawn.

Figure 84C:
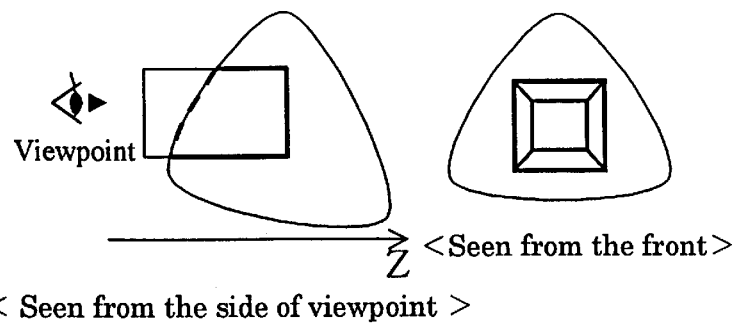
Figure 84D:
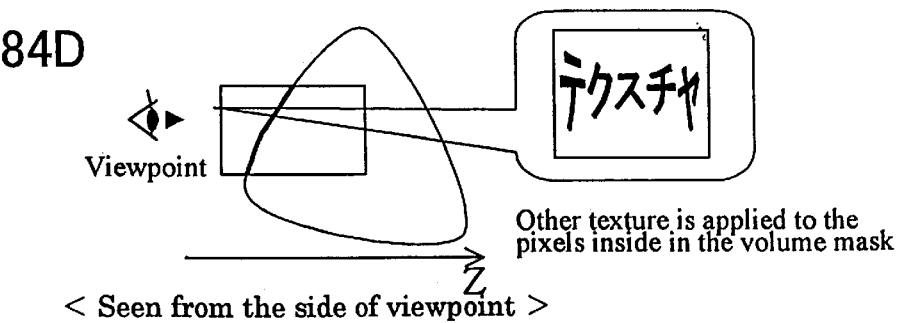

In FIG. 84C, pixels inside the volume mask are not drawn. However, an image inside the volume mask prepared beforehand is drawn. In FIG. 84D, other texture prepared beforehand is applied to the pixels inside the volume mask and drawn.

Industrial applicability is now discussed.

As described in the foregoing in terms of embodiment aspects and with reference to the drawings, the present invention is technology for converting NURBS surface objects to polygons wherein NURBS surface object data are processed directly. Thus a polygon generating method, and an image display apparatus wherein that method is employed, are provided which make it possible to optimize the realism (reality) of NURBS surface objects displayed.

According to the present invention, in the technology for converting NURBS models to polygons, the NURBS models are simplified according to the size of the object as displayed on a screen. Thus, when the size of an object is small, such that it is difficult to visually discern a complex shape, the shape of the NURBS model is simplified, making it possible to reduce both the computation volume and the polygon data volume when converting NURBS models to polygons.

Also, unneeded control points relating only to surface sections not displayed on the screen are eliminated, based on front/back determinations or on-screen/off-screen determinations for the surface patches forming a NURBS model. This makes it possible to reduce the number of polygons when converting a NURBS model to polygons, and to reduce the conversion processing volume.

Furthermore, even in cases where control points are moved in the NURBS model stage, and the NURBS model is deformed, by recomputing normal vectors for the control points which change due to that deformation, at high speed, NURBS models can be suitably shaded.

With the present invention, moreover, using LOD values found by estimating the screen projection size of a NURBS model, the number of divisions when dividing that NURBS object into a plurality of surface regions can be decreased. Also, from areas on the screen obtained by joining groups of control points corresponding to the (curved) sides of the surface regions, the number of divisions when dividing the surface regions into polygons can be calculated. And, according to this number of divisions so calculated, all of the valid sections of u and v knot strings corresponding to the NURBS object are divided so that the number of knots in the valid u and v sections, respectively, are equal.

In the present invention, furthermore, when computing the divisions mentioned above, tables are prepared such as can contain the vertices of surface regions, wherein are temporarily stored u and v knot values for the vertices, so that 3D vertex computations for polygons are calculated from the stored u and v knot values. Thus redundant vertex computations for the vertices are eliminated and computation efficiency is enhanced. It is also possible, at the stage where 3D vertex coordinates are calculated from vertex numbers registered in tables, to eliminate polygons positioned outside the screen and polygons facing backward from the viewing point. By these means the number of vertex NURBS computation iterations for subsequent attributes is reduced.

In the present invention, the values of blending functions that are recurrence formulas are computed in order to suitably sample points on a NURBS surface and divide [the surface] into polygons. As a method for performing the calculation of these blending function values at high speed, the values of blending functions at some degree are calculated on the basis of the values of blending functions at one level lower degree, making it possible to perform the computations in pipeline fashion.

Thus a computation unit for computing the blending function values can be configured by computation units for performing subtraction, division, and multiplication in pipeline fashion.

Methods for performing trimming are also provided by the present invention. Filling-in based on trimming curves converted to polygons is performed for two-dimensional arrays of sizes equal to the numbers of vertices in the u and v directions on parametric surfaces. Trimming is then performed by determining whether or not vertices inside a trimming curve are valid. By these means, the computation volume required for trimming is reduced.

The present invention also provides methods for performing trimming at high speed. One such method makes it possible to perform trimming on the 2D texture data for an object by cutting away trimming shapes configured by 2D polygons (or 2D polylines), or by providing and applying other texture to those polygons.

Another method makes it possible to perform trimming by defining a trimming object in a 3D coordinate system, and then, when drawing the object pixels to a frame buffer, not drawing the pixels when they come inside the trimming object, or imparting other texture thereto.

What is claimed is:

1. An image display apparatus for converting NURBS object data representing a parametric surface to polygon data and displaying objects configured by polygon data converted to on a display unit, comprising:

model view conversion means for coordinate-converting said NURBS object data to coordinates having viewing point as origin thereof, in correspondence with advance of a program, and determining level of detail wherewith said objects are drawn on said display unit;

computation means for finding number of divisions for said polygons when converting said NURBS object data to objects configured by polygons according to said level of detail wherewith said objects are drawn so determined by said model view conversion means, and computing vertices of polygons converted to according to said number of divisions; and means for performing rendering processing on polygons configured by vertices computed by said computation means.

2. The image display apparatus according to claim 1, wherein said computation means delete polygons for which, of said vertices computed by said computation means, all vertices are off display screen displayed on said display unit, and compute vertex attribute values for vertices of remaining polygons.

3. The image display apparatus according to claim 1, wherein said computation means find outer products of two sides of polygons which share vertices computed by said computation means, determine whether said polygons are frontward or backward from direction of said outer products so found and from viewing point direction, and, after deleting polygons which are backward and which do not have attribute of front-and-back display, compute vertex attribute values for vertices of remaining polygons.

4. The image display apparatus according to claim 1, wherein said level of detail wherewith said objects are drawn is determined according to proportion between display area on said display unit and area occupied by object displayed in said display area.

5. The image display apparatus according to claim 4, wherein said level of detail wherewith object is drawn is adjusted by said program, for each execution scene contained in said program, so that said means for performing rendering processing is not overloaded.

6. A method for generating polygon data for an image display apparatus where NURBS object data representing a parametric surface is converted to polygon data and objects configured by polygon data converted to are displayed on a display unit, the method comprising the steps of:

coordinate-converting said NURBS object data to coordinates having viewing point as origin thereof, in correspondence with advance of a program;

determining level of detail wherewith said objects are drawn on said display unit;

finding number of divisions for said polygons when converting said NURBS object data to objects configured by polygons according to said level of detail wherewith said objects are drawn so determined;

computing vertices of polygons converted to according to said number of divisions; to generate polygon data.

7. The method according to claim 6, wherein in the computing step, polygons for which, of said vertices computed, all vertices are off display screen displayed on said display, are deleted and vertex attribute values for vertices of remaining polygons are computed.

8. The method according to claim 6, wherein in the computing step, outer products of two sides of polygons which share said vertices computed are found, it is detected whether said polygons are frontward or backward from direction of said outer products so found and from viewing point direction, and, after deleting polygons which are backward and which do not have attribute of front-and-back display, vertex attribute values for vertices of remaining polygons are computed.

9. The method according to claim 6, wherein said level of detail wherewith said objects are drawn is determined according to proportion between display area on said display unit and area occupied by object displayed in said display area.

10. The method according to claim 9, wherein said level of detail wherewith object is drawn is adjusted by said program, for each execution scene contained in said program, so that rendering processing is not overloaded.

11. A recording medium storing a program for controlling to generate polygon data in an image display apparatus where NURBS object data representing a parametric surface is converted to polygon data and objects configured by polygon data converted to are displayed on a display unit, the program performing the steps of:

coordinate-converting said NURBS object data to coordinates having viewing point as origin thereof, in correspondence with advance of a program;

determining level of detail wherewith said objects are drawn on said display unit;

finding number of divisions for said polygons when converting said NURBS object data to objects configured by polygons according to said level of detail wherewith said objects are drawn so determined;

computing vertices of polygons converted to according to said number of divisions; to generate polygon data.

12. The recording medium according to claim 11, wherein polygons for which, of said vertices computed, all vertices are off display screen displayed on said display, are deleted and vertex attribute values for vertices of remaining polygons are computed.

13. The recording medium according to claim 11, wherein outer products of two sides of polygons which share said vertices computed are found, it is detected whether said polygons are frontward or backward from direction of said outer products so found and from viewing point direction, and, after deleting polygons which are backward and which do not have attribute of front-and-back display, vertex attribute values for vertices of remaining polygons are computed.

14. The recording medium according to claim 11, wherein said level of detail wherewith said objects are drawn is determined according to proportion between display area on said display unit and area occupied by object displayed in said display area.

15. The recording medium according to claim 14, wherein said level of detail wherewith object is drawn is adjusted by said program, for each execution scene contained in said program, so that rendering processing is not overloaded.

16. An image display apparatus for converting a NURBS model modeled by a NURBS surface representing a parametric surface to polygons and displaying objects configured by said polygons on a screen, comprising:

a conversion unit for converting coordinates of said NURBS model previously given to coordinates in a viewing point coordinate system having viewing point as origin therefor, in correspondence with advance of a program;

a determination unit for determining level of detail for screen of said NURBS model converted to said coordinates in said viewing point coordinate system;

a simplification unit for simplifying shape of said NURBS model, according to said level of detail; and a generator for generating polygons based on said simplified NURBS model.

17. The image display apparatus according to claim 16, wherein said determination unit determines said level of detail according to proportion of display area of said screen occupied by object displayed in said display area.

18. The image display apparatus according to claims 16 or 17, wherein said simplification unit simplifies said NURBS model by lowering degree defining said NURBS model, according to said level of detail.

19. The image display apparatus according to claim 18, wherein said simplification unit, when simplifying said NURBS model one level, deletes last elements of knot strings defining said NURBS model, and transforms m×n NURBS surfaces of K×L degree to (m+1)×(n+1) NURBS surfaces of (K−1)×(L−1) degree.

20. The image display apparatus according to claims 16 or 17, wherein said simplification unit simplifies said NURBS model by lowering degree defining said NURBS model and decreasing number of valid control points, according to said level of detail.

21. The image display apparatus according to claim 20, wherein said simplification unit, when simplifying said NURBS model one level, deletes first row elements and first column elements from control point matrix defining said NURBS model and last element(s) in knot string(s).

22. The image display apparatus according to claim 20, wherein said simplification unit, when simplifying said NURBS model one level, transforms m×n NURBS surfaces of K×L degree to m×n/4 NURBS surfaces of (K−1)×(L−1) degree.

23. The image display apparatus according to claim 22, wherein said simplification unit, of (K+1)×(L+1) valid adjacent control points configuring all or a part of a NURBS model, renders invalid two rows and two columns enclosing center control point(s) when said (K+1) or (L+1) is an odd number, renders invalid center two rows and two columns of control points when said (K+1) or (L+1) is an even number, and makes m×n/4 NURBS surfaces of (K−1)×(K−1) degree.

24. The image display apparatus according to claim 22, wherein said simplification unit uses, for weight of a valid control point after simplification, a value that is average of weight of said valid control point and weights of surrounding control points that have been made invalid.

25. The image display apparatus according to claim 22, wherein said simplification unit, in a knot string defining said NURBS model, retains end elements but deletes every other one of elements, within range wherein curve segments configuring said NURBS model are valid, and retains end elements, but deletes one element each, respectively, within range wherein curve segments before and after range wherein said curve segment is valid are not valid.

26. A method for generating polygon data for an image display apparatus where a NURBS model modeled by a NURBS surface representing a parametric surface is converted to polygons and displaying objects configured by said polygons on a screen are displayed, the method comprising the steps of:
    converting coordinates of said NURBS model previously given to coordinates in a viewing point coordinate system having viewing point as origin therefor, in correspondence with advance of a program;
    determining level of detail for screen of said NURBS model converted to said coordinates in said viewing point coordinate system;
    simplifying shape of said NURBS model, according to said level of detail; and
    generating polygons based on said simplified NURBS model.

27. The polygon generation method according to claim 26, wherein said level of detail is determined according to ratio, relative to screen display area, of area occupied by object displayed in said display area.

28. The polygon generation method according to claim 26 or 27, wherein said NURBS model is simplified by lowering degree defining said NURBS model according to said level of detail.

29. The polygon generation method according to claim 26 or 27, wherein said NURBS model is simplified by lowering degree defining said NURBS model, and decreasing number of valid control points, according to said level of detail.

30. A recording medium storing a program for controlling to generate polygon data in an image display apparatus where NURBS surface representing a parametric surface is converted to polygons and displaying objects configured by said polygons on a screen are displayed, the program performing the steps of:
    converting coordinates of said NURBS model previously given to coordinates in a viewing point coordinate system having viewing point as origin therefor, in correspondence with advance of a program;
    determining level of detail for screen of said NURBS model converted to said coordinates in said viewing point coordinate system;
    simplifying shape of said NURBS model, according to said level of detail; and
    generating polygons based on said simplified NURBS model.

31. The recording medium according to claim 30, wherein said level of detail is determined according to ratio, relative to screen display area, of area occupied by object displayed in said display area.

32. The recording medium according to claim 30 or 31, wherein said NURBS model is simplified by lowering degree defining said NURBS model according to said level of detail.

33. The recording medium according to claim 30 or 31, wherein said NURBS model is simplified by lowering degree defining said NURBS model, and decreasing number of valid control points, according to said level of detail.

34. An image display apparatus for converting a NURBS model configured by a plurality of NURBS surfaces formed using pluralities of control points, respectively, to polygons, and displaying objects configured by said polygons on a screen, comprising:
    a conversion unit for converting coordinates of said pluralities of control points given beforehand to coordinates in a viewing point coordinate system having viewing point as origin thereof, in correspondence with advance of a program;
    a determination unit for determining whether NURBS surfaces formed by control points converted to said viewing point coordinate system are forward facing or backward facing relative to line of sight direction;
    an elimination unit for eliminating control points relating only to NURBS surfaces which have been determined by said determination unit to be backward facing and which do not have front-and-back display attribute; and
    a generator for generating polygons based on NURBS surfaces formed by control points remaining after said elimination.

35. The image display apparatus according to claim 34, wherein said determination unit determines whether control points are forward facing or backward facing relative to said viewing point direction, based on directions of normal vectors for said plurality of control points, and determines which way NURBS surfaces face according to number of forward-facing control points among said plurality of control points forming said NURBS surfaces.

36. An image display apparatus for converting a NURBS model configured by a plurality of NURBS surfaces formed using pluralities of control points, respectively, to polygons, and displaying objects configured by said polygons on a screen, comprising:

a conversion unit for converting coordinates of said pluralities of control points given beforehand to coordinates in a viewing point coordinate system having viewing point as origin thereof, in correspondence with advance of a program;

a determination unit for determining whether each of said NURBS surfaces formed, by control points converted to said viewing point coordinate system, is inside or outside of said screen;

an elimination unit for eliminating control points relating only to NURBS surfaces which have been determined by said determination unit to be outside said screen; and a generator for generating polygons based on NURBS surfaces formed by control points remaining after said elimination.

37. The image display apparatus according to claim 36, wherein said determination unit determines whether said NURBS surfaces are inside or outside of said screen using all control points relating to elements configuring said NURBS surfaces.

38. The image display apparatus according to claim 37, further comprising:

a first table having flags corresponding, respectively, to line segments connecting pairs of adjacent control points in a plurality of control points relating to one NURBS surface and to line segments containing pairs of control points that are diagonally opposed; and a second table having flags corresponding to all control points relating to said NURBS model, wherein said determination unit performs first processing on NURBS surfaces, comparing positional relationships between control points at either ends of line segments in said one NURBS surface and sides of screen and, when both control points at either of said ends are outside of one of said sides, raising flags in said first table corresponding to line segments, and performs second processing on said NURBS surfaces to raise flags in said second table corresponding, respectively, to plurality of control points relating to said one NURBS surface when, in comparison with any side, a line segment exists for which flag in said first table does not rise; and said elimination unit eliminates control points for which flags in said second table do not rise.

39. A method for generating polygon data for an image display apparatus where a NURBS model configured by a plurality of NURBS surfaces formed using pluralities of control points, respectively, to polygons, and displaying object configured by said polygons is displayed on a screen, the method comprising the steps of:

converting coordinates of said pluralities of control points given beforehand to coordinates in a viewing point coordinate system having viewing point as origin thereof, in correspondence with advance of a program;

determining whether NURBS surfaces formed by control points converted to said viewing point coordinate system are forward facing or backward facing relative to line of sight direction;

eliminating control points relating only to NURBS surfaces which have been determined by said determination unit to be backward facing and which do not have front-and-back display attribute; and generating polygons based on NURBS surfaces formed by control points remaining after said elimination.

40. The method according to claim 39, wherein in the step of determination, it is determined whether control points are forward facing or backward facing relative to said viewing point direction, based on directions of normal vectors for said plurality of control points, and it is further determined which way NURBS surfaces face according to number of forward-facing control points among said plurality of control points forming said NURBS surfaces.

41. A method for generating polygons configuring objects displayed on a screen from a NURBS model configured by a plurality of NURBS surfaces respectively formed using pluralities of control points, the method comprising the steps of:

converting coordinates of said pluralities of control points given beforehand to coordinates in a viewing point coordinate system having viewing point as origin thereof, in correspondence with advance of a program;

determining whether each of said NURBS surfaces formed, by control points converted to said viewing point coordinate system, is inside or outside of a screen;

eliminating control points relating only to NURBS surfaces which have been determined to be outside of the screen; and generating polygons based on NURBS surfaces formed by control points remaining after said elimination.

42. The method according to claim 41, wherein in the step of determination, it is determined whether said NURBS surfaces are inside or outside of said screen using all control points relating to elements configuring said NURBS surfaces.

43. The method according to claim 42, further comprising the steps of:

setting a first table having flags corresponding, respectively, to line segments connecting pairs of adjacent control points in a plurality of control points relating to one NURBS surface and to line segments containing pairs of control points that are diagonally opposed, and a second table having flags corresponding to all control points relating to said NURBS model, wherein in the step of determination, first processing is performed on NURBS surfaces, comparing positional relationships between control points at either ends of line segments in said one NURBS surface and sides of screen and, when both control points at either of said ends are outside of one of said sides, raising flags in said first table corresponding to line segments, and second processing is performed on said NURBS surfaces to raise flags in said second table corresponding, respectively, to plurality of control points relating to said one NURBS surface when, in comparison with any side, a line segment exists for which flag in said first table does not rise; and in the step of elimination, control points for which flags in said second table do not rise are eliminated.

44. A recording medium storing a program for controlling to generate polygon data for an image display apparatus where a NURBS model configured by a plurality of NURBS surfaces formed using pluralities of control points, respectively, to polygons, and displaying object configured by said polygons is displayed on a screen, the program performing the steps of:

converting coordinates of said pluralities of control points given beforehand to coordinates in a viewing point coordinate system having viewing point as origin thereof, in correspondence with advance of a program;

determining whether NURBS surfaces formed by control points converted to said viewing point coordinate system are forward facing or backward facing relative to line of sight direction;

eliminating control points relating only to NURBS surfaces which have been determined by said determination unit to be backward facing and which do not have front-and-back display attribute; and generating polygons based on NURBS surfaces formed by control points remaining after said elimination.

45. The recording medium according to claim 44, wherein in the step of determination, it is determined whether control points are forward facing or backward facing relative to said viewing point direction, based on directions of normal vectors for said plurality of control points, and it is further determined which way NURBS surfaces face according to number of forward-facing control points among said plurality of control points forming said NURBS surfaces.

46. A recording medium storing a program for controlling to generate polygons configuring objects displayed on a screen from a NURBS model configured by a plurality of NURBS surfaces respectively formed using pluralities of control points, the program performing the steps of:

converting coordinates of said pluralities of control points given beforehand to coordinates in a viewing point coordinate system having viewing point as origin thereof, in correspondence with advance of a program;

determining whether each of said NURBS surfaces formed, by control points converted to said viewing point coordinate system, is inside or outside of a screen;

eliminating control points relating only to NURBS surfaces which have been determined to be outside of the screen; and generating polygons based on NURBS surfaces formed by control points remaining after said elimination.

47. The recording medium according to claim 46, wherein in the step of determination performed by the program, it is determined whether said NURBS surfaces are inside or outside of said screen using all control points relating to elements configuring said NURBS surfaces.

48. The recording medium according to claim 47, wherein the program further performs the steps of:

setting a first table having flags corresponding, respectively, to line segments connecting pairs of adjacent control points in a plurality of control points relating to one NURBS surface and to line segments containing pairs of control points that are diagonally opposed; and a second table having flags corresponding to all control points relating to said NURBS model, wherein in the step of determination, first processing is performed on NURBS surfaces, comparing positional relationships between control points at either ends of line segments in said one NURBS surface and sides of screen and, when both control points at either of said ends are outside of one of said sides, raising flags in said first table corresponding to line segments, and second processing is performed on said NURBS surfaces to raise flags in said second table corresponding, respectively, to plurality of control points relating to said one NURBS surface when, in comparison with any side, a line segment exists for which flag in said first table does not rise; and in the step of elimination, control points for which flags in said second table do not rise are eliminated.

49. An image display apparatus for converting a NURBS model configured by a plurality of NURBS surfaces formed using pluralities of control points, respectively, to polygons, and displaying objects configured by said polygons on a screen, comprising:

a first computation unit for, when at least one of said plurality of control points for which a normal vector is given beforehand is moved, computing normal vectors for moved control points and for control points adjacent in a lattice pattern to said moved control points; and a second computation unit for finding normal vectors for prescribed sampling points in NURBS surfaces to which said moved control points and/or said control points adjacent in a lattice pattern to said moved control points relate, using said normal vectors computed by said first computation unit.

50. The image display apparatus according to claim 49, wherein said first computation unit finds a normal vector for one control point by finding a plurality of vectors extending from said one control point respectively toward a plurality of control points adjacent thereto in a lattice pattern, computing, respectively, outer products between said vectors and vectors adjacent thereto in a prescribed direction of rotation centering on said one control point, and averaging plurality of said outer products obtained.

51. A polygon generation method for generating polygons configuring an object displayed on a screen from a NURBS model configured by a plurality of NURBS surfaces formed using pluralities of control points, respectively, comprising:

a first computation step for, when at least one of said plurality of control points for which a normal vector is given beforehand is moved, computing normal vectors for moved control points and for control points adjacent in a lattice pattern to said moved control points; and a second computation unit for finding normal vectors for prescribed sampling points in NURBS surfaces to which said moved control points and/or said control points adjacent in a lattice pattern to said moved control points relate, using said normal vectors computed by said first computation step.

52. The polygon generation method according to claim 51, wherein said first computation step finds a normal vector for one control point by finding a plurality of vectors extending from said one control point respectively toward a plurality of control points adjacent thereto in a lattice pattern, computing, respectively, outer products between said vectors and vectors adjacent thereto in a prescribed direction of rotation centering on said one control point, and averaging plurality of said outer products obtained.

53. A recording medium storing a program for controlling to generate polygons configuring an object displayed on a screen from a NURBS model configured by a plurality of NURBS surfaces formed using pluralities of control points, respectively, the program performing the steps of:

a first computation step of, when at least one of said plurality of control points for which a normal vector is given beforehand is moved, computing normal vectors for moved control points and for control points adjacent in a lattice pattern to said moved control points; and a second computation step of finding normal vectors for prescribed sampling points in NURBS surfaces to which said moved control points and/or said control points adjacent in a lattice pattern to said moved control points relate, using said normal vectors computed by said first computation step.

54. The recording medium according to claim 53, wherein said first computation step finds a normal vector for one control point by finding a plurality of vectors extending from said one control point respectively toward a plurality of control points adjacent thereto in a lattice pattern, computing, respectively, outer products between said vectors and vectors adjacent thereto in a prescribed direction of rotation centering on said one control point, and averaging plurality of said outer products obtained.

55. An image display apparatus for converting NURBS object data representing a parametric surface to polygons and, displaying object configured by said polygon data converted to on a display, comprising:

decision means for deciding level of detail wherewith said object is drawn on said display, in correspondence with advance of a program; and division means for dividing said NURBS object data into a plurality of surface areas, according to said level of detail decided by said decision means, and also dividing each of said surface areas into a plurality of polygons proportionately with size of area on screen obtained by joining control point groups corresponding to each of said surface areas.

56. The image display apparatus according to claim 55, wherein said division means divide all valid sections of u and v knot strings corresponding to a NURBS object, according to number of said plurality of surface areas divided into, so that numbers of knots in valid sections for u and v, respectively, are equal.

57. The image display apparatus according to claim 55, wherein number of divisions for dividing said surface areas into polygons is calculated from size of area on display screen obtained by joining control points corresponding to sides of said surface areas.

58. The image display apparatus according to claim 55, further comprising a table for storing u and v knot values of vertices for said surface areas; wherein said decision means calculate three-dimensional coordinates for polygons from u and v knot values stored in said table.

59. An image display method for converting NURBS object data representing a parametric surface to polygons, and displaying object configured by said polygon data converted to on a display, the method comprising the steps of:

deciding level of detail wherewith said object is drawn on said display, in correspondence with advance of a program; and dividing the NURBS object data into a plurality of surface areas, according to said level of detail decided, and dividing each of said surface areas into a plurality of polygons proportionately with size of area on screen obtained by joining control point groups corresponding to each of said surface areas.

60. The image display method according to claim 59, further comprising the steps of:

storing u and v knot values of vertices for said surface areas in a table; and calculating vertices for polygons to be divided from u and v knot values stored in said table.

61. The image display method according to claim 59, wherein in the step of dividing, all valid sections of u and v knot strings corresponding to a NURBS object are divided, according to number of said plurality of surface areas divided into, so that numbers of knots in valid sections for u and v, respectively, are equal.

62. The image display method according to claim 59, wherein number of divisions for dividing said surface areas into polygons is calculated from size of area on display screen obtained by joining control points corresponding to sides of said surface areas.

63. The polygon data generation method according to claim 59, wherein: in division of said surface areas into pluralities of polygons, one side is made base, and UV values are found by interpolation, precisely the number of U or V steps in shorter of left and right sides, but by precisely (number of steps −1) if numbers of steps in left and right sides are equal, and by precisely number of steps in said base for each step; after which UV values are found by interpolation, by precisely number of U or V steps in shorter of left and right sides, either (long step number −1–short step number) or (number of steps in next side −1), and by precisely number of steps (number of steps in base −1) for each step; base is switched to portion of remaining steps for longer of left and right sides; triangle strips are generated precisely (number of short steps −1) of left and right sides for base switched to; and (a) triangle fan(s) is/are generated using remaining steps.

64. The polygon data generation method according to claim 63 wherein side made said base is side having greatest number of divisions.

65. The polygon data generation method according to claim 63, wherein side made said base is value for number of divisions that is closest to value averaged from numbers of divisions in all sides.

66. A recording medium provided in an image display apparatus, storing a program performing the steps defined in claim 59.

67. The recording medium according to claim 66, wherein in the step of dividing, all valid sections of u and v knot strings corresponding to a NURBS object are divided, according to number of said plurality of surface areas divided into, so that numbers of knots in valid sections for u and v, respectively, are equal.

68. The recording medium according to claim 66, wherein number of divisions for dividing said surface areas into polygons is calculated from size of area on display screen obtained by joining control points corresponding to sides of said surface areas.

69. A recording medium provided in an image display apparatus wherein NURBS object data representing a parametric surface to polygons is converted, and displaying object configured by said polygon data converted to is displayed on a display, the recording medium storing a program performing the steps of:

deciding level of detail wherewith said object is drawn on said display, in correspondence with advance of a program;

dividing the NURBS object data into a plurality of surface areas, according to said level of detail decided, and each of said surface area into a plurality of polygons proportionately with size of area on screen obtained by joining control point groups corresponding to each of said surface areas;

storing u and v knot values of apexes for said surface areas in a table; and calculating vertexes for polygons to be divided from u and v knot values stored in said table.

70. An image display apparatus for converting NURBS object data representing a parametric surface to polygon data, and displaying object configured by said polygon data converted to on a display, comprising:

computing means for suitably sampling a NURBS object and dividing said NURBS object into a plurality of polygons, and computing vertices of said polygons divided into; and means for performing rendering processing on polygons configured by said vertices computed by said computation means, wherein said computation means includes auxiliary computation means for inputting knot values u and knot strings $[u_0, u_1, u_2, \ldots, u_{m-1}]$ (where m=number of control points+degree k) and calculating values $M_{x,k}$ (where number of M's is same as degree) of blending functions.

71. The image display apparatus according to claim 70, wherein: said auxiliary computation means have computation units for performing subtraction, division, and multiplication operations in pipeline fashion; and timing wherewith values of blending functions at both ends at some degree of said blending functions are calculated and timing wherewith values of blending functions not at said both ends do not coincide.

72. A trimming method, in a parametric surface model, comprising the steps of:
   a first step for generating, in correspondence with a parametric surface represented by a plurality of vertices in u and v directions in parametric space, a two-dimensional array of a size equal to number of said vertices in u and v directions;
   a second step for converting trimming curves on said parametric surface to polygons based on straight line segments on said two-dimensional array; and
   a third step for deciding whether to make said vertices in said polygons converted to valid or invalid; wherein:
      in said third step, when said vertices inside said polygons converted to are made valid, interiors of said polygons are included among those to be drawn, and when said vertices inside said polygons converted to are not made valid, interiors of said polygons are deleted from among those to be drawn.

73. The trimming method, in a parametric surface model, according to claim 72, further having a fourth step for generating triangular polygons based on said vertices decided to be valid in said third step.

74. The trimming method, in a parametric surface model, according to claim 73, wherein, in said fourth step, when it has been decided that three vertices are valid, a triangular polygon containing said three vertices decided to be valid is generated.

75. The trimming method, in a parametric surface model, according to claim 73, wherein, in said fourth step, when it has been decided that at least one vertex of three vertices is valid, a triangular polygon containing that one vertex decided to be valid is generated.

76. The method for processing trimming curves according to any one of claims 72 to 75, wherein said parametric surface is represented by a NURBS.

77. An image display apparatus comprising:
   data supply means for supplying parametric surface model data and trimming curve data;
   computation means for setting a two-dimensional array having same size as number of vertices in u and v directions in parametric surface model data from said data supply means, converting said trimming curve data to polygons, and deciding validity or invalidity of vertices in areas of said polygons;
   polygon generation means for generating triangular polygons based on results of deciding validity or invalidity of said vertices in said areas of said polygons; and
   drawing means for drawing said triangular polygons generated by said polygon generation means; wherein:
      said polygon generation means, when said vertices inside said polygons are made valid, include interiors of said polygons among those to be drawn, and when said vertices inside said polygons are made invalid, delete interiors of said polygons from among those to be drawn.

78. The image display apparatus according to claim 77, wherein deciding validity or invalidity of said vertices inside areas of said polygons is done by said computation means, using a raster graphic fill-in method on areas of said polygons converted to.

79. The image display apparatus according to claim 77, wherein said polygon generation means, when it has been decided that three vertices are valid, generate a triangular polygon containing said three vertices decided to be valid.

80. The image display apparatus according to claim 77, wherein said polygon generation means, when it has been decided that at least one vertex of three vertices is valid, generate a triangular polygon containing that one vertex decided to be valid.

81. The image display apparatus according to any one of claims 77 to 80, wherein said parametric surface is represented by a NURBS.

82. A trimming method for trimming an object configured by polygon data, comprising the steps of:
   drawing a trimming object configured by two-dimensional polygons or two-dimensional polylines to or cutting out said trimming object from two-dimensional texture data defined by a parametric plane; and
   mapping said texture data, which is drawn or cut out, to said polygons.

83. The trimming method according to claim 82, wherein said polygon object configures a parametric surface object represented by a plurality of vertices in u and v direction in parametric space.

84. A trimming method for a parametric surface object wherein:
   a trimming object is defined in three-dimensional space;
   decisions are made, when drawing pixels of said parametric surface object to a frame buffer, as to whether or not said pixels are inside said trimming object; and
   trimming is performed, controlling drawing execution, based on results of said decisions.

85. The trimming method, for a parametric curve model, according to claim 84, wherein, for pixels to be drawn, when points of said trimming object occur an even number of times in front of said pixels to be drawn, as seen from viewing point, those pixels to be drawn are determined to exist outside said trimming object, and when they occur an odd number of times, those pixels to be drawn are determined to exist inside said trimming object.

86. The trimming method, for a parametric surface object, according to claim 84, wherein, as a mode for said drawing execution and control, pixels of said parametric surface object determined to be inside said trimming object are not drawn, or only those pixels determined to be so inside are drawn, or instead of those pixels determined to be so inside, pixels corresponding to said trimming object are drawn, or texture cells corresponding to texture data prepared beforehand but different from texture data originally to be mapped are mapped to said pixels determined to be so inside.

87. An image display apparatus, for displaying objects configured by polygon data, comprising:
   first means for supplying said polygon data;
   second means for supplying two-dimensional texture data defined in a parametric plane; and
   control means for performing processing to draw a trimming object configured by two-dimensional polygons or two-dimensional polylines or to cut said trimming object away from said two-dimensional texture data read out from said second means; and performing trimming by mapping said texture data to which said trimming object is drawn or from which said trimming object is cut away to polygons read out from said first means.

88. The image display apparatus according to claim 87, wherein said polygon object configures a parametric surface object represented by a plurality of vertices in u and v directions in parametric space.

89. An image display apparatus, for displaying objects configured by polygon data, having:

a frame buffer; and control means for defining a trimming object in a three-dimensional space, deciding whether or not pixels of said parametric surface object are inside said trimming object and, based on results of said decisions, and controlling to draw each of pixels forming a parametric surface object to said frame buffer.

90. The image display apparatus according to claim 89, wherein said control means, for pixels to be drawn to said frame buffer, when points of said trimming object occur an even number of times in front of those pixels to be drawn, as seen from viewing point, determine that those pixels to be drawn exist outside said trimming object, and when they occur an odd number of times, determine that those pixels to be drawn exist inside said trimming object.

91. The image display apparatus according to claim 89, wherein, as a mode for said drawing execution and control in said control means, pixels of said parametric surface object determined to be inside said trimming object are not drawn, or only those pixels determined to be so inside are drawn, or instead of those pixels determined to be so inside, pixels corresponding to said trimming object are drawn, or texture cells corresponding to texture data prepared beforehand but different from texture data originally to be mapped are mapped to said pixels determined to be so inside.

92. An image display method for converting NURBS object data representing a parametric surface to polygon data, and displaying object configured by polygon data converted to on a display, the method comprising the steps of:

coordinate-converting said NURBS object data to coordinates having viewing point as origin, in correspondence with advance of a program;

converting said NURBS object data coordinate-converted to coordinates having viewing point as origin to object data configured by polygons; and projecting and performing rendering processing to display said object data on said display.

93. An image display apparatus for converting NURBS object data representing a parametric surface to polygon data and displaying objects configured by polygon data converted to on a display, comprising:

a geometry computation unit for coordinate-converting said NURBS object data to coordinates having viewing point as origin, in correspondence with advance of a program, converting said NURBS object data coordinate-converted to coordinates having said viewing point as origin to object data configured by polygons, and projecting object data converted to onto said display screen;

a rendering processing circuit for performing rendering processing on object data projected onto said display screen by said geometry computation unit;

a video memory for storing at least one screen-full, for said display, of output of said rendering processing circuit, and repeatedly outputting same with a prescribed periodicity; and a display whereon to display output of said video memory.

94. A computer readable recording medium, comprising:

a computer program, which when executed by a computer causes the computer to, convert NURBS object data representing a parametric surface to from an original coordinate system to a modified coordinate system having a view point located at an origin of said modified coordinate system;

convert said NURBS object data in said modified coordinate system into polygon configured object data; and render to a display, said polygon configured object data.

\* \* \* \* \*